United States Patent
Fitzpatrick et al.

(10) Patent No.: US 8,447,510 B2
(45) Date of Patent: May 21, 2013

(54) APPARATUSES, METHODS AND SYSTEMS FOR DETERMINING AND ANNOUNCING PROXIMITY BETWEEN TRAJECTORIES

(75) Inventors: Dudley Fitzpatrick, Pennington, NJ (US); Jason Alan Snyder, Philadelphia, PA (US)

(73) Assignee: Augme Technologies, Inc., New York, NY (US)

( * ) Notice: Subject to any disclaimer, the term of this patent is extended or adjusted under 35 U.S.C. 154(b) by 0 days.

(21) Appl. No.: 13/162,019

(22) Filed: Jun. 16, 2011

(65) Prior Publication Data

US 2011/0246070 A1 Oct. 6, 2011

Related U.S. Application Data

(63) Continuation of application No. 11/864,799, filed on Sep. 28, 2007, now abandoned.

(60) Provisional application No. 60/828,959, filed on Oct. 10, 2006, provisional application No. 60/828,962,
(Continued)

(51) Int. Cl.
*F41G 9/00* (2006.01)

(52) U.S. Cl. .......... 701/302; 707/999.003; 707/999.004; 707/999.005; 707/736; 709/206

(58) Field of Classification Search .................. 701/302; 707/999.003, 999.004, 999.005, 736; 709/206; 455/26; 715/234; 370/467

See application file for complete search history.

(56) References Cited

U.S. PATENT DOCUMENTS

| 5,266,805 A | 11/1993 | Edgar |
| 5,527,641 A | 6/1996 | Koshiishi et al. |
| 5,839,119 A | 11/1998 | Krsul et al. |
| 5,873,068 A | 2/1999 | Beaumont et al. |
| 5,932,863 A | 8/1999 | Rathus et al. |
| 5,946,664 A | 8/1999 | Ebisawa |
| 6,036,601 A | 3/2000 | Heckel |

(Continued)

FOREIGN PATENT DOCUMENTS

| GB | 2373613 | 9/2002 |
| WO | WO8806710 | 9/1988 |

(Continued)

OTHER PUBLICATIONS

Wendy Davis, "Magazines Picture Interactive Backchannel, It's on a Cell Phone," MediaPost Publications, http://publications.mediapost.com/index.cfm?fuseaction=Articles.s . . . , Mar. 15, 2005.

(Continued)

*Primary Examiner* — McDieunel Marc
(74) *Attorney, Agent, or Firm* — Delos, LLC

(57) ABSTRACT

Apparatuses, methods, and systems for signaling proximity of mobile devices. First activity information of a first mobile device and second activity information of a second mobile device are accumulated. A proximity boundary is established for the first mobile device. A location of the first mobile device is determined from the first activity information and a location of the second mobile device is determined from the second activity information. A determination is made whether the second mobile device is on or within the proximity boundary of the first mobile device. An alert is sent to at least the first mobile device that the proximity boundary has been breached when the second mobile device is on or within the proximity boundary of the first mobile device.

18 Claims, 31 Drawing Sheets

Related U.S. Application Data filed on Oct. 10, 2006, provisional application No. 60/828,970, filed on Oct. 10, 2006, provisional application No. 60/828,969, filed on Oct. 10, 2006, provisional application No. 60/828,967, filed on Oct. 10, 2006, provisional application No. 60/828,968, filed on Oct. 10, 2006, provisional application No. 60/828,965, filed on Oct. 10, 2006, provisional application No. 60/827,381, filed on Sep. 28, 2006.

(56) References Cited

U.S. PATENT DOCUMENTS

| | | | |
|---|---|---|---|
| 6,052,159 A | 4/2000 | Ishii et al. | |
| 6,334,109 B1 | 12/2001 | Kanevsky et al. | |
| 6,363,484 B1* | 3/2002 | Cordery et al. | 713/182 |
| 6,369,710 B1* | 4/2002 | Poticny et al. | 340/572.1 |
| 6,430,554 B1 | 8/2002 | Rothschild | |
| 6,448,979 B1 | 9/2002 | Schena et al. | |
| 6,519,571 B1 | 2/2003 | Guheen et al. | |
| 6,522,889 B1 | 2/2003 | Aarnio | |
| 6,527,641 B1 | 3/2003 | Sinclair et al. | |
| 6,571,279 B1 | 5/2003 | Herz et al. | |
| 6,574,660 B1* | 6/2003 | Pashupathy et al. | 709/217 |
| 6,628,314 B1 | 9/2003 | Hoyle | |
| 6,641,053 B1 | 11/2003 | Breidenbach et al. | |
| 6,651,053 B1 | 11/2003 | Rothschild | |
| 6,675,165 B1 | 1/2004 | Rothschild | |
| 6,691,914 B2 | 2/2004 | Isherwood et al. | |
| 6,714,778 B2* | 3/2004 | Nykanen et al. | 455/414.1 |
| 6,736,322 B2 | 5/2004 | Gobburu et al. | |
| 6,748,327 B1 | 6/2004 | Watson | |
| 6,753,883 B2 | 6/2004 | Schena et al. | |
| 6,766,363 B1 | 7/2004 | Rothschild | |
| 6,766,956 B1 | 7/2004 | Boylan et al. | |
| 6,804,659 B1 | 10/2004 | Graham et al. | |
| 6,823,188 B1 | 11/2004 | Stern | |
| 6,837,436 B2 | 1/2005 | Swartz et al. | |
| 6,871,780 B2 | 3/2005 | Nygren et al. | |
| 6,947,571 B1 | 9/2005 | Rhoads et al. | |
| 6,993,573 B2 | 1/2006 | Hunter | |
| 7,016,532 B2 | 3/2006 | Boncyk et al. | |
| 7,016,899 B1 | 3/2006 | Stern et al. | |
| 7,058,510 B2 | 6/2006 | Kelly et al. | |
| 7,101,284 B2 | 9/2006 | Kake et al. | |
| 7,155,243 B2 | 12/2006 | Baldwin et al. | |
| 7,156,311 B2 | 1/2007 | Attia et al. | |
| 7,174,031 B2 | 2/2007 | Rhoads et al. | |
| 7,206,820 B1 | 4/2007 | Rhoads et al. | |
| 7,245,929 B2 | 7/2007 | Henderson | |
| 7,296,747 B2 | 11/2007 | Rohs | |
| 7,309,015 B2 | 12/2007 | Frantz et al. | |
| 7,367,514 B2 | 5/2008 | Soule et al. | |
| 7,548,915 B2* | 6/2009 | Ramer et al. | 705/14.54 |
| 7,606,741 B2* | 10/2009 | King et al. | 705/27.2 |
| 7,656,291 B2* | 2/2010 | Rochelle et al. | 340/539.13 |
| 7,885,275 B2 | 2/2011 | Frifeldt et al. | |
| 7,953,211 B2 | 5/2011 | Radziewicz et al. | |
| 7,958,081 B2* | 6/2011 | Fitzpatrick et al. | 1/1 |
| 7,974,874 B2 | 7/2011 | Bosarge et al. | |
| 7,990,556 B2 | 8/2011 | King et al. | |
| 8,005,720 B2 | 8/2011 | King et al. | |
| 8,005,831 B2 | 8/2011 | Hull et al. | |
| 8,069,168 B2* | 11/2011 | Fitzpatrick et al. | 707/732 |
| 2002/0026359 A1 | 2/2002 | Long et al. | |
| 2002/0032597 A1 | 3/2002 | Chanos | |
| 2002/0035536 A1 | 3/2002 | Gellman | |
| 2002/0035697 A1 | 3/2002 | Mccurdy et al. | |
| 2002/0065717 A1 | 5/2002 | Miller et al. | |
| 2002/0075298 A1 | 6/2002 | Schena et al. | |
| 2002/0120507 A1 | 8/2002 | Chanos et al. | |
| 2002/0123921 A1 | 9/2002 | Frazier | |
| 2002/0156866 A1 | 10/2002 | Schneider | |
| 2002/0161636 A1 | 10/2002 | Takahashi et al. | |
| 2002/0194061 A1* | 12/2002 | Himmel et al. | 705/14 |
| 2003/0016844 A1 | 1/2003 | Numaoka | |
| 2003/0087650 A1 | 5/2003 | Aarnio | |
| 2003/0104820 A1 | 6/2003 | Greene et al. | |
| 2003/0115102 A1 | 6/2003 | Mothwurf | |
| 2003/0120555 A1 | 6/2003 | Kitagawa | |
| 2003/0132298 A1 | 7/2003 | Swartz et al. | |
| 2003/0142753 A1 | 7/2003 | Gunday | |
| 2003/0158796 A1 | 8/2003 | Balent | |
| 2003/0167412 A1 | 9/2003 | Takauji et al. | |
| 2003/0229678 A1 | 12/2003 | Wen et al. | |
| 2004/0073574 A1* | 4/2004 | Shimizu et al. | 707/104.1 |
| 2004/0236791 A1 | 11/2004 | Kinjo | |
| 2005/0004897 A1 | 1/2005 | Lipson | |
| 2005/0010860 A1 | 1/2005 | Weiss et al. | |
| 2005/0011957 A1* | 1/2005 | Attia et al. | 235/462.46 |
| 2005/0013462 A1 | 1/2005 | Rhoads | |
| 2005/0039092 A1 | 2/2005 | Soule et al. | |
| 2005/0044179 A1 | 2/2005 | Hunter | |
| 2005/0075940 A1 | 4/2005 | Deangelis | |
| 2005/0082370 A1 | 4/2005 | Frantz et al. | |
| 2005/0144562 A1 | 6/2005 | Schena et al. | |
| 2005/0226152 A1 | 10/2005 | Stephens et al. | |
| 2005/0240580 A1* | 10/2005 | Zamir et al. | 707/4 |
| 2005/0242189 A1 | 11/2005 | Rohs | |
| 2005/0261990 A1 | 11/2005 | Gocht et al. | |
| 2005/0289182 A1 | 12/2005 | Pandian et al. | |
| 2006/0029296 A1 | 2/2006 | King et al. | |
| 2006/0065733 A1 | 3/2006 | Lee et al. | |
| 2006/0067593 A1 | 3/2006 | Erol et al. | |
| 2006/0072165 A1 | 4/2006 | Erol et al. | |
| 2006/0072505 A1 | 4/2006 | Carrillo et al. | |
| 2006/0075026 A1 | 4/2006 | Ryu et al. | |
| 2006/0114337 A1 | 6/2006 | Rothschild | |
| 2006/0114338 A1 | 6/2006 | Rothschild | |
| 2006/0114514 A1 | 6/2006 | Rothschild | |
| 2006/0136546 A1 | 6/2006 | Trioano et al. | |
| 2006/0161562 A1 | 7/2006 | McFarland et al. | |
| 2006/0224797 A1* | 10/2006 | Parish et al. | 710/62 |
| 2006/0227671 A1 | 10/2006 | Tobita et al. | |
| 2006/0229058 A1 | 10/2006 | Rosenberg | |
| 2006/0252501 A1 | 11/2006 | Little et al. | |
| 2006/0252526 A1* | 11/2006 | Walker et al. | 463/29 |
| 2006/0264209 A1 | 11/2006 | Atkinson et al. | |
| 2007/0008621 A1 | 1/2007 | Satoh et al. | |
| 2007/0030365 A1 | 2/2007 | Jerdev | |
| 2007/0036371 A1 | 2/2007 | Buil et al. | |
| 2007/0038516 A1 | 2/2007 | Apple et al. | |
| 2007/0046982 A1 | 3/2007 | Hull et al. | |
| 2007/0061838 A1* | 3/2007 | Grubbs et al. | 725/35 |
| 2007/0066291 A1 | 3/2007 | Silverbrook et al. | |
| 2007/0073585 A1 | 3/2007 | Apple et al. | |
| 2007/0086268 A1 | 4/2007 | Ackley et al. | |
| 2007/0091376 A1* | 4/2007 | Calhoon et al. | 358/3.28 |
| 2007/0098172 A1 | 5/2007 | Levy et al. | |
| 2007/0123219 A1 | 5/2007 | Lovell | |
| 2007/0123280 A1 | 5/2007 | Mcgary et al. | |
| 2007/0155411 A1 | 7/2007 | Morrison | |
| 2007/0156517 A1 | 7/2007 | Kaplan et al. | |
| 2007/0181691 A1 | 8/2007 | Chang | |
| 2007/0203945 A1 | 8/2007 | Louw | |
| 2007/0214039 A1 | 9/2007 | Hoyt | |
| 2007/0226051 A1* | 9/2007 | Addepalli et al. | 705/14 |
| 2007/0239724 A1* | 10/2007 | Ramer et al. | 707/10 |
| 2008/0195456 A1* | 8/2008 | Fitzpatrick et al. | 705/9 |
| 2008/0200153 A1* | 8/2008 | Fitzpatrick et al. | 455/414.1 |
| 2008/0201078 A1* | 8/2008 | Fitzpatrick et al. | 701/302 |
| 2008/0201283 A1* | 8/2008 | Fitzpatrick et al. | 706/21 |
| 2008/0201305 A1* | 8/2008 | Fitzpatrick et al. | 707/3 |
| 2008/0201321 A1* | 8/2008 | Fitzpatrick et al. | 707/5 |
| 2008/0260257 A1 | 10/2008 | Rose | |
| 2008/0292193 A1 | 11/2008 | Bigioi et al. | |
| 2009/0022369 A1 | 1/2009 | Satoh et al. | |
| 2009/0240569 A1* | 9/2009 | Ramer et al. | 705/10 |
| 2009/0271283 A1 | 10/2009 | Fosnacht et al. | |
| 2009/0271683 A1 | 10/2009 | Costa et al. | |
| 2010/0063877 A1* | 3/2010 | Soroca et al. | 705/14.45 |
| 2010/0082431 A1* | 4/2010 | Ramer et al. | 705/14.52 |
| 2010/0153211 A1* | 6/2010 | Ramer et al. | 705/14.52 |

| | | | | |
|---|---|---|---|---|
| 2010/0217663 A1* | 8/2010 | Ramer et al. .............. 705/14.42 | WO WO2004/090803 | 10/2004 |
| 2010/0306318 A1* | 12/2010 | Fitzpatrick et al. ........... 709/206 | WO WO2004/105405 | 12/2004 |
| 2011/0098112 A1 | 4/2011 | LeBoeuf et al. | | |
| 2011/0208736 A1* | 8/2011 | Fitzpatrick et al. ........... 707/736 | | |
| 2011/0246070 A1* | 10/2011 | Fitzpatrick et al. ........... 701/300 | | |
| 2011/0258156 A1* | 10/2011 | Fitzpatrick et al. ............. 706/50 | | |
| 2012/0084285 A1* | 4/2012 | Fitzpatrick et al. ........... 707/732 | | |

FOREIGN PATENT DOCUMENTS

| | | |
|---|---|---|
| WO | WO00/43862 | 7/2000 |
| WO | WO00/70585 | 11/2000 |
| WO | WO01/08071 | 2/2001 |
| WO | WO2004/080097 | 9/2004 |

OTHER PUBLICATIONS

International Search Report and Written Opinion, PCT/US07/79952, dated Aug. 7, 2008.

International Search Report and Written Opinion, PCT/US08/54423, dated Jul. 25, 2008.

International Search Report and Written Opinion, PCT/US08/86682, dated Apr. 16, 2009.

* cited by examiner

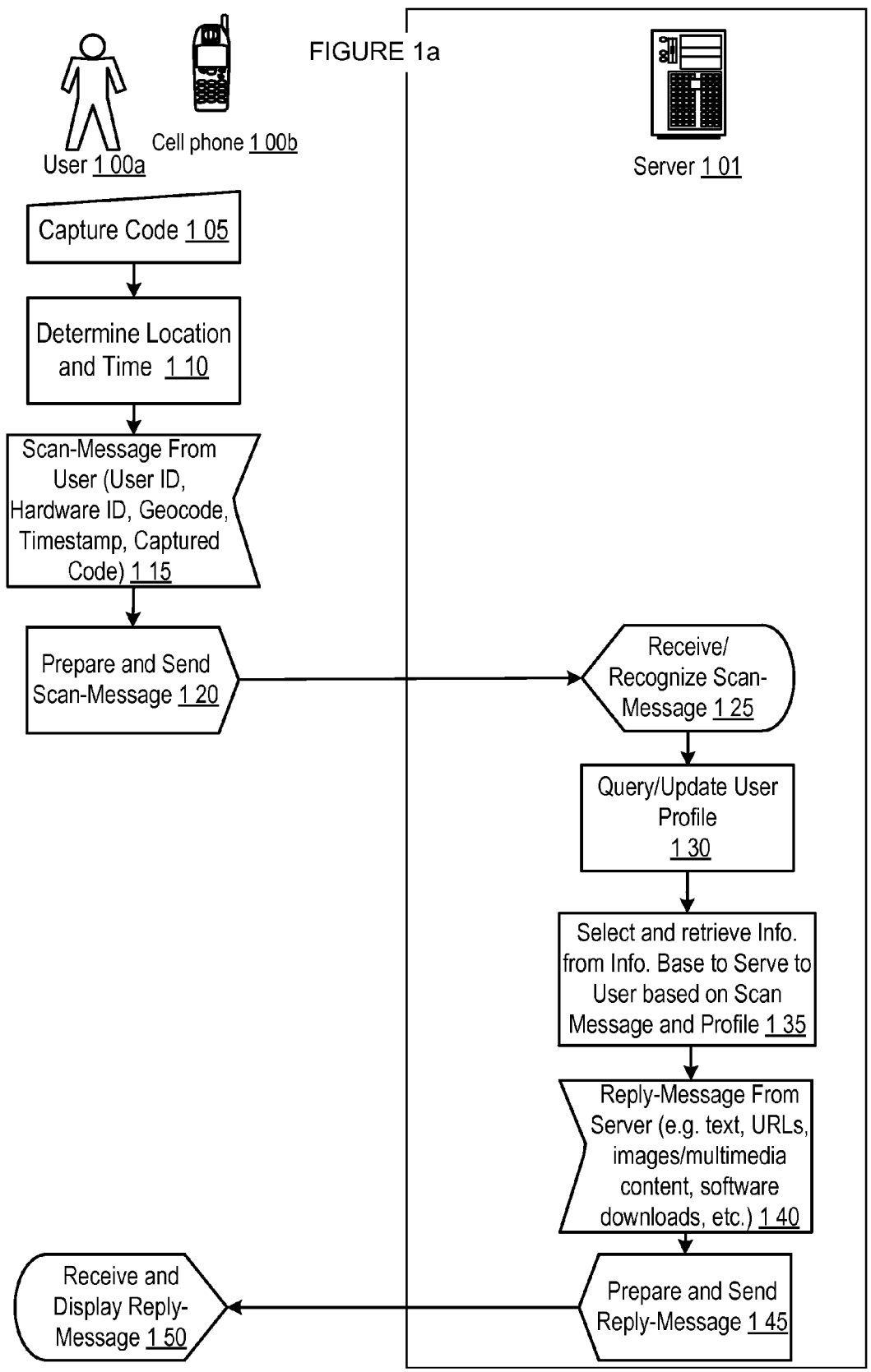

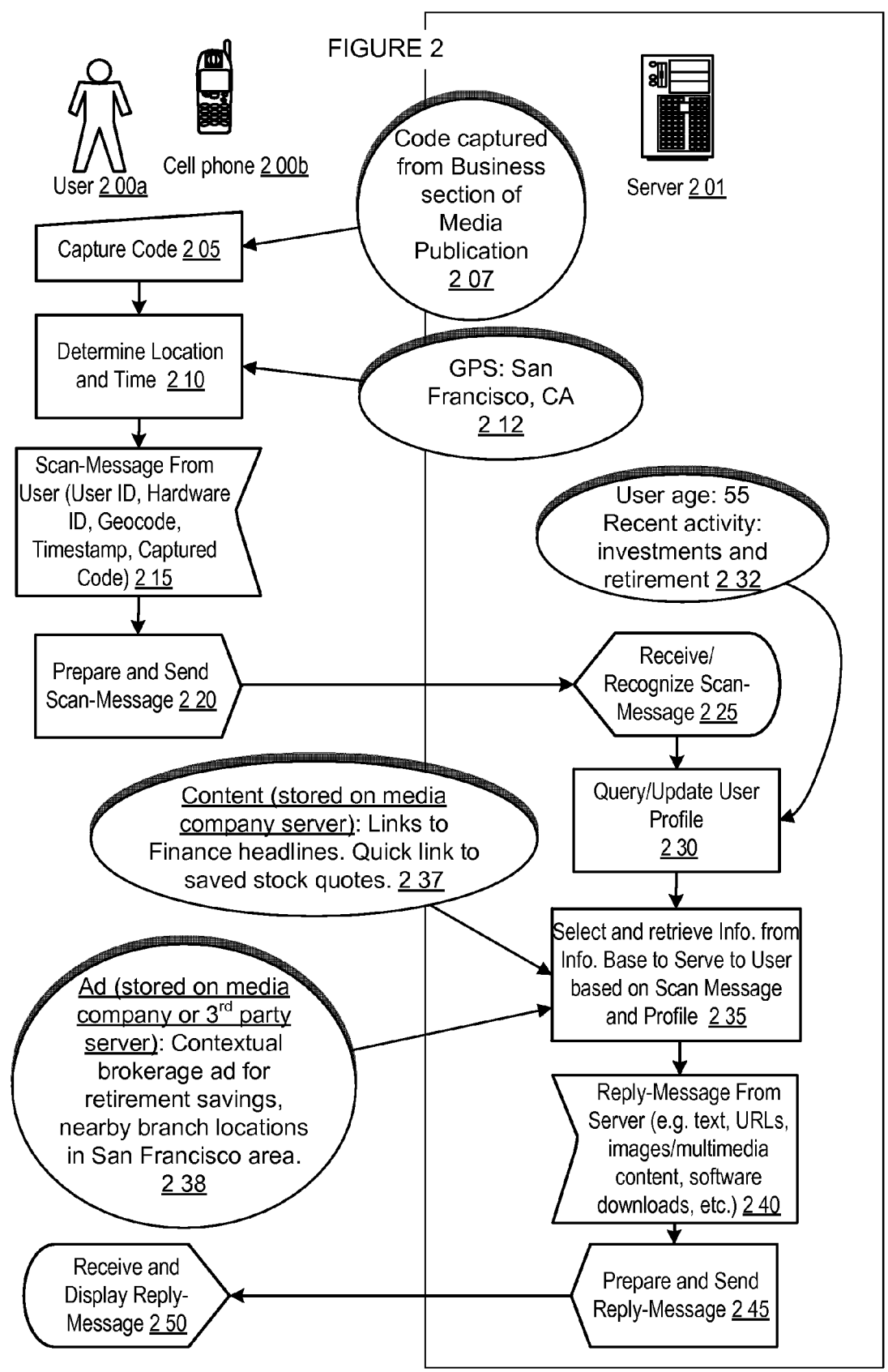

FIGURE 4

User Sign-Up and Account Preferences 4 00

Basic Info 4 05

| | |
|---|---|
| Choose a member ID: | |
| Choose a password: | |
| Re-enter password: | |
| Secret Question: | |
| Secret Answer: | |
| Email Address: | |

← 4 25

Device Info 4 10

| | |
|---|---|
| Mobile Phone Carrier: | |
| Phone Manufacturer & Model: | |
| Operating System: | |

Demographics 4 15

| | |
|---|---|
| Gender: | |
| Year of Birth: | |
| ZIP Code: | |
| Country of Residence: | |
| Household Income: | |
| Job Title: | |
| Industry: | |

Content Preferences 4 20

| | |
|---|---|
| Interests: | |
| Subscriptions: | |
| Content Delivery options: | |
| Personal history options: | |
| Cache options: | |
| Geo-Tracking options: | |
| Ad delivery options: | |

FIGURE 5a
5 00
QR Code, Denso-Wave (Japan)
5 05
Mcode, Nextcode (USA)
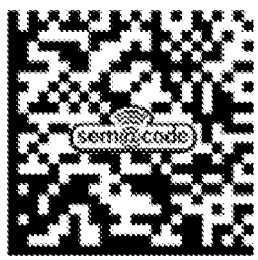
5 10
Semacode, Semacode (Canada)

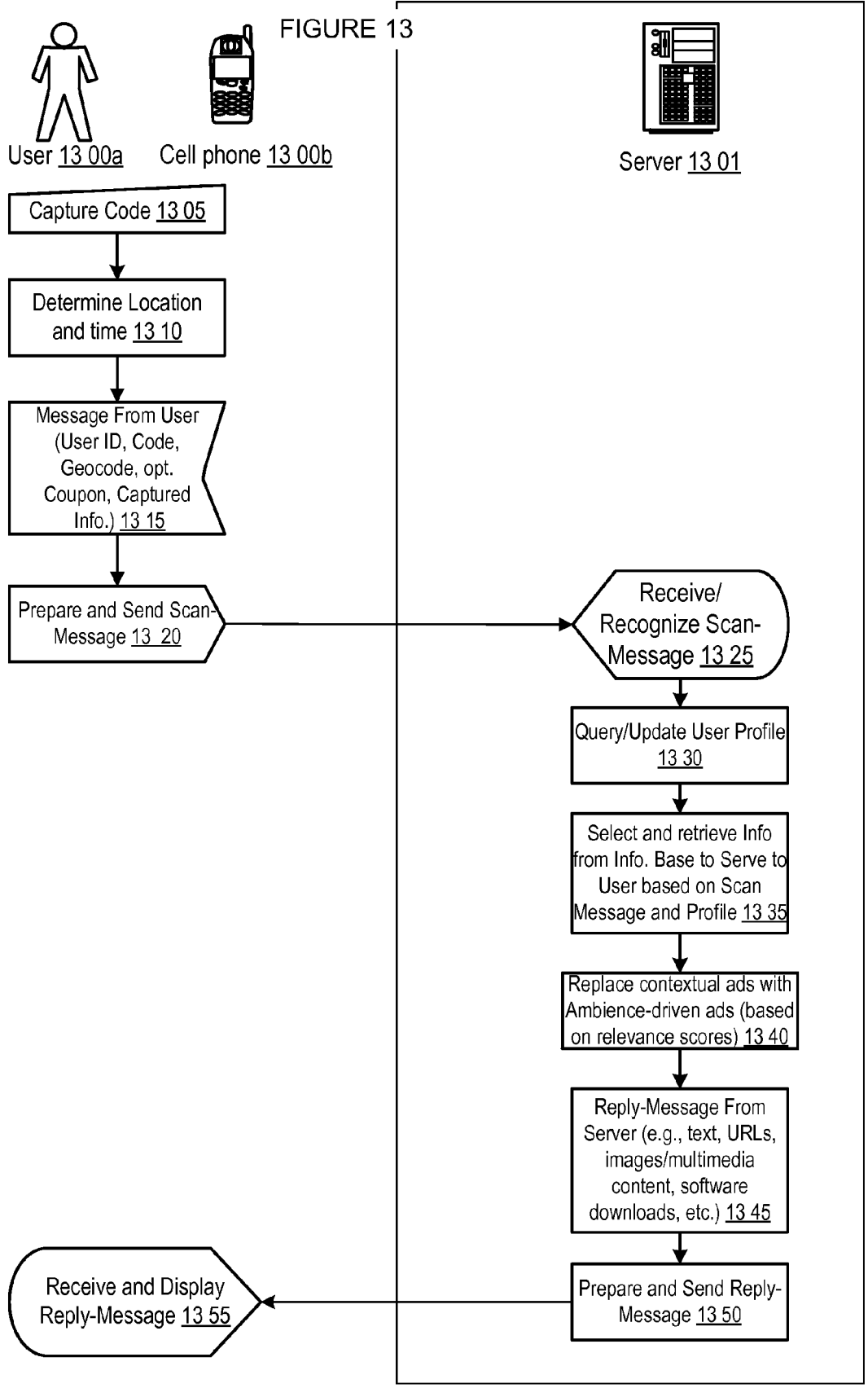

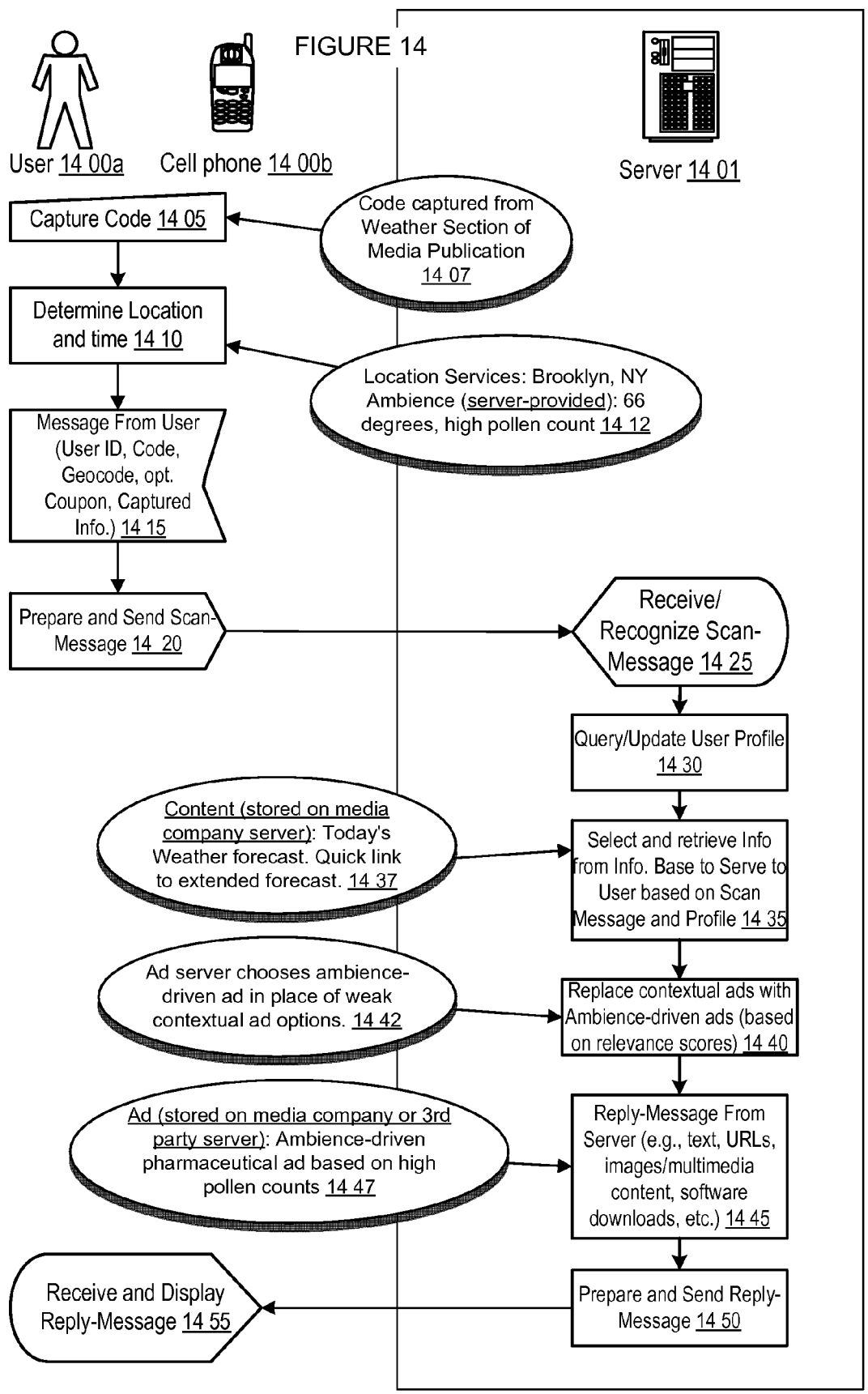

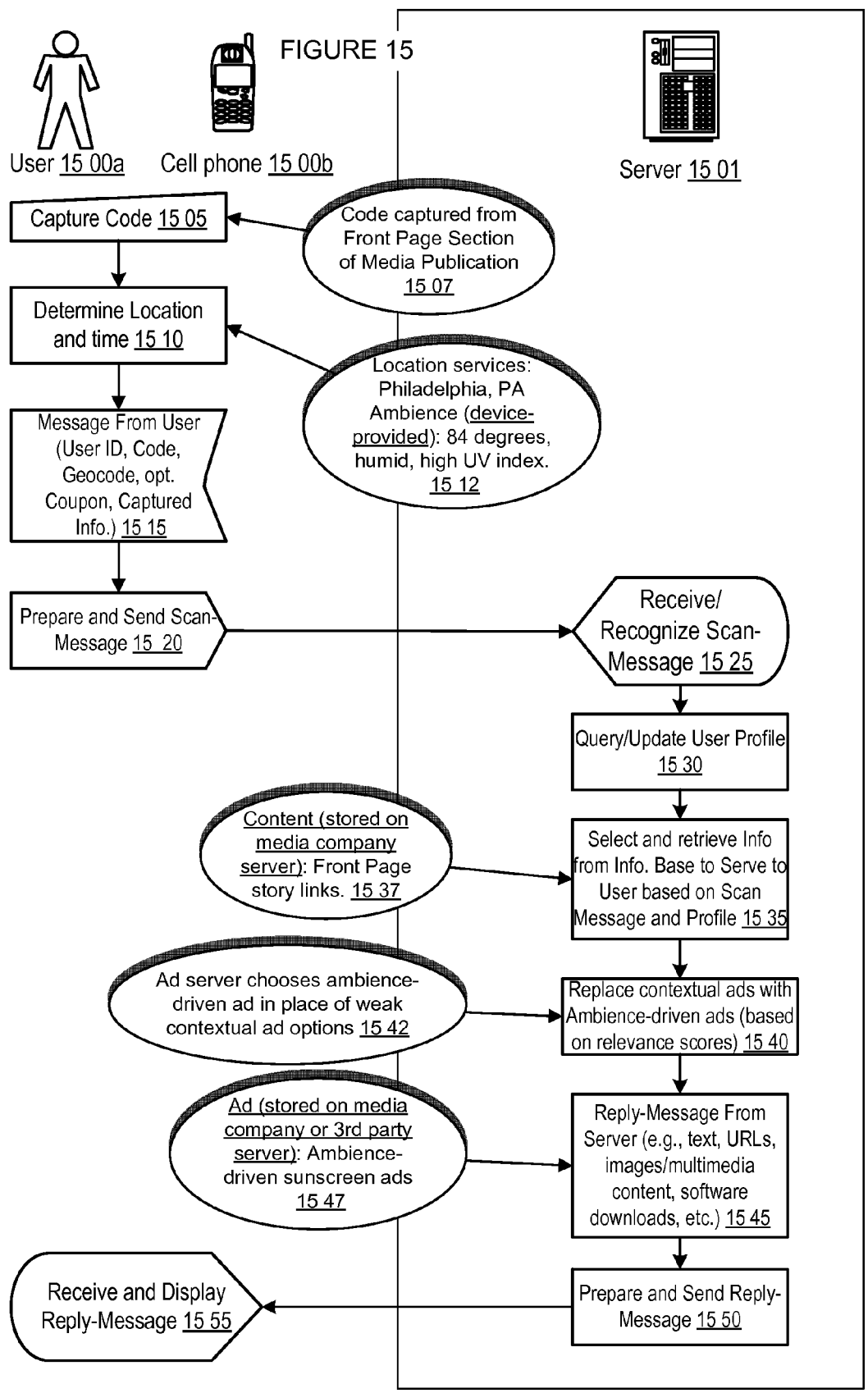

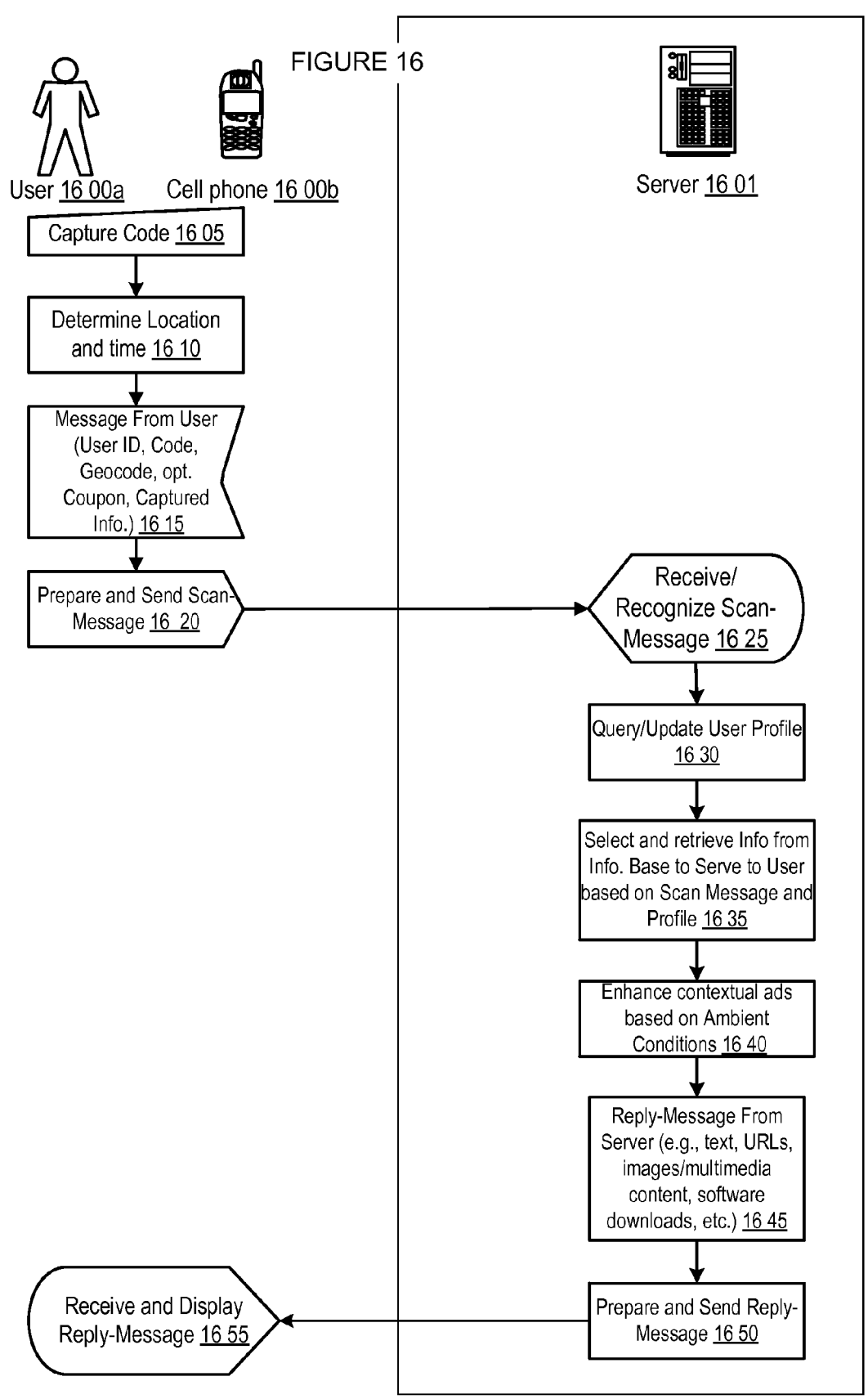

APPARATUSES, METHODS AND SYSTEMS FOR DETERMINING AND ANNOUNCING PROXIMITY BETWEEN TRAJECTORIES

PRIORITY CLAIMS AND RELATED APPLICATIONS

This disclosure describes inventive aspects of at least eight distinct inventions, including:

information querying and serving on mobile devices based on ambient conditions (with a suggested Class/Subclass of 707/10);

code-triggered information querying and serving on mobile devices based on profiles (with a suggested Class/Subclass of 709/206);

anticipatory information querying and serving on mobile devices based on profiles (with a suggested Class/Subclass of 709/217);

coordinating personnel based on profiles (with a suggested Class/Subclass of 705/9);

determining and announcing proximity between trajectories (with a suggested Class/Subclass of 701/302);

information querying and serving in a virtual world based on profiles (with a suggested Class/Subclass of 463/42);

information querying and serving on the internet based on profiles (with a suggested Class/Subclass of 705/14); and ambiguous code-triggered information querying and serving on mobile devices (with a suggested Class/Subclass of 235/494).

The instant application details matter directed to determining and announcing proximity between trajectories (suggested class/subclass: 701/302). However, in order to develop a reader's understanding of the invention(s), the descriptions of the other invention(s) have been compiled into a single disclosure to illustrate and clarify how aspects of these inventions operate independently, interoperate as between individual inventions, and/or cooperate collectively. The disclosure goes on to further describe the interrelations and synergies as between any of the various inventions within the context of an overarching inventive system; all of which is to further ensure compliance with 35 U.S.C. §112.

This application is a continuation of U.S. application Ser. No. 11/864,799, filed Sep. 28, 2007. The application Ser. No. 11/864,799 is incorporated herein by reference for all purposes. The application Ser. No. 11/864,799 claims priority under 35 USC §119 for U.S. provisional patent application Ser. No. 60/827,381 filed Sep. 28, 2006, entitled "APPARATUSES, METHODS AND SYSTEMS FOR CODE TRIGGERED INFORMATION QUERYING AND SERVING;" U.S. provisional patent application Ser. No. 60/828,959 filed Oct. 10, 2006, entitled "METHOD FOR INFORMATION QUERYING AND SERVING ON MOBILE DEVICES BASED ON AMBIENT CONDITIONS;" U.S. provisional patent application Ser. No. 60/828,962 filed Oct. 10, 2006, entitled "METHOD FOR CODE-TRIGGERED INFORMATION QUERYING AND SERVING ON MOBILE DEVICES BASED ON PROFILES;" U.S. provisional patent application Ser. No. 60/828,970 filed Oct. 10, 2006, entitled "METHOD FOR ANTICIPATORY INFORMATION QUERYING AND SERVING ON MOBILE DEVICES BASED ON PROFILES;" U.S. provisional patent application Ser. No. 60/828,969 filed Oct. 10, 2006, entitled "METHOD FOR COORDINATING PERSONNEL BASED ON PROFILES;" U.S. provisional patent application Ser. No. 60/828,967 filed Oct. 10, 2006, entitled "METHOD FOR DETERMINING AND ANNOUNCING PROXIMITY BETWEEN TRAJECTORIES;" U.S. provisional patent application Ser. No. 60/828,968 filed Oct. 10, 2006, entitled "METHOD FOR INFORMATION QUERYING AND SERVING IN A VIRTUAL WORLD BASED ON PROFILES;" and U.S. provisional patent application Ser. No. 60/828,965 filed Oct. 10, 2006, entitled "METHOD FOR INFORMATION QUERYING AND SERVING ON THE INTERNET BASES ON PROFILES."

This application is also related to co-pending Patent Cooperation Treaty patent application serial no. PCT/US07/79952 filed Sep. 28, 2007, entitled "APPARATUS, METHOD AND SYSTEM FOR CODE TRIGGERED INFORMATION QUERYING AND SERVING;" U.S. non-provisional patent application Ser. No. 11/864,745 filed Sep. 28, 2007, entitled "APPARATUSES, METHODS AND SYSTEMS FOR INFORMATION QUERYING AND SERVING ON MOBILE DEVICES BASED ON AMBIENT CONDITIONS," now U.S. Pat. No. 7,958,081; U.S. non-provisional patent application Ser. No. 11/864,758 filed Sep. 28, 2007, entitled "APPARATUSES, METHODS AND SYSTEMS FOR CODE-TRIGGERED INFORMATION QUERYING AND SERVING ON MOBILE DEVICES BASED ON PROFILES;" U.S. non-provisional patent application Ser. No. 11/864,772 filed Sep. 28, 2007, entitled "APPARATUSES, METHODS AND SYSTEMS FOR ANTICIPATORY INFORMATION QUERYING AND SERVING ON MOBILE DEVICES BASED ON PROFILES;" U.S. non-provisional patent application Ser. No. 11/864,790 filed Sep. 28, 2007, entitled "APPARATUSES, METHODS AND SYSTEMS FOR COORDINATING PERSONNEL BASED ON PROFILES;" U.S. non-provisional patent application Ser. No. 11/864,807 filed Sep. 28, 2007, entitled "APPARATUSES, METHODS AND SYSTEMS FOR INFORMATION QUERYING AND SERVING IN A VIRTUAL WORLD BASED ON PROFILES," now U.S. Pat. No. 8,069,168; U.S. non-provisional patent application Ser. No. 11/864,814 filed Sep. 28, 2007, entitled "APPARATUSES, METHODS AND SYSTEMS FOR INFORMATION QUERYING AND SERVING ON THE INTERNET BASED ON PROFILES," now U.S. Pat. No. 8,069,169; and U.S. non-provisional patent application Ser. No. 11/864,821 filed Sep. 28, 2007, entitled "APPARATUSES, METHODS AND SYSTEMS FOR AMBIGUOUS CODE-TRIGGERED INFORMATION QUERYING AND SERVING ON MOBILE DEVICES."

The entire contents of the aforementioned applications are herein expressly incorporated by reference.

FIELD

The present disclosure is directed generally to apparatuses, methods, and systems for marketing and information dissemination, and more particularly, to apparatuses, methods and systems for determining and announcing proximity between trajectories.

BACKGROUND

In recent years, the proliferation of mobile consumer electronic and wireless networking technology has allowed the development of a host of business methods that incorporate Global Positioning System (GPS) location awareness for mobile devices. In addition, various advertising systems, such as Google's AdSense, allow advertisers to place advertisements in contexts with which consumers are interested. Information encoding symbologies, such as barcodes, data matrices, or Radio Frequency Identification (RFID) tags, as well as the technology to decode them have come about.

SUMMARY

The present disclosure is directed to apparatuses, methods and systems for determining and announcing proximity between trajectories. Existing schemes fail to take full advantage of the tracking and context targeting possibilities enabled by the present disclosure. In particular, they do not allow tracking and proximity notification that is targeted to the individual consumer's characteristic profile, behavioral patterns, and present contextual surroundings. As such, this disclosure details a code triggered information server (CTIS) that tracks users and notifies them of proximity with other users based on user activities, such as may be registered by codes scanned by mobile devices, web links selected on a computer, or decisions made in a virtual world. For example, a recorded history of scanned barcodes, as well as the time and location of each scan, may be analyzed to determine where a user has been and what they were interested in scanning at the time. Based on such a record, a prediction of a user's likely location may be made. Then, intersections or near-misses for such predicted trajectories between different users may be determined and reported. The CTIS may also incorporate user characteristics and interests.

As the first proximity notification system with geographic, context, and behavioral specificity based on user profiles, the CTIS is designed to analyze user behavioral patterns in order to statistically derive user trajectories and tracking information. In one embodiment, the CTIS is designed to compare expected user space-time trajectories to determine when two or more users are likely to be within a specified distance of each other at a given time. In another embodiment, the CTIS is designed to compare expected user web-surfing habits to determine when two or more users are likely to be on the same website, or within a specified number of links from each other, at a given time. In another embodiment, the CTIS is designed to compare expected user trajectories within a virtual world to determine when two or more users are likely to be within a specified virtual distance from each other within the virtual world. In another embodiment, the CTIS provides rapid and evolving geographic and historical statistical profiling of user activity.

BRIEF DESCRIPTION OF THE DRAWINGS

The accompanying appendices and/or drawings illustrate various non-limiting, example, inventive aspects in accordance with the present disclosure:

FIGS. 1a-b show combined logic and data flow block diagram illustrating a general overview of embodiments of the CTIS;

FIG. 2 shows a particular, exemplary embodiment of the CTIS, wherein contextual information and advertising is served to the user related to a news article in the business section of a media publication;

FIG. 4 shows an embodiment of the web interface for user registration;

FIGS. 5a-c show three types of 2D barcodes that may be employed within the CTIS and logic flow for code enhancement in one embodiment of CTIS operation;

FIG. 13 shows a combined logic and data flow block diagram for an embodiment of the CTIS wherein contextual Ads are replaced by Ads based on ambient conditions;

FIG. 14 shows a combined logic and data flow block diagram for a particular exemplary embodiment of the CTIS in which allergy medication Ads are served in response to a high pollen count;

FIG. 15 shows a combined logic and data flow block diagram for a particular exemplary embodiment of the CTIS in which sunscreen Ads are served in response to heat and high UV levels;

FIG. 16 shows a combined logic and data flow block diagram for an embodiment of the CTIS wherein the selection of contextual Ads is influenced by ambient conditions;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In one embodiment, the disclosed CTIS employs two basic actors: (i) a user (100a) capable of registering interest in an activity, transmitting and receiving data, and displaying information; and (ii) a server (101) capable of communicating with the user, storing/updating user profiles, and selecting information to serve to the user. In addition to the two basic actors, the CTIS enables the creation of two types of transactional articles: i) Scan Messages (115) and ii) Reply Messages (145). The CTIS provides context-specific Reply Messages in response to Scan Messages, which are prepared in response to the registration of activity interest by the user, in order to supply information and/or advertising to the user. The CTIS generates Reply Messages by processing Scan Message content with user profile information, containing basic profiling data as well as a history of Scan Messages supplied by a given user. As such, Reply Messages are transactional articles that heighten a provider's opportunity to supply relevant and targeted information and/or advertising to the user that is both context and user specific. Without loss of generality, we will heretofore refer to the information and/or advertising content of Reply Messages as "Ads". The CTIS may also elect to send context and user-specific Reply Messages based solely on the user profile, without the user having recently registered activity interest, if it is determined from the user's profile, particularly the history of Scan Messages, that a particular Ad is appropriate.

In one embodiment, users of the CTIS scan codes to register interest and the CTIS acts as a portal for consumers to access information supplemental to the context in which the codes are found. Users may scan codes found in media publications, on billboards or signs, on consumer products or packages, on websites or television screens, and/or the like. In doing so, the users may identify themselves via an identification code specific to the mobile device and service account with which the scan is made. At the same time, the scanned code can be recorded, as well as the time of day and user location; such information may form the basis of consumer profiles that may be saved by the CTIS. As these scans are indicative of interest in various subjects, goods, and/or services, they may serve as a basis for an individual customer tracking system. As such, advertisers can finely tune and efficiently tailor their efforts towards achieving maximum return on the advertising expenditure.

Code Triggered Information Server Basic Overview

Figure 7:
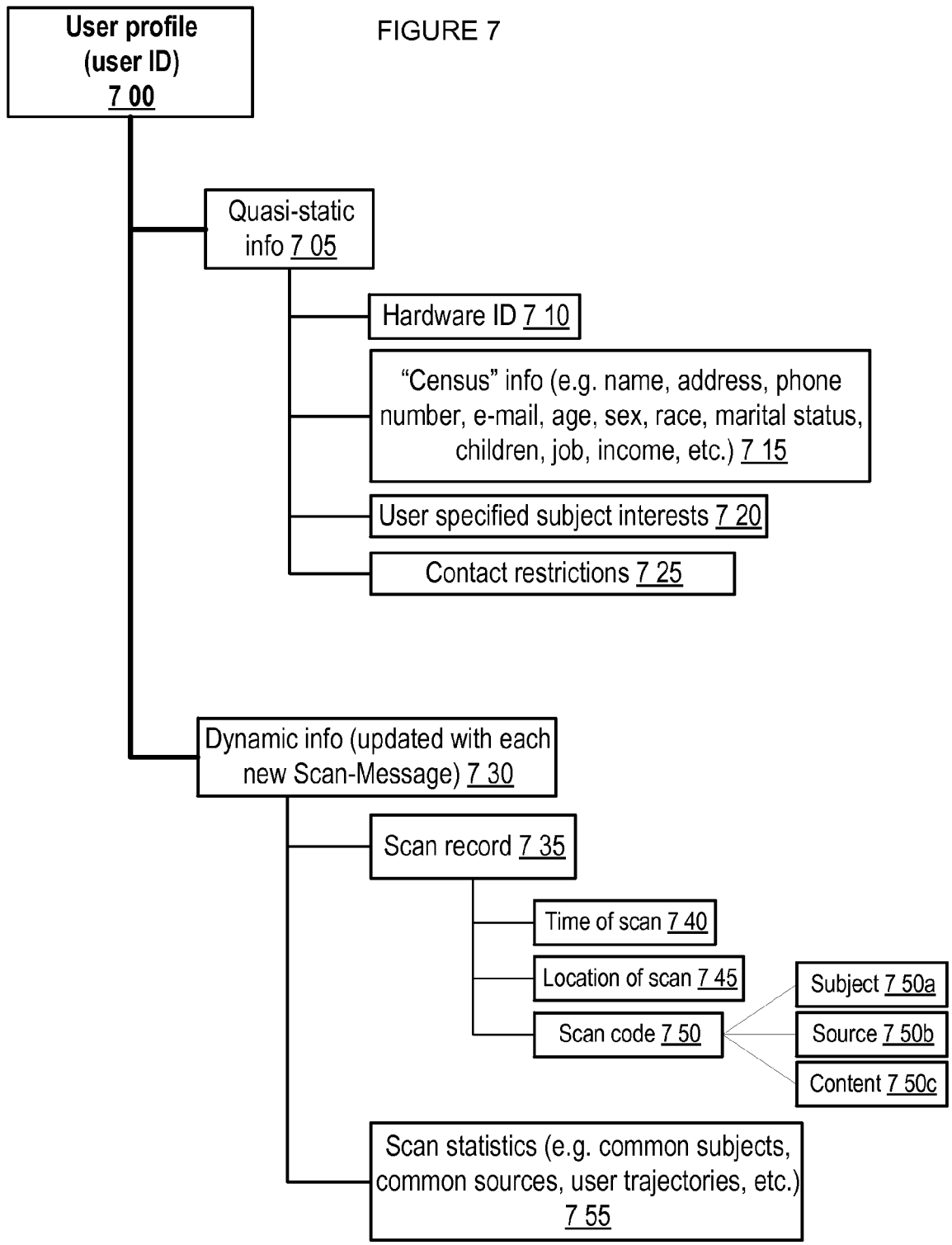
FIG. 7 shows an illustration of one embodiment of the use profile data structure.

FIG. 1a shows a combined logic and data flow block diagram illustrating a general overview of the CTIS in one embodiment. The CTIS may be configured so that a user (100a) may scan a digital code (105) with a scanning device (100b), as for example by using a cell phone camera to scan and/or take a picture of a barcode, 2d code, matrix code, data matrix, QR code, or other such symbology. An example of a mobile device and software capable of such code capture is the Nokia 6600 cellular telephone equipped with ConnexTo software. Alternatively, the CTIS may be triggered by the user selecting an internet link (such as on an internet enabled mobile device), by making decisions within a virtual world (such as a massively multiplayer online game), and/or the like. Without loss of generality, all such forms of interest-registering CTIS triggering will be referred to as "code scanning" The time and location (as determined by GPS, GPRS, or other such geo-positioning technologies) of the mobile device are determined (110), and a Scan Message (115) is generated containing a user identification (ID), a hardware ID that identifies the type of mobile device being used, a geocode (location of the device), a timestamp, and the scanned code (see. FIG. 4 and discussion of Scan Message below). Additional user-input information may also be supplied at this point. The Scan Message is packaged and sent (120) to a server (101) that receives and recognizes it (125). The user's profile, specific to the supplied user ID, is updated with the new Scan Message (i.e., it is added as a transaction to their profile transaction history) and queried (130) for information to use in the preparation of a Reply Message (140) that is also based on the content of the current Scan Message. The server selects (135) the Ad content (see FIG. 7) of the Reply Message (145) from an Information Base and sends it to the user's mobile display device, which displays the pertinent content to the user (150).

In one implementation, the Scan Message and/or scanned code may be sent to the server (101) by a Multimedia Messaging Service (MMS) protocol. In other implementations, a wide variety of other communication protocols may be employed, including but not limited to: Short Messaging Service (SMS), instant messaging, web browser based messaging, email, Enhanced Messaging System (EMS), TCP/IP, WAP, and/or the like.

In one implementation, the server (101) may be addressed by a short code, short numbers, Common Short Code (CSC), and/or the like for sending the Scan Message and/or scanned code. For example, a short code may appear alongside a code in a print publication, and a user may be informed that the scanned code should be sent to the indicated short code number in order to retrieve a Reply Message, advertisement, coupon, and/or the like. In other implementations, other addressing means may be employed, such as an ordinary telephone number, an email address, a universal resource locater (URL), and/or the like. In another implementation, the short code and/or other server address may be encoded within part of the code itself. When the user scans the code with his or her mobile device, the code may be partially decoded by the client device to extract the address and automatically send the rest of the code thereto.

Figure 1B:
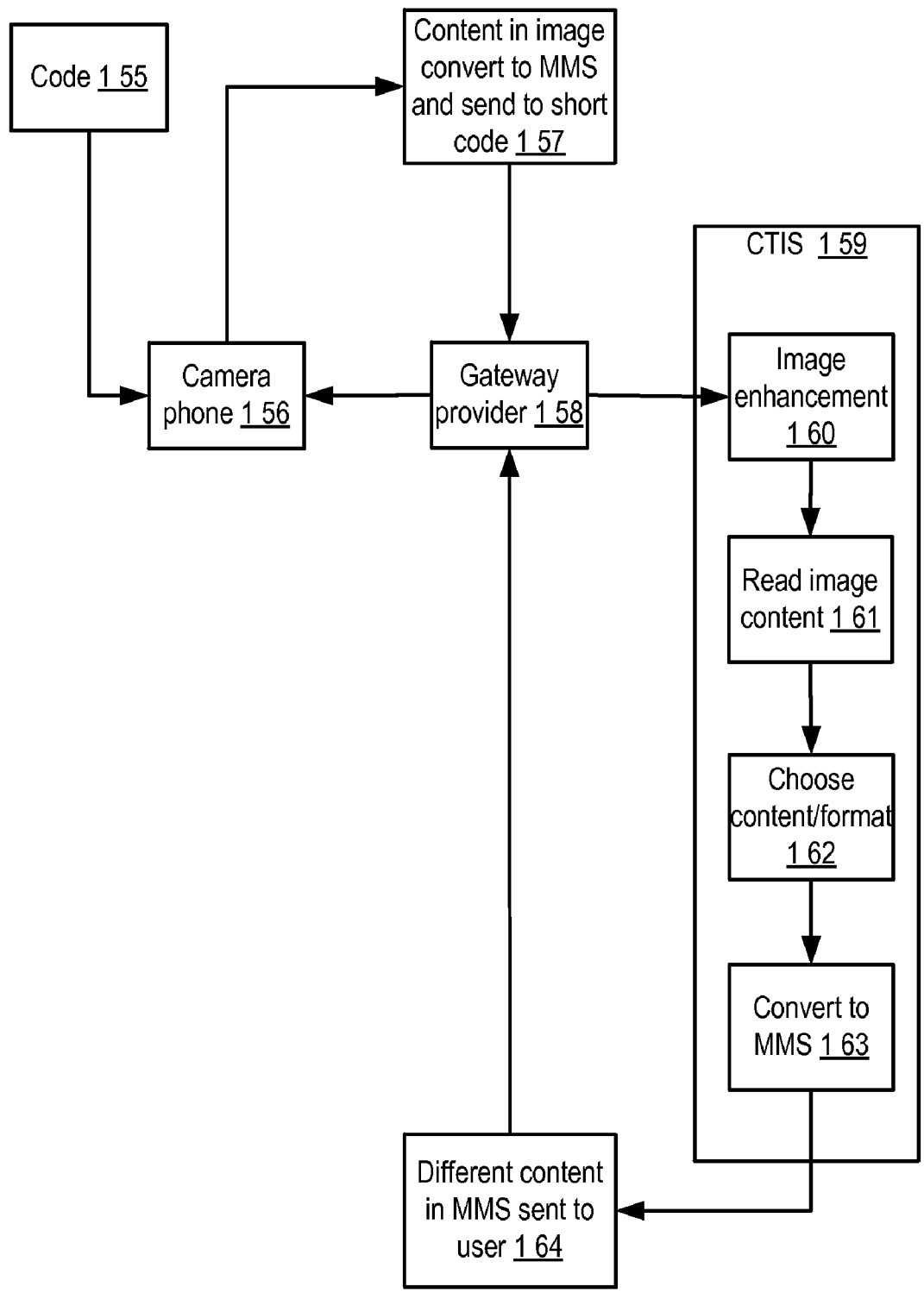
Figure 9:
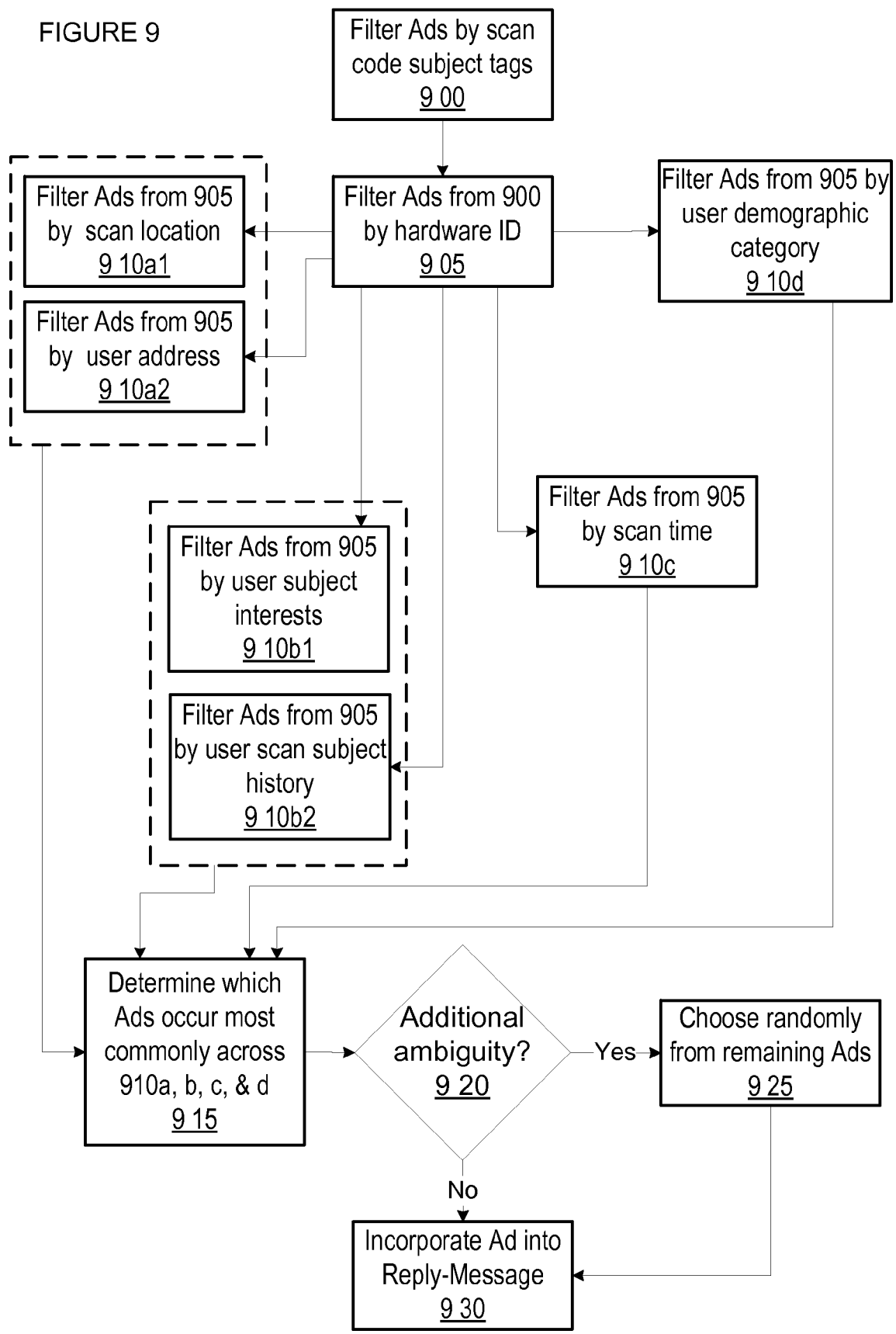
FIG. 9 shows a logic flow diagram of one embodiment of the user profile query heuristic.

FIG. 1b shows an implementation of combined logic and data flow in another embodiment of CTIS operation. A code (155) is scanned by a camera phone (156), and the resulting image content is converted to an MMS format to be sent via short code (157) through a gateway provider (158) to the CTIS (159) server. At the server, the image information may be enhanced, manipulated, and/or otherwise processed (160) so as to aid in determining the appropriate content to serve in response. After enhancement, the image content is read (161) and the content and format for the appropriate response is determined (162) (see, e.g., FIGS. 9-11). A response message is formed in MMS format (163) and is sent (164) back to a gateway provider (158) to be served to the user's camera phone (156).

In an alternative implementation, the scanned code may be directly decoded on the client mobile device instead of on the server. The decoded content may then be converted to MMS format and sent via short code to the server in order to retrieve the appropriate content associated with the code. That content may be returned from the server to the client mobile device by means of an MMS protocol as well.

For illustration, the CTIS is shown in FIG. 2 for a particular, exemplary embodiment: providing targeted and contextual information and advertising to the user related to a news article. Here, a user employs a cell phone to scan a code associated with an article in the Business section of a media publication (207), such as by using the phone's built in camera to photograph a 2D matrix code (e.g., QR code). The location of the scan (San Francisco, Calif.) is determined by the phone's built in GPS receiver (212), and this location is incorporated as a geocode, along with the user ID, the hardware ID of the particular type of device (e.g., cell phone) used, the time, and the code content, into a Scan Message. This is sent to a server via the cell phone's data connection (e.g., wireless internet systems such as 1xEV-DO), and the server queries a database of user profiles based on the supplied user ID in order to update the appropriate user profile with the content of the current Scan Message and to determine what, if any, information in the user profile may be relevant to the preparation of the current Reply Message. Here, the server recognizes that the user is 55 years of age and has recently been scanning articles and/or ads related to investments and retirement planning (232). In one embodiment, the user can supply a list of interests to be considered in addition to those culled from their scan history. The server selects the appropriate Ad content to include in the Reply Message, comprised in this case of links to Finance headlines, quick links to saved stock quotes (237), and a contextual brokerage advertisement (238), including information on branch locations in San Francisco (212) near the user. This reply is sent by the server to the user's mobile device which displays the appropriate message content.

Figure 3:
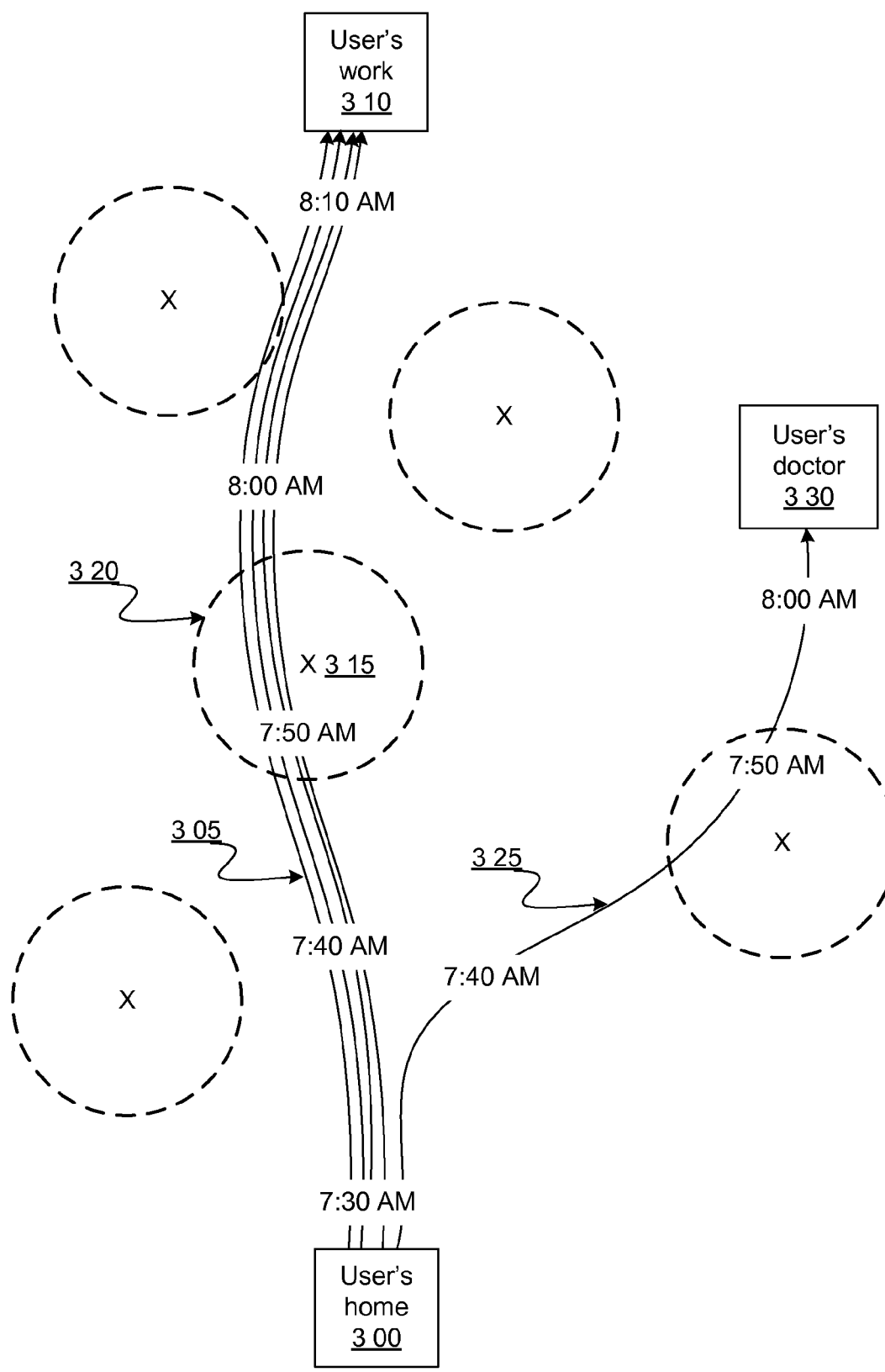
FIG. 3 shows user trajectories through a network of Ad provider zones.

In one embodiment, the CTIS can serve information to the user based on the collected knowledge of user space-time trajectories contained in the user profile, without the need for any initiating code scan. This embodiment is best illustrated by example, as drawn in FIG. 3. Here, a user rides a bus from home (300) to work (310) on four of the last five days, and takes a different bus to his doctor's office (330) on the remaining day. The space-time trajectories for the four work trips (305) and the one doctor trip (325) are determined by codes that the user scans with his cell phone from a newspaper during the bus rides. In this example, the user is assumed to scan a code every ten minutes starting at 7:30 AM until the destination is reached, and the geographic location of each scan is indicated by the position of the timestamp along each trajectory. In one embodiment, tracking occurs without scanning, simply by having the device send geocodes and timestamps by itself. Along the way to his destinations, the user passes a number of Ad providers (marked with X's) with Ad content in the CTIS Information Base, with dotted circles indicating the locus of points that are a distance of two miles from each provider. One Ad provider in particular (315), a gourmet coffee shop, is within two miles (320) of the user's space-time trajectory at 7:50 AM in four of the last five days. The user's profile also lists "coffee" as an interest, both based on user specifications during registration and on the user's advertisement and article scan record. Consequently, on the sixth day, the server supplies the user with an advertisement for the coffee shop (315) at 7:45 AM Code Triggered Information Server Detailed Overview User and Ad Provider Participation The CTIS is enabled by the participation of Ad providers and users. In one embodiment, Ad providers supply Ads for storage on the CTIS server. In an alternative embodiment, the Ads are stored on third party servers that are referenced by the CTIS server. The user experience may be enhanced by the incorporation of personal preferences and demographic information to optimize the targeting of Ad content. Consequently, one embodiment would incorporate a user registration procedure. Users may register for the CTIS via the internet, telephone, postal mail, and/or the like. If a particular embodiment of the CTIS requires client software for the user to install, this could be supplied upon successful user registration. FIG. 4 shows an exemplary embodiment of a user registration interface 400, wherein a user can input Basic Info 405 (e.g., member ID, password, secret question/answer, e-mail address, etc.), Device Info 410 (e.g., mobile phone carrier, phone manufacturer & model, operating system, etc.), Demographics 415 (e.g., gender, year of birth, zip code, country of residence, household income, job title, industry, etc.), and Content Preferences 420 (e.g., interests, subscriptions, content delivery options, personal history options, cache options, geo-tracking options, ad delivery options, etc.) in a plurality of fields 425. In an alternative embodiment, a basic user identification packet (e.g., a "cookie") is sent with a user's first code scan, thus establishing a basic user profile that can be filled in with greater detail at a later time.

Code Capture (105)

Scannable codes within the CTIS may be found in a variety of locations, including but not limited to newspaper and magazine articles, signs and billboards, flyers, store locations and kiosks, consumer products, packages, clothing, stickers, websites, software displays, television broadcasts, virtual worlds, and/or the like. The nature of the code and associated method with which the code can be scanned will depend to some extent on where the code is found, but among the possible types of codes are standard barcodes (e.g., UPC, EAN, Code 128, etc.), 2D matrix codes (e.g., QR code, Semacode, Data Glyphs, mCodes, etc.), user-input codes (e.g., text messages), RFID tags, pure images (e.g., an image of a sign to be analyzed by optical character recognition), website links, software inputs, and/or the like. These codes may be located on any medium (e.g., on newspapers, magazines, books, video content, computer screens, embedded in objects (e.g., RFID tags on clothes, etc.), and/or the like). One embodiment employs 2D matrix codes, examples of which are provided in FIG. 5a, due to their large data capacity, ease of scanning, and resilience to damage or error. These examples include QR codes 500, Mcodes 505, Semacodes 510, and/or the like.

Figure 5B:
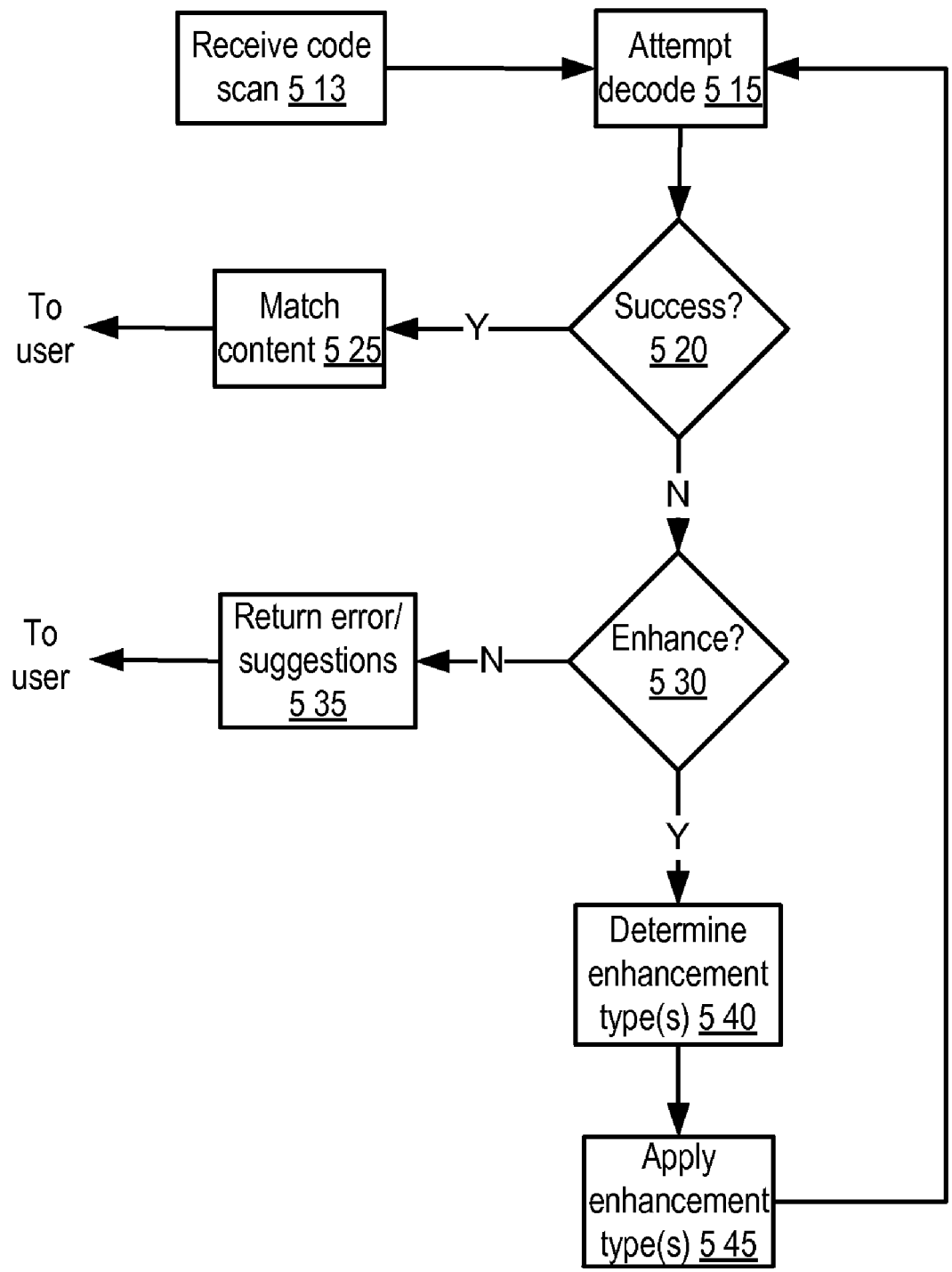
Figure 5C:
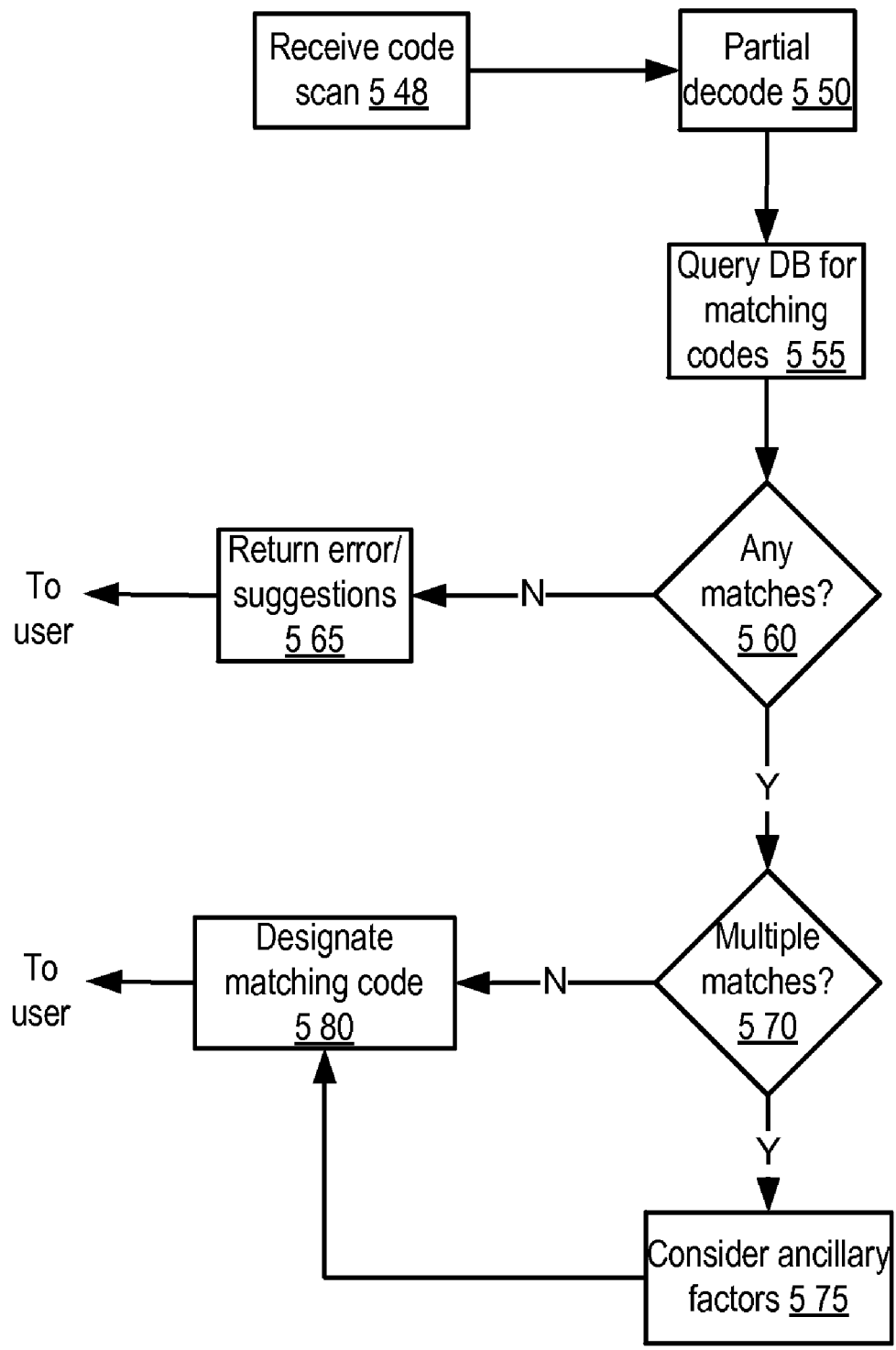

In scanning a code, the code image may not always be recorded faithfully and/or in an ideal and/or suitable condition for decoding and/or matching to associated content. Consequently, the CTIS may be configured to enhance and/or otherwise process a code image in order to better recognize the code. FIGS. 5b-c show implementations of logic flow for processing and/or managing non-ideal code scans in embodiments of CTIS operation. In FIG. 5b, a scanned code is received at the CTIS server (513) and a first attempt is made to decode a received code scan (515). In one implementation, a received code scan may take the form of a bitmap image and/or a compressed bitmap image. If the decoding is successful (520), then the code is matched to associated content (525) that is ultimately destined to be served to a user. Otherwise, a determination is made as to whether enhancement should be applied to the scanned code (530). If not, then an error message and/or suggestions on how to improve the quality of the scanned code may be returned to the user (535). The CTIS may decide not to apply enhancement, for example, if enhancement has already been applied unsuccessfully to the same image before or if the quality of the image is so poor as to be clearly beyond improvement. If enhancement is to be applied, then the CTIS determines the appropriate enhancement type (540) based, for example, on the quality and character of the scanned code image and subsequently applies the enhancement (545), after which a new attempt is made to decode the scanned code.

In some implementations, multiple enhancement processes may be applied against a scanned code and the results compared in order to determine the encoded content. Prior to enhancement, the image may be downsized if necessary for speed of processing in applying multiple enhancement against the image. Image quality may also be increased if necessary in order to more successfully apply enhancements. For code images having extraneous information and/or noise, an enhancement process may be applied to remove all extraneous information, despeckle, and/or the like. For code images having shades of gray and/or shadows obscuring the encoded content, an enhancement process may be applied to manipulate the contrast and/or brightness of the image in order to create a pure black and white image for cleaner decoding. For code images that are tilted and/or not taken flat in a plane, an enhancement process may be applied to tilt the plane of the code to create a flat plane to aid in successful decoding. For code images that are rotated or skewed, an enhancement process may be applied to de-rotate, deskew, and/or otherwise recreate proper rectangular pixel groupings that can be decoded. For code images that are taken out of focus, an enhancement process may be applied to sharpen the image into recognizable pixel groupings. Additionally, the CTIS may apply edge recognition processes to the code image to create a set of potential code images that can be processed and compared to records in a code database.

In some cases in which full decoding of a scanned code image is impossible, a partial decoding may be accomplished and serving of content achieved on that basis. A partial decoding may, for example, result in a probabilistic code match without ever successfully decoding the complete code. FIG. 5c shows an implementation of logic flow for partial decoding in one embodiment of CTIS operation. A scanned code image is received (548), partially decoded (550), and the partially decoded content used to query a code database to find matching codes (555). A determination is made if any matches exist (560) and, if not, then the CTIS may return an error message to the user and/or make suggestions about how to improve the image of the scanned code (565). If a match is found, however, then a determination is made as to whether there are multiple matches (570). If so, then the CTIS may consider ancillary factors (575) in attempting to isolate a single code as the most likely match to the received code. Such ancillary factors may include, but are not limited to: the incoming phone number, the carrier, the time of day, current code traffic, the source of the code, the context of the code, the user ID, the hardware ID, the user behavioral history, the user location, and/or the like. In considering ancillary factors, the CTIS is thus capable of predicting the true code based on knowledge of the user scanning the code, the context of the code, ambient factors, and/or the like. Once a unique code has been identified, this is designated as the matching code (580) and the CTIS proceeds with determining the appropriate associated content to serve to the user.

In an illustrative example of partial decoding, a given matrix code may encode the string ABC123. In multiple processes, it may be determined that the code contains A_1_3 (where the blanks represent unknown values), _C1_, and AB_. Through these multiple processes, the CTIS system now knows that the code contains ABC1_3 and may check this against codes in a code database to determine how many matches exist. If it finds two matching codes (e.g., ABC123 and ABC143), it may consider ancillary factors. For example, ABC123 may correspond to an advertisement for a new action movie while ABC143 corresponds to a coupon for women's cosmetics. If the user supplying the code is determined, based on a supplied user ID, to be a man with a history of scanning movie-related codes, then the CTIS system may infer that ABC123 is the matching code and serve the corresponding content. In one implementation, the CTIS server may further supply a confirmation request for partially matched codes, requesting the user to affirm or deny that the supplied content is, in fact, the content that he or she was seeking Scan Message Data Structure (115)

Figure 6:
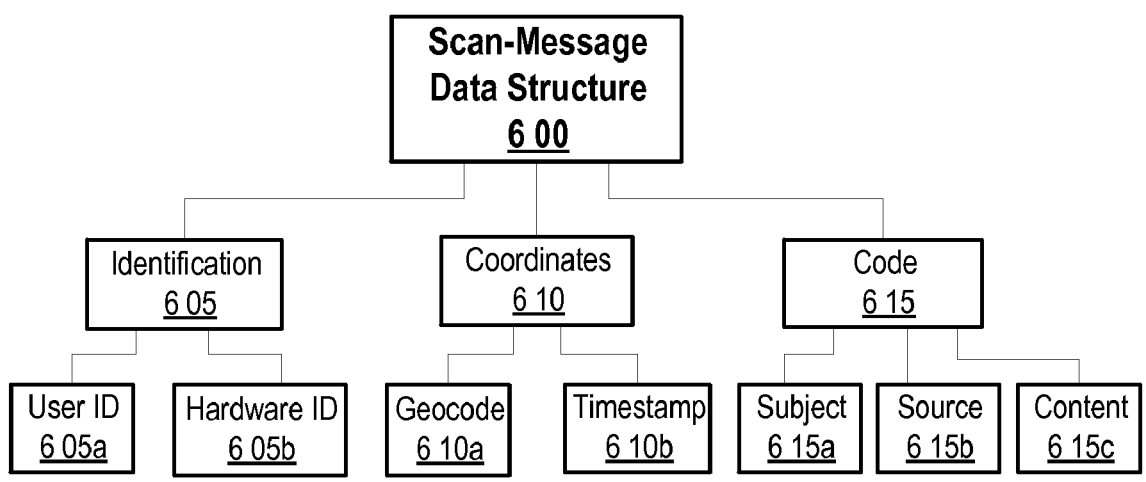
FIG. 6 shows an illustration of one embodiment of the Scan Message data structure.

The Scan Message generated by the CTIS is, itself, a novel data structure. In one embodiment that is illustrated in FIG. 6, it contains an identification field (605) comprising a unique user ID (605a) and a hardware ID (605b), both automatically supplied by the device used to scan and transmit the scanned code; a coordinate field (610) comprising the location geocode (610a) (e.g., GPS coordinate, latitude and longitude, city and state, etc.) and timestamp (610b) of the scan; and a code field (615) supplying the specific content of the scanned code, which may include a subject code (615a) for the code context, a source code (615b) indicating where the code was located, and a content code (615c) indicating the specific information, if any, to be supplied in response to a scan of that code.

In one embodiment, the XML for the Scan Message takes the following form:

```
<Scan_Message>
    <ID>
        <User ID> 012345 </User ID>
        <Hardware ID> Nokia 660 </Hardware ID>
    </ID>
    <Coordinates>
        <Geocode> GPS 40 46.516 -73 57.98 </Geocode>
        <Timestamp> 08/21/2006 13:45:28 </Timestamp>
    </Coordinates>
    <Code>
        <Subject> entertainment; movies; comedy </Subject>
        <Source> New York Times </Source>
        <Content> Showtimes for latest popular comedy movie </Content>
    </Code>
</Scan_Message>
```

Data Transmission (120, 125, 145, 150)

In one embodiment, sending and receiving the Scan Message and Reply Message will employ standard data transmission techniques to ensure successful transmission and to preserve data integrity (e.g., TCP/IP, 1xEV-DO, etc.). This is relevant for the Scan Message, which will contain the coded information scanned by the user. Such techniques may include but are not limited to the use of standard transmission protocols, "handshaking", data compression, data encryption, and error correction.

User Profile Structure (130)

The content of the user profile generated by the CTIS is itself a novel data structure. In one embodiment illustrated in FIG. 7, the profile (700), which is uniquely specified by the user ID, will contain a category of quasi-static user information (705) that is generally fixed over time and one of dynamic user information (730) that is updated with each successive Scan Message that the user submits. The quasi-static info (the "quasi" qualifier indicates that this information may be updated, for example if a user changes their mobile device, however it does not change with each successive code scan) may include a hardware ID (710); "census" info (715) such as name, address, phone number, e-mail address, age, sex, race, marital status, number and age of children, job title, annual income, etc.; subjects of interest specified by the user (720); and information regarding allowed methods to contact the user (725). In one embodiment, this information could be supplied by the user when registering for the CTIS service as, for example, on a website. The dynamic info in the profile may include a scan record (735), comprising the time (740), location (745), and scan code (750) (including subject (750a), source (750b) and content (750c)); and statistics related to the scan history (755). Such statistics may include but are not limited to the most popular scan subjects, most popular scan sources, user space-time trajectories, etc. In one embodiment, the profile contains a series of identifying codes distilled from the profile content (e.g., demographic category code based on census info, subject codes, source codes, etc.) that can be compared with similar codes in the Scan Message to determine the appropriate Ad content to include in the Reply Message. In an alternative embodiment, the profile contains identifying keywords or "tags" based on the profile content that can be compared with similar tags in the Scan Message to determine the appropriate content to include in the Reply Message. In both cases, the identifying labels for the user profiles may be input by CTIS administrators or automatically generated by an appropriate computer algorithm such as stripping header labels from ad descriptions (e.g., for example, stripping the header tags from an HTML ad).

In one embodiment, the XML for the User Profile may take the following form:

```
<User>
    <Quasi-static info>
        <User_ID>123-45-6789</User_ID>
        <Hardware ID> Nokia 660 </Hardware ID>
        <Census info> John Smith; 123 Maple Dr., Smalltown,
        CA 92676; (123)456-7890; jsmith@email.com; 55
        years; male; white; married; 2 children; etc.
        </Census info>
        <Interests> camping; fishing; classic cars; movies; etc.
        </Interests>
        <Contact restrictions> Weekdays 8 AM - 7 PM only
        </Contact restrictions>
    </Quasi-static info>
    <Dynamic info>
        <Scan record>
            <Scan_#1>
                <Time> 08/21/2006 13:45:28 </Time>
                <Geocode> GPS 40 46.516 -73 57.98
                </Geocode>
                <Code>
                    <Subject> entertainment; movies; comedy
                    </Subject>
                    <Source> New York Times </Source>
                    <Content> Showtimes for latest popular
                    comedy movie
                    </Content>
                </Code>
            </Scan_#1>
            <Scan_#2>
            etc...
            </Scan_#2>
        etc...
        </Scan record>
        <Scan statistics>
            <Popular subjects> entertainment; cars; travel; etc.
            </Popular subjects>
            <Popular sources> New York Times; Car and Driver;
            CNN.com; etc.
            <Popular sources>
            <Trajectories> Data files listing time and geocode
coordinates, computed average trajectories, likely        locatons,
etc.
            </Trajectories>
            etc...
        </Scan statistics>
    </Dynamic info>
    <Code>
        <Subject> entertainment; movies; comedy </Subject>
        <Source> New York Times </Source>
        <Content> Showtimes for latest popular comedy movie
        </Content>
    </Code>
</User>
```

In one embodiment, data accumulated in a plurality of user profiles may be analyzed to extract information about codes that are scanned. For example, the frequency with which a particular code is scanned may be extracted from user profiles and parsed by geographic, temporal, and/or demographic criteria to yield code profiling information. This information may be stored in a code and/or Ad profile. In an alternative embodiment, the code/Ad profile may be constructed and/or updated by the CTIS immediately upon the receipt of a Scan Message rather than being extracted from user profiles.

Information Base (135)

Figure 8:
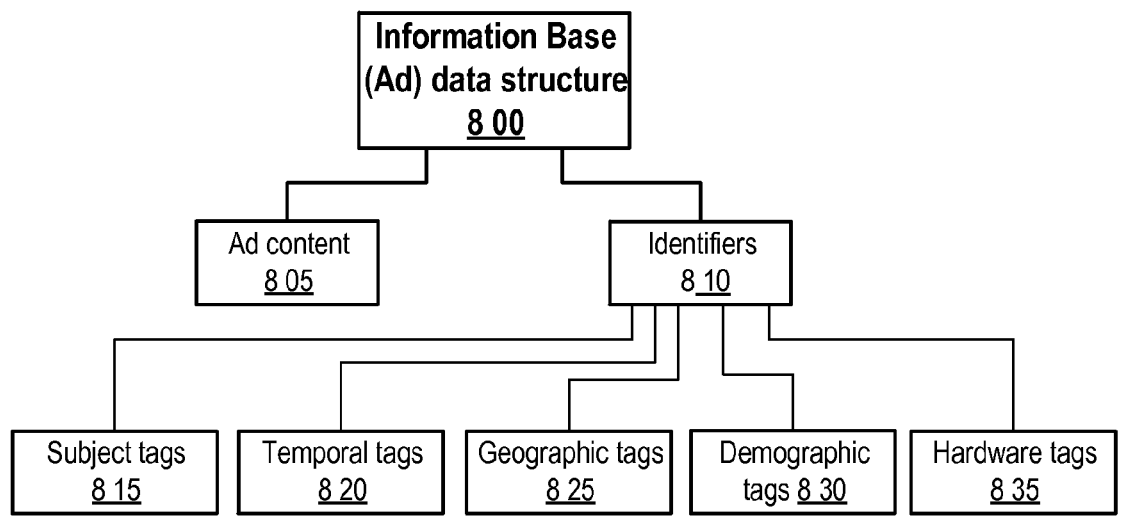
FIG. 8 shows an illustration of one embodiment of the Information Base (Ad) data structure.

The Information Base contains the content that may be included in the Reply Message sent to the user and may be stored on the CTIS central server or on third party servers accessed by the CTIS. In one embodiment, each Ad is associated with searchable labels. The Ad content together with its labels, collectively referred to here as an Ad, forms a novel data structure. In one embodiment illustrated in FIG. 8, the Ad (800) is comprised of the specific ad content (805) (e.g., text, images, video, etc.) and a set of identifiers (810) including subject tags (815), information characterizing the temporal character of the Ad based on which the Ad may be triggered (820) (e.g., 6 to 10 AM for a breakfast Ad), information characterizing the geographic specificity of the Ad based on which the Ad may be triggered (825), demographic specificity of the Ad (830) (e.g., an Ad for family vacations), and the hardware requirements of the Ad (835) (e.g., hardware IDs of devices capable of displaying the content of a particular Ad). In one embodiment, the Ad would also contain information identifying the source in which the Ad code is to appear. In another embodiment, the Ad would also contain code/Ad profile data, describing the history and/or statistics of scans related to the Ad.

In one embodiment, the XML for an Ad may look like:

```
<Ad>
    <Ad_ID>123</Ad_ID>
    <Ad content>
        textual movie showtime listings ( or images, audio,
        video, URLs, etc.)
    </Ad content>
    <Identifiers>
        <Subject> entertainment; movies; comedy </Subject>
        <Temporal> 08/21/2006; 12:00:00 to 14:00:00
        </Temporal>
        <Geographic> Smalltown, CA 92676 </Geographic>
        <Demographic> 17 years and older </Demographic>
        <Hardware> any (text only) </Hardware>
    </Identifiers>
</Ad>
```

User Profile Query (130)

The CTIS queries the user profile to determine which Ads to include from the Information Base in the Reply Message in order to tailor those Ads to the user's profile characteristics, interests, and trajectories. In one embodiment, a scanned code will yield two components in the Reply Message content: i) static content that is the same for every user who scans the code, and ii) dynamic content that depends on the context of the user and the user profile. The static content (i) is determined from the scan code, while the dynamic content (ii) is determined by a combination of the scan code and the user profile, requiring a dynamic content generation heuristic to combine their respective influences. While a variety of such heuristic are possible and contemplated as being within the scope of this disclosure, and the specific heuristic employed in a given realization will likely depend on the precise application and intention, we discuss one embodiment of this heuristic here for illustrative purposes with reference to FIG. 9. In one embodiment, the scan code and user profile is labeled with keywords or "tags" that identify the subject content of each. In an alternative embodiment, the scan code, user profile, and Ads are labeled with identifying codes. In either case, the heuristic exhibited in FIG. 9 first filters all Ads in the Information Base by the subject code or tag of the scanned code (900). The Ads from 900 are filtered by the hardware ID (905) to ensure that the Ad content can be successfully acquired and displayed by the user. The Ads from 905 are filtered into separate categories by scan location (910$a$1), user address (910$a$2), user specified subject interests (910$b$1), user scan subject history (910$b$2), scan time (910$c$), or user demographic category (910$d$). Ads in each of these filtered categories are compared to determine which occur most commonly across 910$a$, $b$, $c$, & d (915). The server determines if 915 has yielded a single Ad (920), and if so, it incorporates the Ad's content into the Reply Message (930). Otherwise, it chooses one Ad at random from the remaining Ads (925) for incorporation. It must be emphasized again that this is but a single, specific embodiment of the user profile query heuristic intended for illustrative purposes. The heuristic is highly flexible and can be finely tuned for the specific application at hand. Some other possible methods may include alternative ordering of filters, addition or removal of filters, weighted filtering, complex conditional trees, and/or the like.

As an exemplary implementation of this embodiment of the Ad filtering heuristic, we consider the situation discussed above with reference to FIG. 2. Here, the user scans a code from an article on finance and investment in the business section of a media publication. Keywords associated with this code may include Business, Finance, Investment, etc. Consequently, only those Ads possessing these identifying keywords are passed at 800. In an alternative embodiment, the keywords may be ranked in order or relevance and the Ads filtered accordingly. The Ads from 900 are filtered by Hardware ID; we presently assume that the user's mobile device is equipped with advanced capabilities (text, image, audio, video, internet, etc.), so that all Ads are passed at 905. In an alternative embodiment, the Ad filter may preferentially choose those Ads that take fullest advantage of the user device's display capabilities. Of the remaining Ads, there is one for a brokerage firm that is tagged with a location code corresponding to the user's address (San Francisco, Calif.), the user's specified subject interests (investing, retirement), and a portion of the user's demographic profile (age 55 or older). The three tag matches (location, subject, and demographic) distinguish this Ad from the others in the Information Base, which, in this example, all have two or fewer tag matches; so this unique Ad, a brokerage firm located in San Francisco, Calif. with retirement services, is chosen to be served to the user's mobile device.

In one embodiment, the user may respond to the Reply Message with a relevance rating. This rating may then be stored in the user profile and/or employed to refine the criteria for tailoring future Reply Messages to that user.

In one embodiment, the Ads would not be filtered by hardware ID at 905. Rather, when a final Ad has been selected for inclusion in the Reply Message following filtration under the other relevant criteria, the server will determine whether that Ad is properly formatted for the device specified by the hardware ID. If so, then the Ad will be included in the Reply Message as is. Otherwise, it will be converted into the required format appropriate to the user's mobile device. For example, if the selected Ad contains color images but the server determines that the user's hardware device is an early model BlackBerry that only accommodates monochromatic text, the server will implement a peripheral application to strip the text content from the Ad and incorporate only that in the Reply Message.

Non-Triggered Ad Serving

Though Ads served by the CTIS are determined by codes scanned at some time in the past, it is possible for the CTIS to serve Ads without any immediately contiguous, causal code scan. A general illustration of this capability was given above in FIG. 3, where each Ad provider has specific geographic locations of operation. These are assumed to be stores/restaurants for the present purposes of illustration in this disclosure, but they may have different character for different embodiments and applications, including but not limited to kiosks, signs and billboards, offices, hospitals, real estate, shelters, emergency service providers, traffic monitors, individuals, websites, virtual world locations, and/or the like. A chosen distance surrounding each Ad provider location defines a "provider zone", where the metric by which "distance" is gauged may be generalized in the case of cyberspace/virtual world locations. A provider zone breach occurs when a user scans a code within a provider zone. This may be regardless of the content of the scanned code, for in this example the goal is to record the user's space-time position. In an alternative embodiment, a provider zone breach can be registered even if a user does not scan a code within the provider zone, if the CTIS can infer a breach from two or more code scans outside the provider zone through interpolation. When such a provider zone breach occurs, a special note may be incorporated into the user profile, such as in the Scan statistics module (755), indicating the time and the particular Ad provider.

In an alternative implementation, the CTIS may be configured to automatically query a user position without scanned codes. For example, a user's mobile device may be configured to periodically register it's GPS location with the CTIS system. In another implementation, the CTIS may be able to continuously monitor the position of a client mobile device based on the cell site or tower to which the device is communicatively coupled. Cell site based user location may also be registered when a user scans a code.

Figure 10:
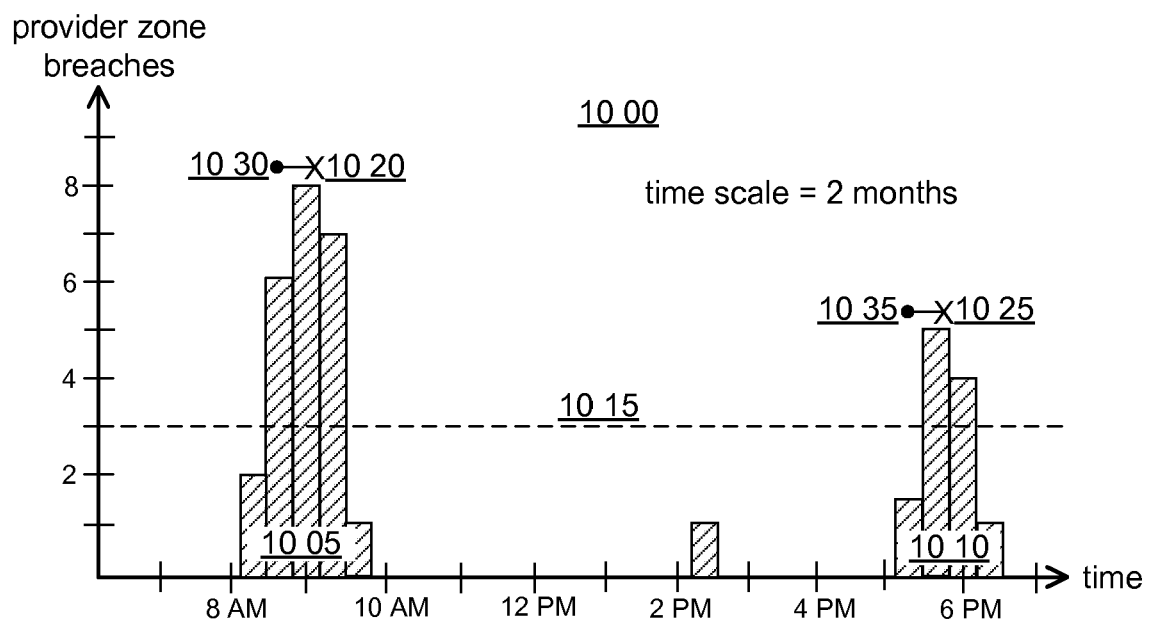
FIG. 10 shows an exemplary histogram of Ad provider zone breaches.

From an accumulated record of these breaches, data of the form of FIG. 10 can be determined. FIG. 10 shows a histogram (1000) of provider zone breaches in 20 minute intervals for a particular user over a chosen time scale, which we will take to be two months in this example. In one embodiment, such histograms will correspond to breaches of specific Ad provider locations; while in an alternative embodiment, they will correspond to breaches of any of a plurality of locations corresponding to a specific Ad provider; while in still another embodiment, they will correspond to breaches of different locations of related but different Ad providers, chosen to target a specific collective user demographic. In this exemplary histogram, the significant provider zone breaches (those exceeding the threshold) are clustered around two times: one approximately centered at 9 AM (1005), and the other at 6 PM (1010). This may represent, for example, a user scanning codes as he passes the same Ad provider location while riding a bus to and from work. In one embodiment, a threshold breach level (1015), indicated in FIG. 10 by a horizontal dotted line, is specified such that all breaches below this threshold number are ignored. This threshold level should be specified with respect to the time scale of the histogram; in the present example, the threshold is 3 breaches per two month period. The average peak times (1020, 1025) of the breach clusters that exceed this threshold are computed (marked by X's in FIG. 9), and a time is chosen prior to those averages (1030, 1035) to serve an appropriate Ad to the user. In one embodiment, provider zone breaches could be sorted by scan subject, so that a histogram of the form of FIG. 10 could be constructed for a specific category of scans in order to further tailor the supplied Ad content.

In another embodiment, the system may be generalized to analyze trajectories in "cyberspace-time". In this embodiment, a record of trajectories is kept of the user's activity on the world wide web as browsed, for example, on the user's internet enabled mobile device. A generalized concept of "distance" may be incorporated, for example reflecting an average number of links needed to get from one website to another. Provider locations become websites in this embodiment, and a zone breach may be registered when the user is a specified number of links away from the provider's website. Then, just as before, the CTIS can anticipate user cyberspace-time trajectories and supply Ads, coupons, pop-ups, etc. related to websites that the user is approaching. For example, the CTIS may track that a user visits web site A at 9:00 AM and web site B at 9:20 AM every day. The CTIS may then provide ads to website A at 8:50 AM and to website B at 9:10 that are targeted to that user. In an alternative embodiment, the CTIS may provide this targeting information to existing ad serving systems, which in turn may use the targeting information for timely placement of ads. The aggregation of such targeting information, in particular, may be useful to advertisers and website owners. For example, reports may be run on user profiles sorted by location (e.g., web sites) and time of visit. This information may be supplied, along with user profile IDs, which may then be used by the advertising servers and/or websites to pre-cache ads that are relevant to the users' interest just prior to their anticipated visits to the website. As such, the CTIS works in conjunction with certain websites to supply user-specific Ads on those sites. As a result, the content of the user profile within the CTIS may be used to select Ads that the user browses using their mobile device. In an alternative embodiment, web-based Ads may be specific to the trajectories of users in geographic space-time, since that information is included in the user profile. For example, if a user is known to be passing by a coffee shop at a specific location and time every day (e.g., a coffee shop on 123 Main Street, N.Y., N.Y. at 9:00 AM), and is also know to visit a specific website at that time (e.g., at 9:00 AM the user visits website C reading the daily news on their walk to work), then the system may provide the user with Ads directly to their PDA or embedded in website C (because it was pre-loaded as already discussed) for the coffee shop. As such, the CTIS provides a mechanism to provide geographically relevant ads to traditional websites. In yet another embodiment, the total content of the websites browsed by a user on their mobile device may be modified by the content of the user profile within the CTIS. For example, a news website may select articles for a user that are specific to the user profile, including their interests, demographics, current time and location, etc.

In another embodiment, the CTIS may analyze the user trajectories in "virtual worlds" or "synthetic realities" and serve ads accordingly. An example of a virtual world is a massively multiplayer online game, such as The Sims Online, EverQuest, World of Warcraft, Second Life, and/or the like. In such a virtual environment, a code scan may be comprised of a particular user action or decision such as initiating or completing a game mission, clicking on an icon, saving a game, etc. In such virtual worlds, geographies and virtual locations may be used in employing trajectories. The history of user activity within the virtual world may then be incorporated into the user profile and used by the CTIS to serve ads within the context of the virtual world or elsewhere. For example, in games like Second Life, virtual televisions, billboards, etc. may be used as advertising delivery mechanisms.

Selecting the proper Ad to serve to the user in the non-triggered Ad serving embodiment of the CTIS may be accomplished using a variety of heuristics that are best tailored to suit the specific use or application. Nevertheless, we present an example of a specific embodiment in FIG. 11a for illustrative purposes. In this embodiment, a weighting system may be employed to select among the Ads of a specific Ad provider once it is established that an Ad from this provider is to be served to the user based on the analysis of FIG. 10. This weighting system begins by assigning a score of 1 (1100) to all Ads in the Information Base corresponding to the provider. This score is multiplied by a subject coefficient (1105) for every match between the Ad subject and the user specified subject interest or scan subject history. That coefficient is 2 in the present example, so N matches would yield a weighting factor of $2^N$. The Ad score may also be multiplied by a time coefficient (1110) if the serving time (1030 or 1035) falls within a time range specified for a particular Ad. In the present example, the time coefficient is 4, expressing the greater importance of this factor compared to a single subject match. Finally, the Ad score may be multiplied by a demographic coefficient (1115) for every match between the Ad demographic category and that of the user. That coefficient is 1.5 in the present example, reflecting the diminished importance of this factor compared to the time and subject considerations. M demographic category matches will yield a weighting factor of $1.5^M$. Once all of the Ad provider's Ads are scored in this fashion, those Ads with the highest scores for that provider may be selected over the rest (1120). Similarly, the highest scoring Ads from other providers are selected and the highest scoring Ads over all providers can be selected to serve for a particular time interval (1125). Finally, the proper time to serve the Ad (e.g., 30 minutes prior to the expected average provider zone breach time) is established (1130) and, if there is no further ambiguity (1135), the proper Ad is served at that time (1145). Any residual ambiguity may be resolved by selecting randomly from the remaining Ads.

As a specific example of how this might work, we assume that the histogram (1000) of FIG. 10 represents provider zone breaches for a fast-food restaurant that a user passes on his way to and from work. An Ad in the restaurant's base of provided Ads matches the user's stated interest in gourmet coffee, and this Ad is further labeled by a time identifier indicating that it is best served between 8 AM and 10 AM. Consequently, at 30 minutes before the user's average breach time of the provider's zone, the server supplies the Ad to the user's mobile device, touting this restaurant's new line of gourmet coffee drinks. Alternatively, the user's profile may specify that he is married with two children. This matches the demographic category of an Ad in the provider's base which is also labeled by a time identifier indicating that it is best served between 5 PM and 8 PM. As a result, 30 minutes before the user breaches the provider's zone on his way home from work, the server supplies the Ad to the user's mobile device, touting their family-pack of hamburgers.

Figure 11A:
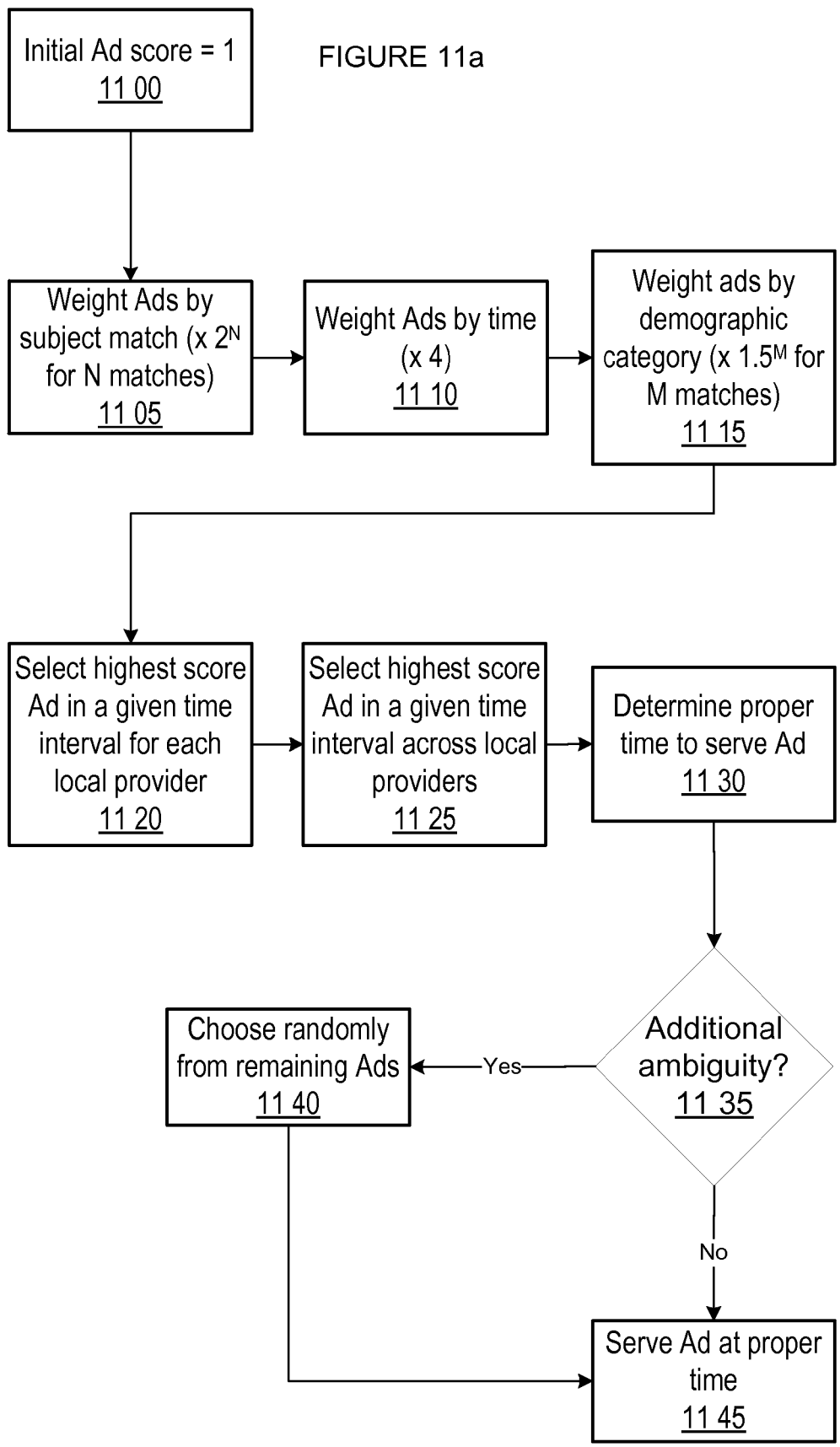
FIGS. 11a-d show some embodiments of systems for selecting non-triggered information to serve to users.
Figure 11B:
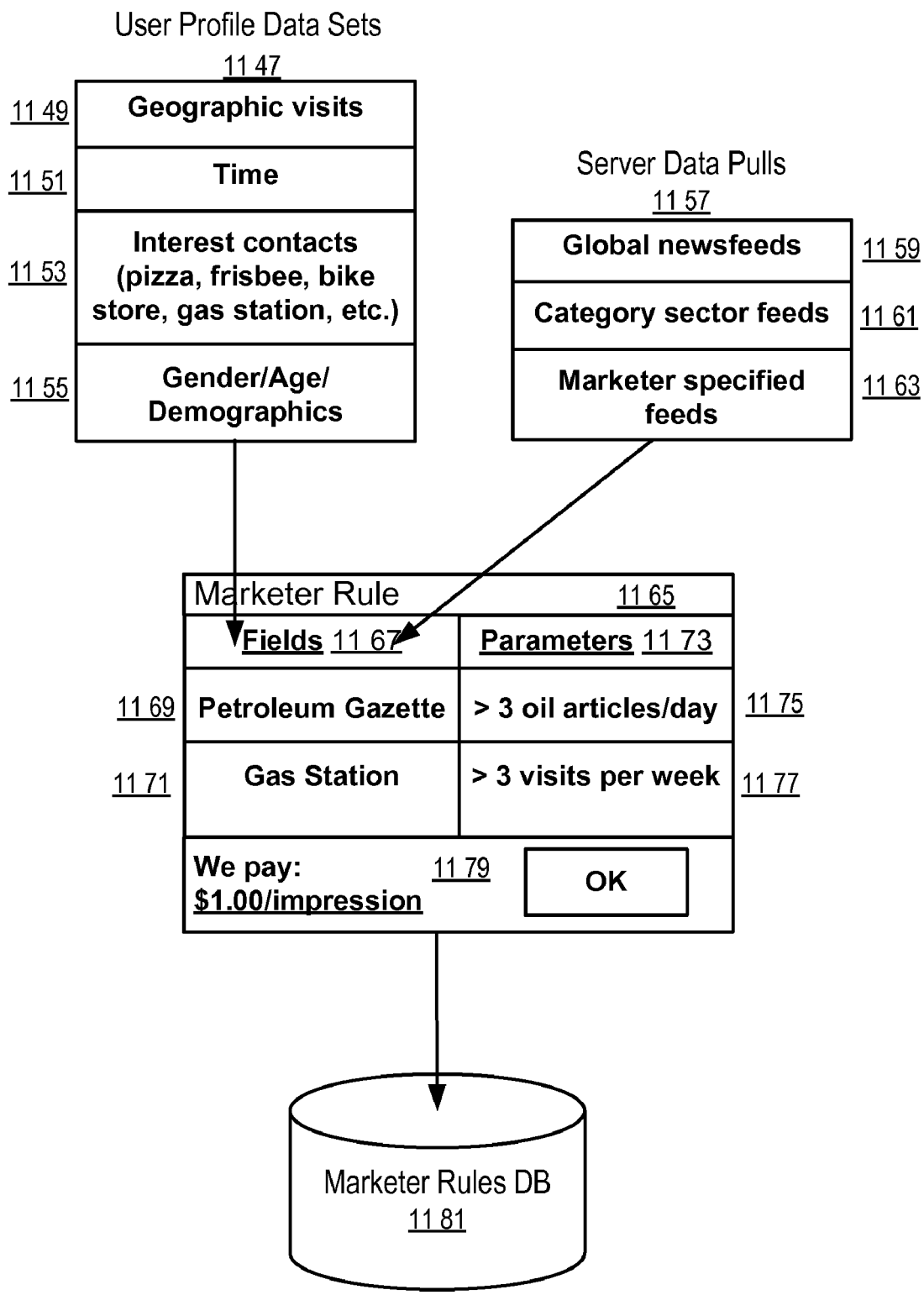

In an alternative embodiment, the CTIS may be configured to receive and implement marketer rules for serving Ads. FIG. 11b shows a schematic illustration of data structures related to establishment of a marketer rule for Ad serving in one embodiment of CTIS operation. A user profile data sets (1147) may include a variety of data fields related to user activities, interests, characteristics, and/or the like, such as but not limited to: geographic visits (1149), as may be recorded by code scans; time (1151) associated with code scans; interest contacts (1153), such as may be reflect the user's interests and may be based on the context and/or associated content of scanned codes; gender, age, demographic, and/or other personal information (1155); and/or the like. Server data pulls (1157) may reference one or more data feeds to which the CTIS server has access in order to draw information that may be pertinent to marketer rules and/or Ad serving procedures. A wide variety of different types of feeds may be accessible, including but not limited to: global news-feeds (1159), such as associated press wire services, weather information, sports scores, political and social events, financial market data, and/or the like; category sector feeds (1161), such as more specific and/or special interest news feeds; marketer specified feeds (1163); and/or the like. A marketer rule (1165) may be established by selecting one or more fields (1167) from the user profile data sets (1147) and/or the server data pulls (1157) and supplying associated parameters (1165) and/or parameter values associated with those fields. In the illustrated implementation, the rule associates a Petroleum Gazette field (1169) with a parameter specifying more than three oil articles read per day (1175). In addition, the rule associates a gas station visitation field (1171) with a parameter specifying more than three visits per week (1177). If both of these conditions are deemed true for a given CTIS user, then the CTIS may serve one or more Ads selected for and/or associated with the marketer rule. A price-per-impression (1179) may be charged for each time that the Ad is served to a user under the circumstances specified by the rule. In one implementation, a marketer may propose a price-per-impression when he or she creates the rule, which is then submitted to the CTIS and/or a CTIS administrator for approval. In another implementation, the CTIS may automatically generate a price-per-impression based on the rule and/or the marketer. For example, a fixed charge may be applied for each additional field and associated parameter added to the rule, as this refines the specificity with which the associated Ads will be served and increases the likelihood of transactional consummation. Once a rule is complete, it may be entered for storage and subsequent use in a marketer rules database (1181). It should be understood that the functionality described for this embodiment of the CTIS may be integrated or employed within any of the other CTIS embodiments described herein.

In one embodiment, the XML for the above marketer rule may take a form similar to the following:

```
<Rule>
    <Rule_ID>123</Rule_ID>
    <Rule_name> Oil Rule </Rule_name>
    <Rule_owner> Ads R Us </Rule_owner>
    <Condition1>
        <Field1> Petroleum Gazette </Field1>
        <Parameter1> 4 or more oil articles/day </Parameter1>
    </Condition1>
    <Condition2>
        <Field2> Gas Station </Field2>
        <Parameter2> 4 or more visits per week </Parameter2>
    </Condition2>
    <Ad_database> Hybrid car Ads </Ad_database>
    <Price>
        <Amount> $1.00 </Amount>
        <Contingency> Impression </Contingency>
    </Price>
</Rule>
```

In one implementation, the elements of FIG. 11b may form the basis of a user interface for marketer rule generation. A marketer and/or other CTIS user may be presented with lists of user profile data sets (1147) and server data pulls (1157) that may be dragged and dropped to the marketer rule box (1165) to generate a marketer rule. When the parameter values have been specified and the rule is complete, the user may click OK to submit the rule and/or drag and drop the rule to a marketer rules database icon (1181).

Figure 11C:
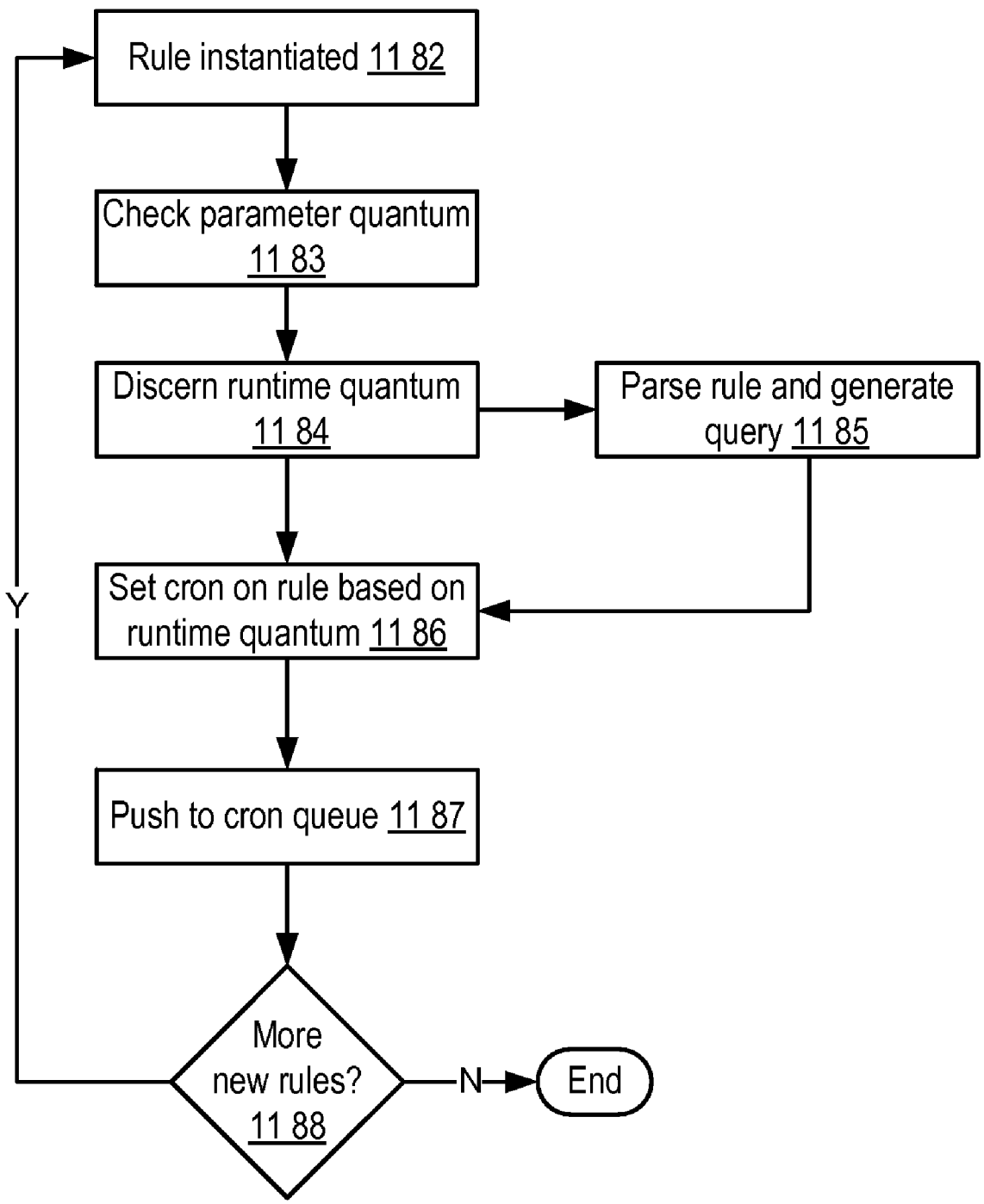

FIG. 11c shows an implementation of logic flow for generating a rule queue in one embodiment of CTIS operation. A rule is instantiated (1182), and the CTIS server checks parameter quanta associated with the rule (1183). A runtime quantum is discerned for the rule (1184) to determine the timing for applying the rule. The rule is subsequently parsed to generate the appropriate query structure (1185), and the cron schedule for the rule is established based on the runtime quantum (1186). The rule may then be pushed to the cron schedule queue (1187), and a determination made as to whether there are any additional new rules to process (1188).

Figure 11D:
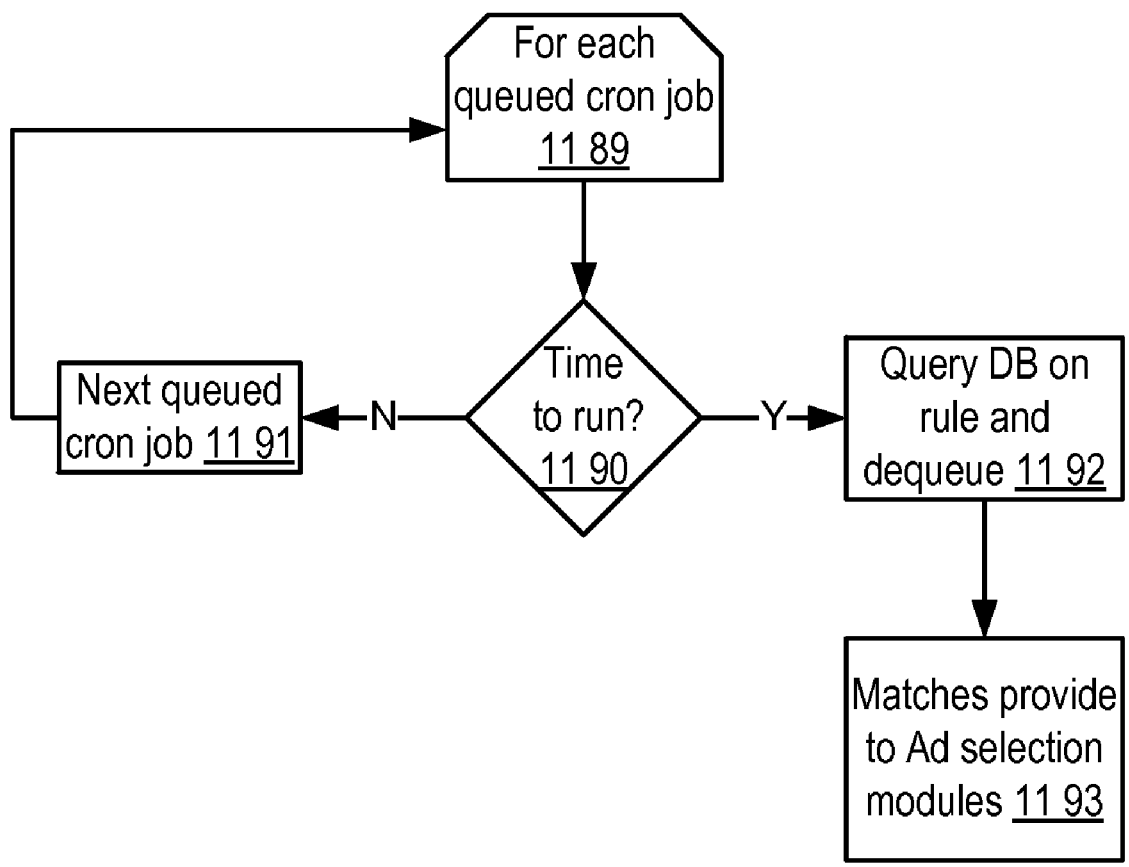

FIG. 11d shows an implementation of logic flow for cron job queue management in one embodiment of CTIS operation. The CTIS may monitor the cron job queue and, for each queued cron job associated with a rule that is next in the queue (1189), the CTIS may determine whether or not it is time for that particular cron job to run (1190). If not, then the CTIS passes to the next cron job in the queue (1191). On the other hand, if it is time to run, then the appropriate databases specified in the rule are queried, and the particular cron job is dequeued (1192). If the results of the database query match the rule criteria so as to require serving an Ad impression to a user, then that match indication may be passed to Ad selection modules in order to choose an Ad to supply to the user. In one implementation, the marketer rule itself may uniquely determine an Ad to serve. In another implementation, the marketer rule may determine a set or class of Ads to serve, from which a unique Ad may then be randomly selected. In yet another implementation, as Ad may be selected from the marketer rule determined set or class of Ads based on a user profile.

It must be emphasized again that this is but a single, specific embodiment of the non-triggered Ad serving procedure intended for illustrative purposes. The procedure is highly flexible and can be finely tuned for the specific application at hand. Some other possible methods may include different relative weighting factors, alternative weighting considerations, categorical filtering, consideration of the number of provider zone breaches above the threshold level, graduated consideration of the distance from the provider location, modified provider zone shapes, pattern recognition algorithms, artificial intelligence facilitation, and/or the like.

Various Applications

The CTIS provides a targeted information serving system that may be applied to a wide variety of marketing and information dispensation applications. In one embodiment, the CTIS creates enhanced ads with content that cannot be included in a print ad. For example, a user who scans a code related to an automobile ad is provided additional content pertaining to the automobile such as detailed images, video, audio, reviews, and links to additional information. Based on the geocode provided in the Scan Message, the CTIS may provide a list of local dealerships and pricing. Based on the user profile, the CTIS may suggest other automobiles by the same manufacturer that are popular with customers that share the same income bracket, geographic address, number of children, etc. as the user.

Figure 12A:
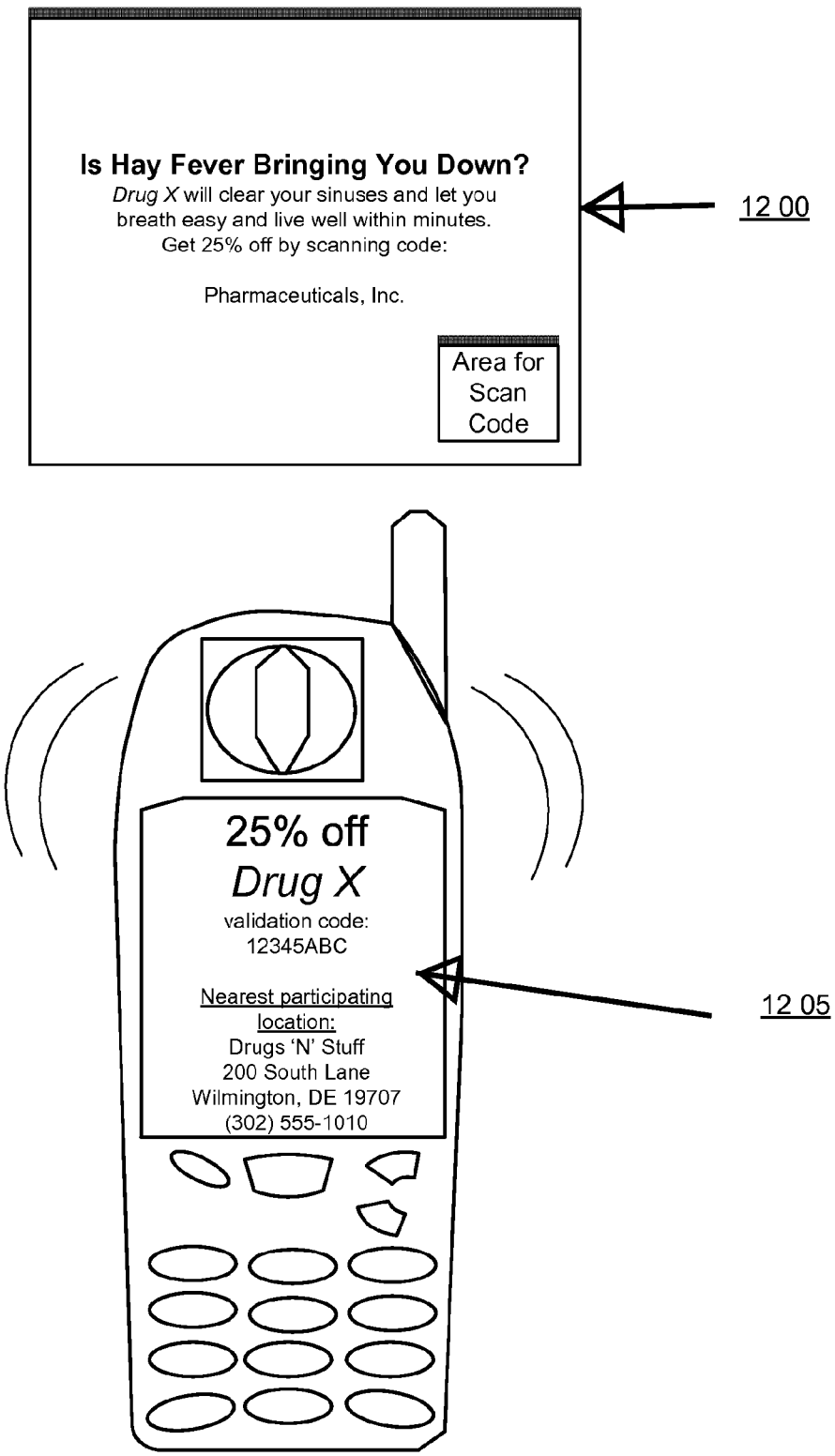
FIGS. 12a-b show examples of coupons provided by the CTIS.
Figure 12B:
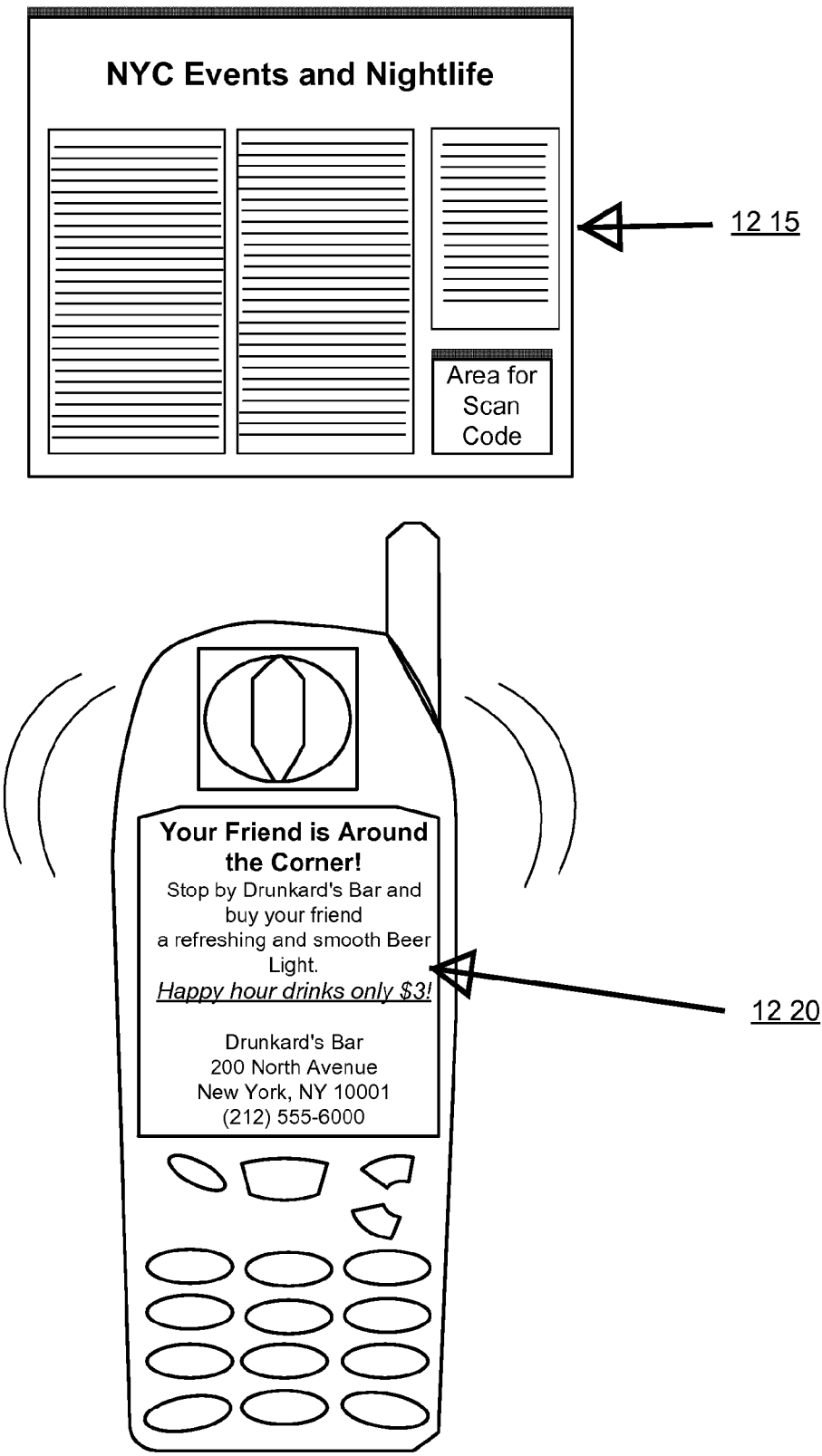

In another embodiment, the CTIS provides targeted coupons to consumers. By scanning a code in an article or advertisement of interest, a user may be provided with a coupon code for a store or establishment near the location where the scan took place, thereby increasing the likelihood that the coupon would be used. Choosing the coupon based on the contents of the user profile may further increase the likelihood of a consummated transaction. FIGS. 12a and 12b show two examples wherein the CTIS supplies coupons and/or discount info to a user. FIG. 12a shows an advertisement 1205 for hay fever medication that contains a scan code. Upon scanning the code, the user's cell phone is supplied with a coupon 1210 for 25% off the advertised medication, along with a nearby store at which to redeem the coupon. FIG. 12b shows an article related to events and nightlife in New York City 1215 that contains a scan code. Upon scanning the code to obtain additional content, the user may also be provided with a contextual advertisement for a local bar 1220, including an announcement of happy hour discount prices based on the time of the scan. In an alternative embodiment, the coupon could be provided to the user based on an anticipated provider zone breach rather than a contiguous, causal code scan.

In another embodiment, the CTIS allows for reduced use of printed space in media publications. For example, an ordinary printed article or advertisement may be supplanted by a 2D matrix code that supplies the content directly to the user's mobile display device. Furthermore, the supplied content may be dressed with additional content that is specifically chosen for the user based on his/her profile or current location, thus increasing the value and utility of the content while still utilizing significantly reduced print space. This increased content value, coupled with the reduction in print space, may translate to significantly increased advertising revenue for media publications. In another embodiment, scan codes may be placed in web-based ads so that users may scan those ads with their mobile device. In another embodiment, scan codes may be placed in television-based ads.

In another embodiment, the CTIS provides a means to supply urgent or breaking information. For example, a breaking news story that arrives too late to be included as a printed article can still be incorporated into a publication via a 2D matrix code. Publications could even have a permanent code in each issue that users can scan in order to access timely breaking and/or supplemental news for which there was a lack of space or time to include in the printed publication.

In another embodiment, the CTIS provides a means of disseminating targeted information over a large scale. For example, during a widespread emergency, a single 2D matrix code could be broadcast on television. When users scan the code, they are supplied with regional information/instructions, shelter locations, maps, etc. Certain users may be provided even more specific instructions if, for example, their profile lists their occupation as some form of emergency personnel. In an alternative embodiment, the CTIS can provide targeted information to any or all users expected to be in the vicinity of a particular area or event based on their history of space-time trajectories. For example, if a chemical spill occurs and users are projected to be in the vicinity of it, a prior warning to avoid the area can be broadcast to the users' mobile devices. In an alternative embodiment, traffic alerts can be broadcast to the mobile devices of users projected to be in the vicinity of a high-traffic area before they are stuck there. The CTIS may supply targeted Ads, including coupons, for nearby businesses, restaurants, coffee shops, etc. to these users for them to solicit while they wait for traffic to disperse. In general, just as the CTIS can provide information to users about where they should go (e.g., Ad provider locations), it can also warn them to stay out of areas that they should not go, all based on the projected user trajectories.

In another embodiment, the CTIS may serve Ads based on prevailing ambient conditions or climate at users' space-time positions. For example, this may occur when the relevance score for contextual Ads is low. An illustration of the logic and data flow in this embodiment is provided in FIG. 13, wherein the contextual Ads selected from the Information Base on the basis of code scan and user profile are supplanted in favor of Ads chosen on the basis of prevailing ambient conditions at 1340. Exemplary embodiments are provided in FIGS. 14 and 15. In FIG. 14, an Ad for allergy medication is provided 1447 in lieu of weak contextual ad options 1442 in response to a code scan from the weather section of a media publication 1407 in conjunction with ambient weather information, including pollen count, queried at the server 1412. In FIG. 15, an Ad for sunscreen is provided 1547 in lieu of weak contextual Ad options 1542 in response to a code scan from the front page section of a media publication 1507 in conjunction with ambient weather information, including humidity and UV index, queried directly by the user's mobile device 1512. In various embodiments, certain ambient conditions such as UV levels, humidity, download/upload speeds, and/or the like may be detected by the user's mobile device itself, while in other embodiments, ambient conditions are separately supplied to a database used in conjunction with the CTIS.

Figure 17:
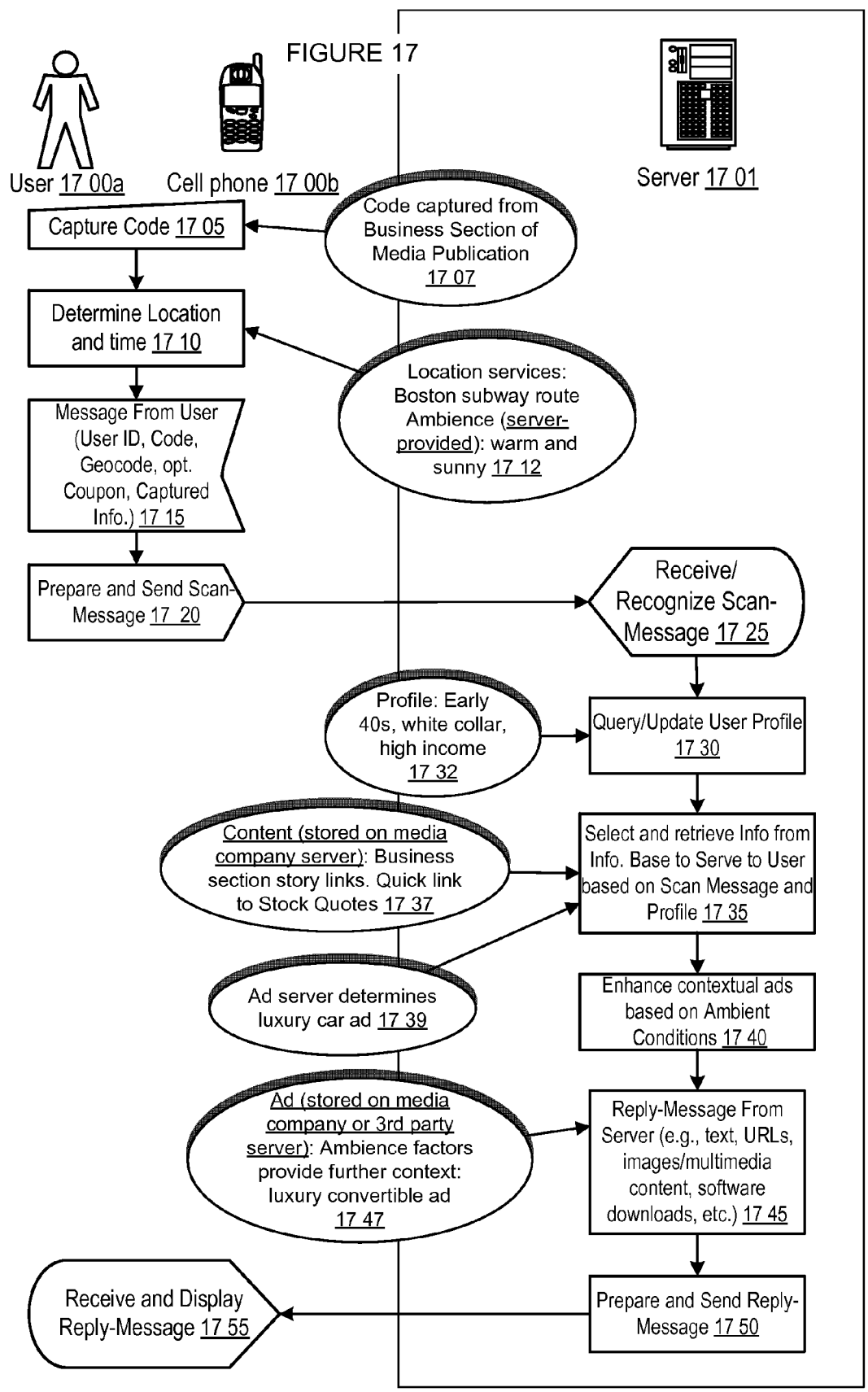
FIG. 17 shows a combined logic and data flow block diagram for a particular exemplary embodiment of the CTIS in which an Ad for a luxury convertible is served based on warm weather conditions, a scanned code, and the user profile.
Figure 18:
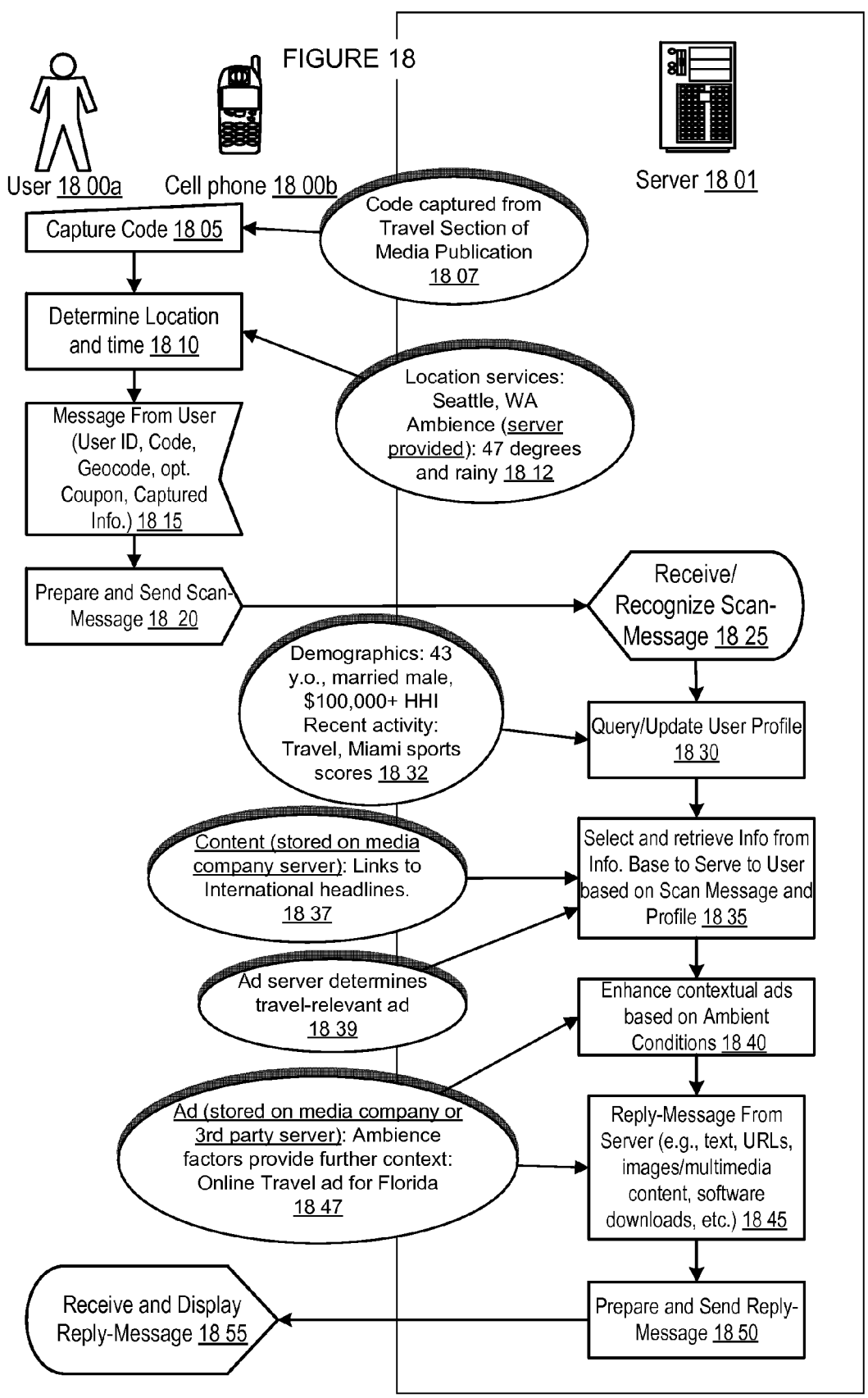
FIG. 18 shows a combined logic and data flow block diagram for a particular exemplary embodiment of the CTIS in which an Ad for Florida travel is served based on cold/rainy weather conditions, a scanned code, and the user profile.
Figure 19:
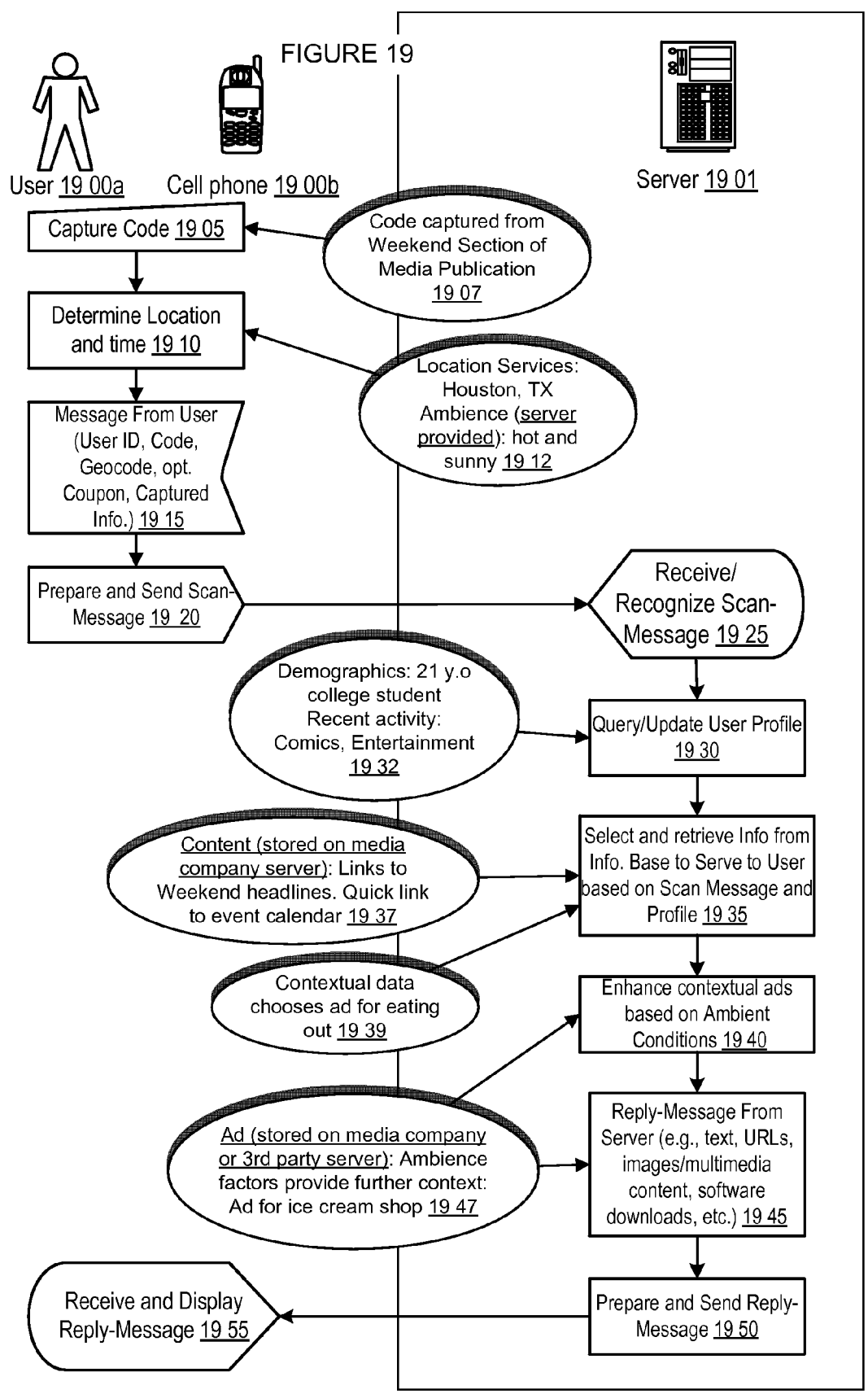
FIG. 19 shows a combined logic and data flow block diagram for a particular exemplary embodiment of the CTIS in which an Ad for an ice cream shop is served based on warm weather conditions, a scanned code, and the user profile.
Figure 20:
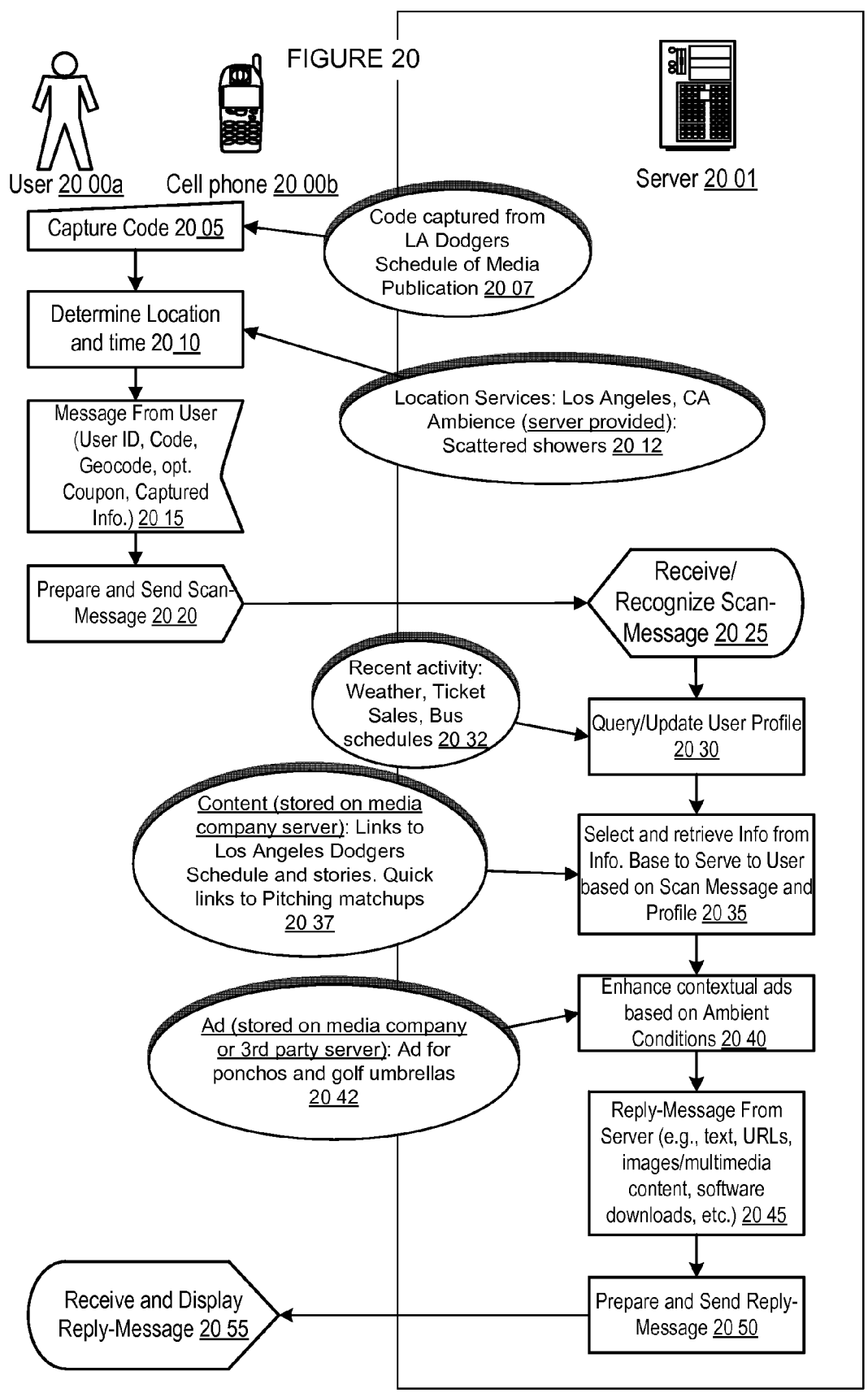
FIG. 20 shows a combined logic and data flow block diagram for a particular exemplary embodiment of the CTIS in which an Ad for ponchos and umbrellas is served based on rainy weather conditions, a scanned code, and the user profile.

In another embodiment, the CTIS may serve contextual Ads with content enhanced by reference to prevailing ambient conditions. An illustration of the logic and data flow in this embodiment is provided in FIG. 16 wherein the contextual Ads selected from the information base at 1635 are further refined by the ambient condition information at 1640. Exemplary embodiments are provided in FIGS. 17-20. In FIG. 17, a code is scanned from the Business section of a media publication 1707 and the CTIS selects luxury car Ads for display 1739 based on the scanned code, user location, and user profile 1732, and these Ads are further refined based on the ambient weather conditions provided to the server at 1712. In this case, warm and sunny weather provides further context to cause the CTIS to serve an Ad for a luxury convertible 1747. In FIG. 18, a code is scanned from the Travel section of a media publication 1807 and the CTIS selects travel Ads for display 1839 based on the scanned code and user profile 1832, which includes recent scan code transactions pertaining to travel and Miami sports scores. The CTIS consequently queries the prevailing ambient weather conditions, comprised of cold and rainy weather, and supplies an Ad for Miami travel opportunities. In FIG. 19, a code is scanned from the Weekend section of a media publication 1907 and the CTIS selects a contextual Ad for eating out 1939 from the Information base 1935 to serve based on the scanned code and the prevailing ambient weather conditions, which are hot and sunny 1912. This Ad is further refined by the user profile contents 1932 indicating a college student interested in comics and entertainment, and an Ad for an ice cream shop is finally supplied 1947. In FIG. 20, a code is scanned from a baseball team schedule within a media publication 2007. Based on the prevailing ambient weather conditions, including scattered showers 2012, the scanned code, and the recent activity in the user profile 2032, an Ad is supplied for ponchos and golf umbrellas 2042.

In various embodiments, the CTIS may serve Ads based on a wide variety of different ambient and/or situational conditions that may be detected by the client mobile device, provided by internal or third party databases or information feeds, and/or the like. Some non-limiting examples of potential ambient and/or situational conditions that may be considered and/or employed in selecting information to serve are temperature, weather, light levels, UV levels, pollen count, humidity, air quality, prices of commodities and/or consumer goods, stock and/or financial index prices, global and/or local news events, internet activities, sports scores, entertainment news, security warnings, and/or the like. Consideration of such factors, by themselves or in conjunction with knowledge of a user such as may be gleaned from a user profile, may form the basis of information serving rules that have great specificity of targeting. For example, a marketer rule within the CTIS may specify that an Ad for participating bars that includes a coupon for a particular brand of beer be served to all male users between the ages of 21 and 40 with a history of scanning baseball-related codes within three hours of any time that the local baseball team wins a game. In another example, a marketer rule within the CTIS may specify that an Ad for hybrid vehicles be served to all mothers with young children who have a history of scanning codes in Time magazine whenever the local price of gasoline is greater than $2.50/gallon and they scan a code in an issue of Time that contains articles on both global warming and the Iraq War. Such hyper-targeted information serving, enabled by the CTIS, may prove very valuable to marketers and, in fact, to a wide variety of information dissemination applications. Advertisers may be able to purchase Ad time and/or impressions that are conditional on events, people, time, place, ambient conditions, and/or combinations thereof, and/or the like. Consequently, a premium may be charged to advertisers for each Ad served, and that premium may increase with the number of factors considered in serving the Ad (i.e., the degree to which the Ad serving is targeted). In another implementation, a different price may be charged per impression depending on the characteristics of the individual to which the Ad is served. For example, the hybrid car Ad described above may cost an advertiser $0.75 for an impression to a mom with adult children but $1.00 for an impression to a mom with young children. Such graded pricing schemes may be specified within a marketing rule data structure.

In another embodiment, Ads may be served based on internet "climate", such as serving Ads for virus detection software during an outbreak or serving Ads for high-speed broadband internet service on days of high internet traffic. Conditions for specific websites (i.e., cyberspace-time positions) could even be taken into account. For example, an Ad for high-speed broadband internet service could be supplied to visitors of a website experiencing particularly high traffic.

In another embodiment, the CTIS may interface with various customer information databases, customer relationship management databases, and/or any other third party data sources in order to extract information that may be used to further target and/or refine Ad selection for a given user. In one implementation, a marketer may supply the CTIS with access to a given marketer-specific database and/or data feed, in order to allow the CTIS to access the information therein during Ad selection processes. It should be understood that the functionality described for this embodiment of the CTIS may be integrated or employed within any of the other CTIS embodiments described herein.

Figure 21:
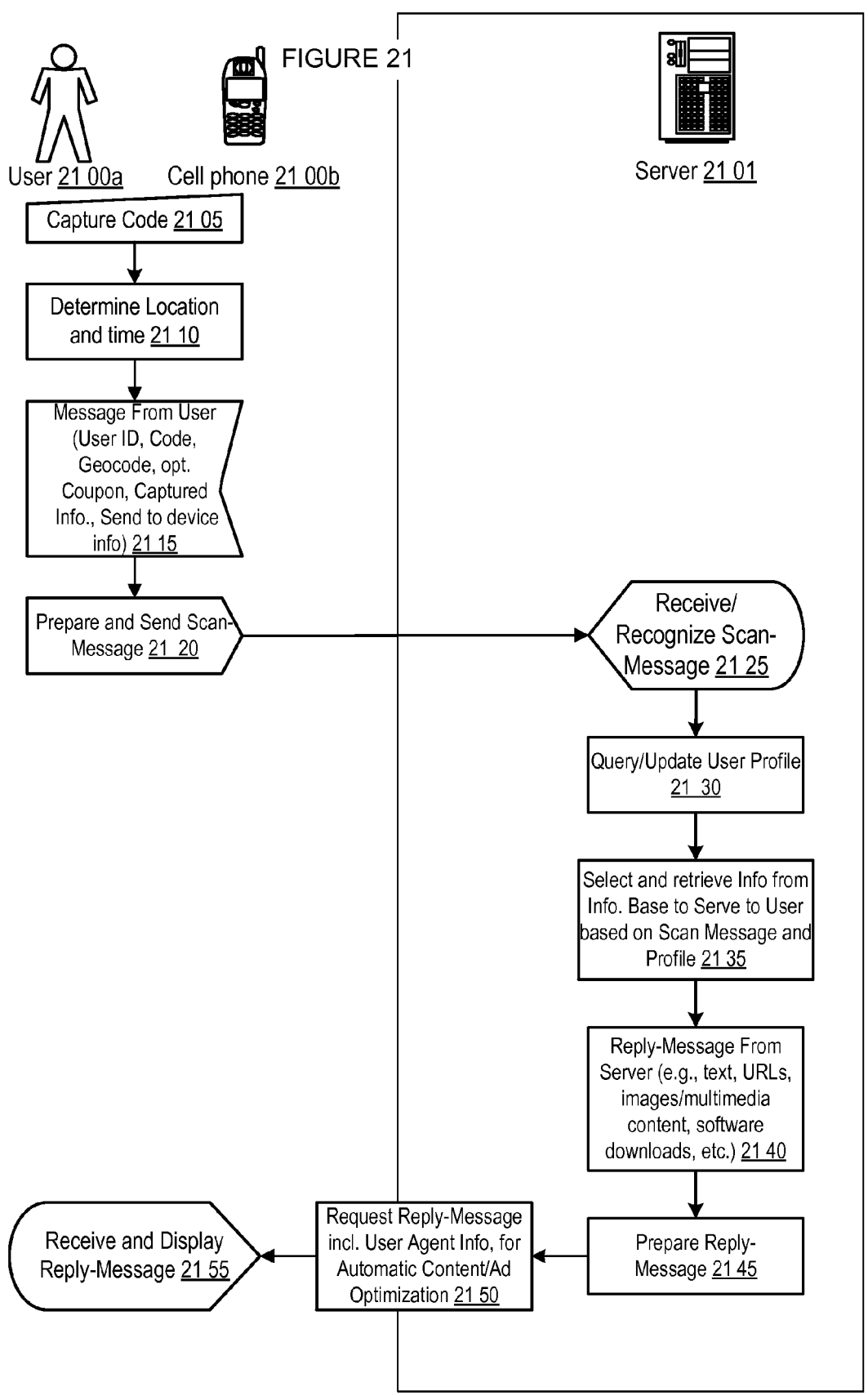
FIG. 21 shows a combined logic and data flow block diagram for an embodiment of the CTIS wherein Ads are served to a User Agent device.
Figure 22:
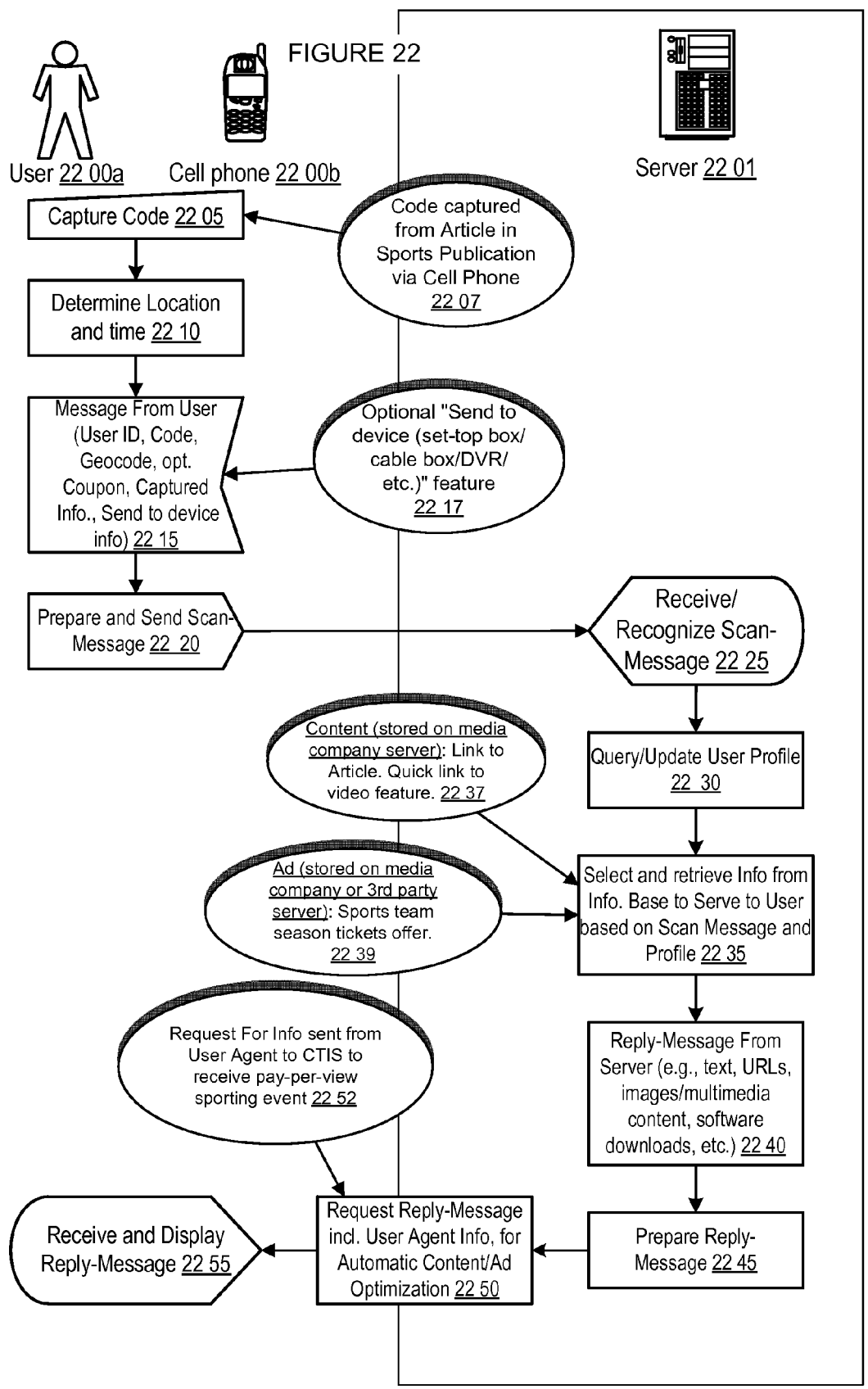
FIG. 22 shows a combined logic and data flow block diagram for a particular exemplary embodiment of the CTIS in which an Ad for a sports team's season tickets is served along with a pay-per-view event supplied directly to a user's cable box.
Figure 23:
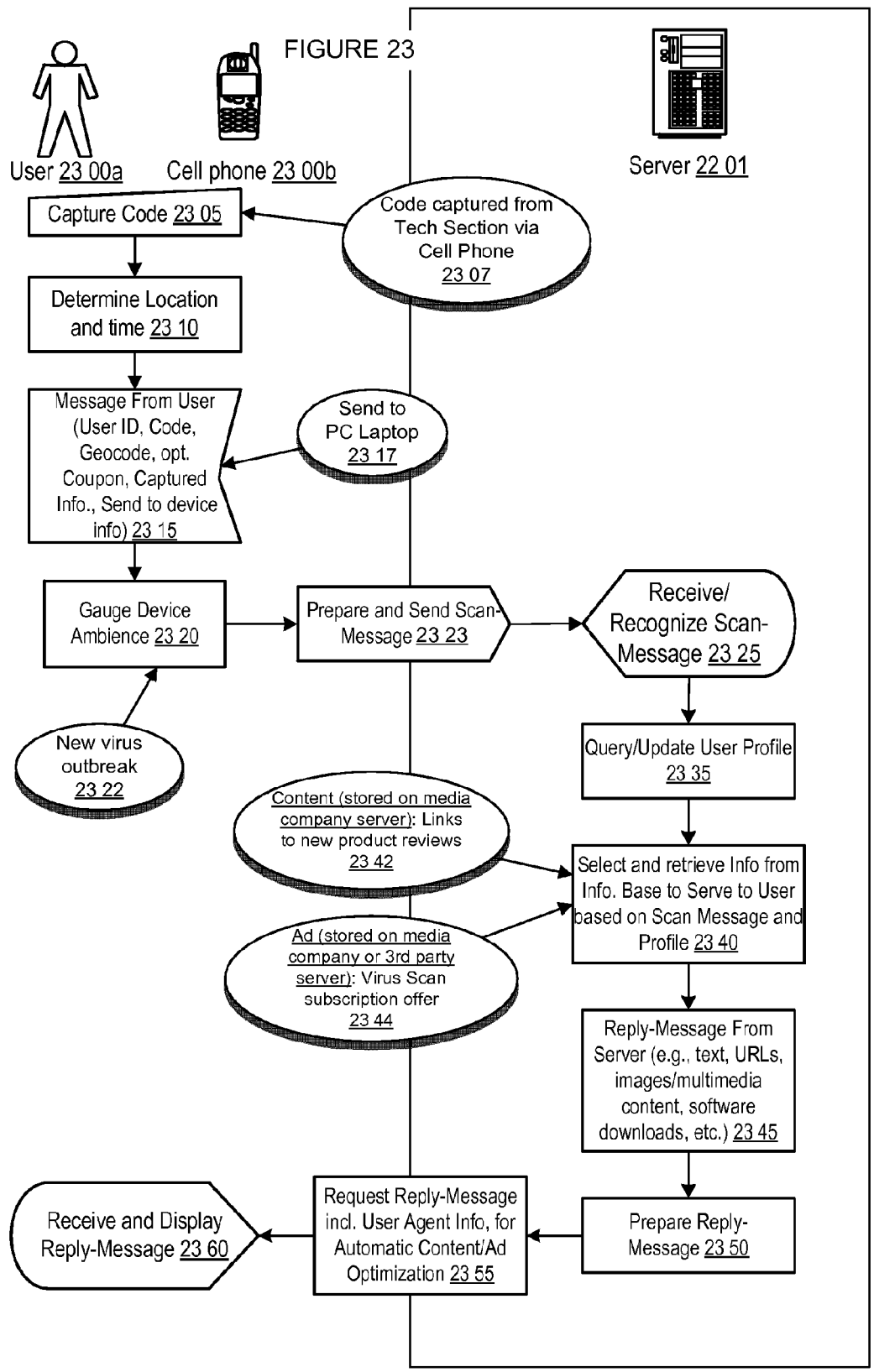
FIG. 23 shows a combined logic and data flow block diagram for a particular exemplary embodiment of the CTIS in which an Ad for virus scan subscription software is served.

In another embodiment, the CTIS can interface with and optimize Ads for various User Agent devices, which may include PCs, laptops, PDAs, DVRs, cable boxes, internet-coupled media devices, and generally with programmable electronic devices possessing external data transfer capabilities and/or the like. FIG. 21 provides an illustration of the logic and data flow in one embodiment. At 2115, the Scan Message content further incorporates an optional Send to Device info, which specifies the destination User Agent device for a particular Ad. Then, at 2150, the Ad content selected by the CTIS is configured and/or optimized for the User Agent device. Exemplary embodiments are provided in FIGS. 22 and 23. In FIG. 22, a code from a sports publication is scanned by a cell phone 2207, and a set-top-box/cable box/DVR User Agent device is specified in the optional Send to Device information of the Scan Message 2217. Consequently, in addition to contextual Ads supplied to the user's cell phone containing article/video links 2237 and season ticket offers 2239, additional content is configured and sent to the User Agent device, such as authorization to descramble a pay-per-view sporting event. In one embodiment, the user's mobile device would provide a signal to the User Agent device to cause it to send a Request for Info to the CTIS. In another embodiment, the CTIS could send an appropriately configured signal to the User Agent device without the need for a Request for Info signal. In FIG. 23, a code is scanned from the Tech section of a media publication using a cell phone 2307, and the optional Send to Device info in the Scan Message specifies to send to a PC laptop 2317. In accordance with the ambient conditions embodiment discussed previously, the CTIS gauges the ambient conditions associated with the device and determines that there has been a recent outbreak of a particular computer virus over the internet 2322. Consequently, the CTIS supplies an offer for Virus Scan software subscriptions 2344, and may send Virus Scan software directly to the specified PC laptop based on user response.

In another embodiment, the CTIS provides a mechanism of instituting plans for large-scale coordination of personnel using a single coded broadcast. High-level officials could determine which of a number of coordination plans to institute, each being associated with a unique 2D matrix code. When a plan is decided upon, the code is broadcast (such as over television or the internet) and lower-level employees scan the code to obtain instructions, diagrams, maps, etc. that are tailored to the employees' specific profile contents (i.e., job, skills, location, etc.). There may also be authorization information included in the employee profiles that determines whether they are allowed to decode the broadcast. As each employee progresses in their role within the plan, additional codes could be provided to the employee to scan, both to update their tasks and to track their progress, space-time trajectories, etc.

In another embodiment, the CTIS provides a means of employee tracking. For example, tasks are supplied to employees in the form of 2D matrix codes. When a code is scanned by a given employee, the scan is recorded in the employee's profile and the employee is provided with instructions specific to that task and their position within the organization. When the task is completed, the employee is provided with a completion code that, when scanned, records the employee's successful completion of that task and provides instructions for the next task and/or reward information. In this manner, a record of employee accomplishments is kept as well as information regarding the time taken by the employee to accomplish various tasks. A statistical record of an employee's experience by subject matter may also be generated and included in his/her profile using the CTIS.

In another embodiment, the CTIS can connect users based on user profiles. For example, in analogy to the "provider zone" breaches discussed above, the CTIS may also track the intersection of user space-time trajectories. In particular, if one user is within a specified distance of the projected space-time trajectory of another user with whom the first user is associated, a message may be sent to one or both users notifying them of their potential proximity. Further consideration of user profiles may also be utilized in such notifications.

In another embodiment, the CTIS can be used to provide information regarding consumer products that cannot be included on the product packaging. By scanning a code printed on a consumer product package, the user could be provided with nutritional information, ingredients, website links, coupons, etc. Additional advertisements could also be served based on the nature of the product scanned and the user profile. For example, a user who scans a container of mustard and has "grilling" listed among his/her interests may be served an advertisement and/or coupon for hot dogs in addition to the mustard information.

In another embodiment, the CTIS provides an efficient mechanism of serving real estate listings. For example, when a user scans a code related to real estate listings, the CTIS supplies him/her with advertisements and/or listings that are close to their geographic location and appropriate to their demographic profile (i.e., income, marital status, number of children, etc.). In addition, the CTIS may provide additional listings to the user based on projected breaches of zones corresponding to available homes or apartments that suit the user's profile.

In another embodiment, the CTIS expedites software downloads to a user's mobile device. For example, by scanning a 2D matrix code in an ad for a cell phone ringtone version of a popular song, the user can automatically download the ringtone to the cell phone with which they scan the code. The transaction is recorded in the user profile and may result in the display of an advertisement related to the latest album by the artist who recorded the ringtone song, or an album by a related artist, at some future time.

Code Triggered Information Server Controller

Figure 24:
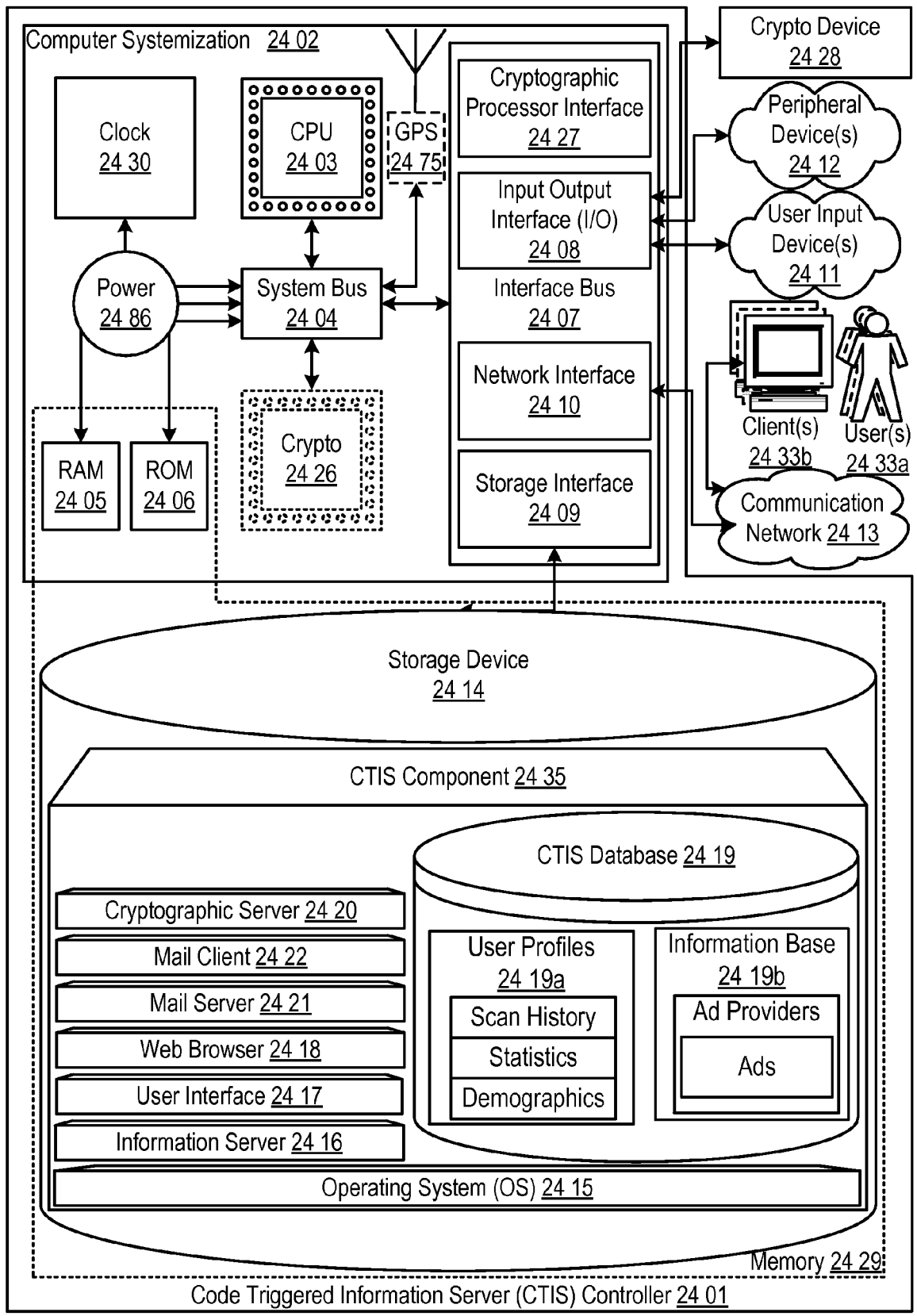
FIG. 24 shows a computer systemization of the CTIS.

FIG. 24 of the present disclosure illustrates inventive aspects of a code triggered information server controller 2401 in a block diagram. In this embodiment, the code triggered information server controller 2401 may serve to aggregate, process, store, search, serve, identify, instruct, generate, match, and/or update Scan Messages, Reply Messages, Ads, user profiles, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the code triggered information server controller 2401 may be connected to and/or communicate with entities such as, but not limited to: one or more users from user input devices 2411; peripheral devices 2412; a cryptographic processor device 2428; and/or a communications network 2413.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The code triggered information server controller 2401 may be based on common computer systems that may comprise, but are not limited to, components such as: a computer systemization 2402 connected to memory 2429.

Computer Systemization

A computer systemization 2402 may comprise a clock 2430, central processing unit (CPU) 2403, a read only memory (ROM) 2406, a random access memory (RAM) 2405, and/or an interface bus 2407, and most frequently, although not necessarily, are all interconnected and/or communicating through a system bus 2404. Optionally, the computer systemization may be connected to an internal power source 2486. Optionally, a cryptographic processor 2426 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the code triggered information server controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 2486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2486 is connected to at least one of the interconnected subsequent components of the code triggered information server thereby providing an electric current to all subsequent components. In one example, the power source 2486 is connected to the system bus component 2404. In an alternative embodiment, an outside power source 2486 is provided through a connection across the I/O 2408 interface. For example, a USB and/or IEEE 1394 connection carries both data and power across the connection and is therefore a suitable source of power.

Interface Adapters

Interface bus(ses) 2407 may accept, connect, and/or communicate to a number of interface adapters, conventionally although not necessarily in the form of adapter cards, such as but not limited to: input output interfaces (I/O) 2408, storage interfaces 2409, network interfaces 2410, and/or the like. Optionally, cryptographic processor interfaces 2427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2409 may accept, communicate, and/or connect to a number of storage devices such as, but not limited to: storage devices 2414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2410 may accept, communicate, and/or connect to a communications network 2413. Through a communications network 2413, the code triggered information server controller is accessible through remote clients 2433b (e.g., computers with web browsers) by users 2433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2410 may be used to engage with various communications network types 2413. For example, multiple network interfaces may be employed to allow for the communication over broadcast, multicast, and/or unicast networks.

Input Output interfaces (I/O) 2408 may accept, communicate, and/or connect to user input devices 2411, peripheral devices 2412, cryptographic processor devices 2428, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 2411 may be card readers, dongles, finger print readers, gloves, graphics tablets, joysticks, keyboards, mouse (mice), remote controls, retina readers, trackballs, trackpads, and/or the like.

Peripheral devices 2412 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the code triggered information server controller may be embodied as an embedded, dedicated, and/or monitor-less (i.e., headless) device, wherein access would be provided over a network interface connection.

Cryptographic units such as, but not limited to, microcontrollers, processors 2426, interfaces 2427, and/or devices 2428 may be attached, and/or communicate with the code triggered information server controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 2429. However, memory is a fungible technology and resource, thus, any number of memory embodiments may be employed in lieu of or in concert with one another. It is to be understood that the code triggered information server controller and/or a computer systemization may employ various forms of memory 2429. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 2429 will include ROM 2406, RAM 2405, and a storage device 2414. A storage device 2414 may be any conventional computer system storage. Storage devices may include a drum; a (fixed and/or removable) magnetic disk drive; a magneto-optical drive; an optical drive (i.e., CD ROM/RAM/ Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 2429 may contain a collection of program and/or database components and/or data such as, but not limited to: operating system component(s) 2415 (operating system); information server component(s) 2416 (information server); user interface component(s) 2417 (user interface); Web browser component(s) 2418 (Web browser); database(s) 2419; mail server component(s) 2421; mail client component(s) 2422; cryptographic server component(s) 2420 (cryptographic server); the code triggered information server component(s) 2435; and/or the like (i.e., collectively a component collection). These components may be stored and accessed from the storage devices and/or from storage devices accessible through an interface bus. Although non-conventional program components such as those in the component collection, typically, are stored in a local storage device 2414, they may also be loaded and/or stored in memory such as: peripheral devices, RAM, remote storage facilities through a communications network, ROM, various forms of memory, and/or the like.

Operating System

The operating system component 2415 is an executable program component facilitating the operation of the code triggered information server controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Microsoft Windows 2000/2003/3.1/95/98/ CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the code triggered information server controller to communicate with other entities through a communications network 2413. Various communication protocols may be used by the code triggered information server system controller as a subcarrier transport mechanism for interaction, such as, but not limited to: multicast, TCP/IP, UDP, unicast, and/or the like.

Information Server

An information server component 2416 is a stored program component that is executed by a CPU. The information server may be a conventional Internet information server such as, but not limited to Apache Software Foundation's Apache, Microsoft's Internet Information Server, and/or the. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the code triggered information server controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the code triggered information server database 2419, operating systems, other program components, user interfaces, Web browsers, and/or the like.

Access to the code triggered information server database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the code triggered information server. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the code triggered information server as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 2417 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the code triggered information server enabled nodes. The combined application may be nugatory on systems employing standard Web browsers.

Mail Server

A mail server component 2421 is a stored program component that is executed by a CPU 2403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the code triggered information server.

Access to the code triggered information server mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2422 is a stored program component that is executed by a CPU 2403. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2420 is a stored program component that is executed by a CPU 2403, cryptographic processor 2426, cryptographic processor interface 2427, cryptographic processor device 2428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the code triggered information server may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the code triggered information server component to engage in secure transactions if so desired. The cryptographic component facilitates the secure accessing of resources on the code triggered information server and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Code Triggered Information Server Database

The code triggered information server database component 2419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the code triggered information server database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the code triggered information server database is implemented as a data-structure, the use of the code triggered information server database 2419 may be integrated into another component such as the code triggered information server component 2435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2419 includes several tables 2419a,b. A user profile table 2419a includes fields such as, but not limited to: a user ID, name, email address, address, demographic profile, hardware ID, scan history record, scan statistics, and/or the like. The user profile table may support and/or track multiple entity accounts on a code triggered information server. An Information Base table 2419b includes fields such as, but not limited to: Ad provider ID, Ad ID, Ad content, Ad labels, geographic tags, temporal tags, subject tags, Ad ratings, Ad statistics, and/or the like.

In one embodiment, the code triggered information server database may interact with other database systems. For example, employing a distributed database system, queries and data access by OLBS modules may treat the combination of the code triggered information server database, an integrated data security layer database as a single database entity.

In one embodiment, user programs may contain various user interface primitives, which may serve to update the code triggered information server. Also, various accounts may require custom database tables depending upon the environments and the types of clients the code triggered information server may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2419a,b. The code triggered information server may be configured to keep track of various settings, inputs, and parameters via database controllers.

The code triggered information server database may communicate to and/or with other components in a component collection, including itself, and/or facilities of the like. Most frequently, the code triggered information server database communicates with the code triggered information server component, other program components, and/or the like. The database may contain, retain, and provide information regarding other nodes and data.

The Code Triggered Information Server

The code triggered information server component 2435 is a stored program component that is executed by a CPU. The code triggered information server affects accessing, obtaining and the provision of information, services, transactions, and/or the like across various communications networks.

The code triggered information server component enables the identification, generation, and aggregation of Scan Messages and Reply Messages.

The code triggered information server component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the code triggered information server server employs a cryptographic server to encrypt and decrypt communications. The code triggered information server component may communicate to and/or with other components in a component collection, including itself, and/or facilities of the like. Most frequently, the code triggered information server component communicates with the code triggered information server database, operating systems, other program components, and/or the like. The code triggered information server may contain, communicate, generate, obtain, and/or provide program component, system, user, and/or data communications, requests, and/or responses.

Distributed Code Triggered Information Server

The structure and/or operation of any of the code triggered information server node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the code triggered information server controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

Among the embodiments envisioned as being within the scope of the present invention are the following:

1. A processor-implemented method embodiment for serving ambient condition sensitive information to a mobile user, comprising:
accumulating user activity interest information;
accumulating user situational information;
associating the user activity interest information and user situational information with a user profile;
updating the user profile with the associated information in a database;
analyzing accumulated information associated with the user profile;
querying an information database based on the analysis of the user profile;
selecting information based on the user profile and ambient conditions at a user location to include in a message; and
sending the message to a user.

2. The method of embodiment 1, wherein the information included in the message sent to the user is selected based on a ranking.

3. The method of embodiment 1, further comprising receiving a relevance rating of the message sent to the user.

4. The method of embodiment 1, further comprising updating an Ad profile based on the user activity interest information and user situational information.

5. The method of embodiment 1, further, comprising:
determining information to include in a message based on the querying of the information database.

6. The method of embodiment 1, wherein the user situational information includes geographic location.

7. The method of embodiment 7, wherein the user situational information includes geographic location at a given time.

8. The method of embodiment 1, wherein the user situational information includes a context of a scanned code.

9. The method of embodiment 1, wherein the user situational information is continuously updated.

10. The method of embodiment 1, wherein the accumulated user activity interest information comprises a record of user behavior.

11. The method of embodiment 1, wherein the user activity interest information is comprised of a code scanned by a mobile device.

12. The method of embodiment 11, wherein the code is a matrix code and the scanned by a mobile device comprises taking a picture of the matrix code with a mobile device camera.

13. The method of embodiment 11, further comprising:
receiving an image of the scanned code at a server; and
wherein analyzing accumulated information associated with the user profile comprises matching the code image to a code image database.

14. The method of embodiment 13, wherein the image of the scanned code was sent via MMS.

15. The method of embodiment 14, wherein the message sent to the user is sent via MMS.

16. The method of embodiment 14, wherein the image of the scanned code was sent to a short code address.

17. The method of embodiment 13, further comprising:
performing an image enhancement on the image of the scanned code prior to matching the code image to a code image database.

18. The method of embodiment 1, wherein the message sent to the user is sent to a mobile device.

19. The method of embodiment 1, wherein the ambient conditions are measured by a user mobile device.

20. The method of embodiment 1, wherein the ambient conditions are retrieved from an ambient condition data feed.

21. The method of embodiment 1, wherein the ambient conditions comprise weather information.

22. The method of embodiment 1, wherein the ambient conditions comprise news information.

23. The method of embodiment 1, further comprising:
querying a marketer rule database to extract a marketer rule; and
wherein the selecting information is further based on implementation of the marketer rule.

24. The method of embodiment 1, further comprising:
querying a third party customer database to extract a customer record; and
wherein the selecting information is further based on the customer record.

25. A processor-implemented method embodiment for serving ambient condition sensitive information to a mobile user, comprising:
receiving at a server messages from a user comprised of user identification, mobile device identification, a code image scanned by the mobile device, time of the scan, and user geographic location at the time of the scan, wherein the messages were sent to a short code address via MMS;
associating the user identification with a user profile in a database;
updating the user profile with the received messages;
enhancing the code image scanned by the mobile device;
analyzing the accumulated messages in the user profile;
determining proper information to serve to the user based on the received message, the user profile, and ambient conditions at a user location;
selecting the information to serve to the user from a database;
incorporating the selected information into a reply message; and
sending the reply message to the user's mobile device via MMS.

26. A processor-implemented method embodiment for receiving ambient condition sensitive information, comprising:
accumulating user activity interest information;
accumulating user situational information, including ambient conditions at a user location;
incorporating user activity interest information in an interest message;
incorporating user situational information in a situational message;
sending the interest message to a server;
sending the situational message to the server; and
receiving a reply based on the interest message, the situational message, and a user profile.

27. The method of embodiment 26, wherein the interest message and situational message are bundled into a single message.

28. The method of embodiment 26, further comprising responding to the reply with a relevance rating.

29. The method of embodiment 26, wherein the reply is received on a mobile device.

30. The method of embodiment 26, wherein the interest message and situational message are sent from a mobile device.

31. The method of embodiment 26, wherein the user activity interest information is comprised of a code scanned by a mobile device.

32. The method of embodiment 26, wherein the user situational information includes geographic location at a given time.

33. A processor-implemented method embodiment of serving ambient condition sensitive information, comprising:
accumulating user activity interest information;
accumulating user situational information;
analyzing the user activity interest information and user situational information;
predicting expected user interest and situational information from the analysis;
determining serving information to serve to a user based on expected user interest information, expected user situational information, and ambient conditions at a user location;
selecting the information to serve from a database;
incorporating the selected information into a message;
determining a target time and place to send a message;
incorporating serving information and target time and place into a message; and
sending the message for distribution.

34. The method of embodiment 33, further, comprising:
querying and selecting the information to serve from a database.

35. The method of embodiment 34, further, comprising:
incorporating the selected information into a message.

36. The method of embodiment 33, further comprising receiving a relevance rating of the distributed message.

37. The method of embodiment 33, wherein the message is sent to a user.

38. The method of embodiment 33, wherein the proper place is an advertising system.

39. The method of embodiment 38, further, comprising:
querying and selecting the information to serve from a database.

40. The method of embodiment 39, further, comprising:
incorporating the selected information into a message.

41. The method of embodiment 40, wherein the message includes the target place and time.

42. The method of embodiment 41, wherein the message includes the determined serving information.

43. The method of embodiment 42, wherein the advertising system may use the target place and time information to place advertising for a user to observe.

44. The method of embodiment 41, further, comprising:
querying and selecting the information to serve from a database.

45. The method of embodiment 44, further, comprising:
incorporating the selected information into a placement message.

46. The method of embodiment 45, wherein the advertising system may use the target place and time information and placement message to place advertising for a user to observe.

47. The method of embodiment 33, wherein the user situational information is comprised of user space-time trajectories.

48. The method of embodiment 33, wherein the user situational information is comprised of user web-surfing habits.

49. The method of embodiment 33, wherein the user situational information is comprised of user trajectories in a virtual world.

50. The method of embodiment 33, wherein the information served to the user is sent to a mobile device.

51. The method of embodiment 33, wherein the information served to the user is served on a website.

52. The method of embodiment 33, wherein the information served to the user is served in a virtual world.

53. The method of embodiment 33, wherein the information served to the user is based on the user's geographic position.

54. The method of embodiment 33, wherein the information served to the user is based on the time.

55. A processor-implemented method embodiment for accumulating user information and delivering targeted content based thereon, comprising:
    accumulating user activity interest information;
    accumulating user situational information;
    associating the user activity interest information and user situational information with a user profile;
    updating the user profile with the associated information in a database;
    analyzing accumulated information associated with the user profile;
    querying an information database based on the analysis of the user profile;
    selecting information based on the user profile to include in a message; and
    sending the message to a user.

56. The method of embodiment 55, wherein the information included in the message sent to the user is selected based on a ranking.

57. The method of embodiment 55, further comprising receiving a relevance rating of the message sent to the user.

58. The method of embodiment 55, further comprising updating an Ad profile based on the user activity interest information and user situational information.

59. The method of embodiment 55, further, comprising:
    determining information to include in a message based on the querying of the information database.

60. The method of embodiment 55, wherein the user situational information includes geographic location.

61. The method of embodiment 60, wherein the user situational information includes geographic location at a given time.

62. The method of embodiment 55, wherein the user situational information includes a context of a scanned code.

63. The method of embodiment 55, wherein the user situational information is continuously updated.

64. The method of embodiment 55, wherein the accumulated user activity interest information comprises a record of user behavior.

65. The method of embodiment 55, wherein the user activity interest information is comprised of a code scanned by a mobile device.

66. The method of embodiment 65, wherein the code is a matrix code and the scanned by a mobile device comprises taking a picture of the matrix code with a mobile device camera.

67. The method of embodiment 65, further comprising:
    receiving an image of the scanned code at a server; and
    wherein analyzing accumulated information associated with the user profile comprises matching the code image to a code image database.

68. The method of embodiment 67, wherein the image of the scanned code was sent via MMS.

69. The method of embodiment 68, wherein the message sent to the user is sent via MMS.

70. The method of embodiment 69, wherein the image of the scanned code was sent to a short code address.

71. The method of embodiment 70, further comprising:
    performing an image enhancement on the image of the scanned code prior to matching the code image to a code image database.

72. The method of embodiment 55, wherein the message sent to the user is sent to a mobile device.

73. The method of embodiment 55, wherein the message sent to the user is served on a website.

74. The method of embodiment 55, further comprising:
    querying a marketer rule database to extract a marketer rule; and
    wherein the selecting information is further based on implementation of the marketer rule.

75. The method of embodiment 55, further comprising:
    querying a third party customer database to extract a customer record; and
    wherein the selecting information is further based on the customer record.

76. A processor-implemented method embodiment for accumulating mobile device code scan information from a user and delivering content based thereon, comprising:
    receiving at a server messages from a user comprised of user identification, mobile device identification, a code image scanned by the mobile device, time of the scan, and user geographic location at the time of the scan, wherein the messages were sent to a shortcode address via MMS;
    associating the user identification with a user profile in a database;
    updating the user profile with the received messages;
    enhancing the code image scanned by the mobile device;
    analyzing the accumulated messages in the user profile;
    determining proper information to serve to the user based on the received message and the user profile;
    selecting the information to serve to the user from a database;
    incorporating the selected information into a reply message; and
    sending the reply message to the user's mobile device via MMS.

77. A processor-implemented method embodiment for receiving information based on accumulated user activity and situational information, comprising:
    accumulating user activity interest information;
    accumulating user situational information;
    incorporating user activity interest information in an interest message;
    incorporating user situational information in a situational message;
    sending the interest message to a server;
    sending the situational message to the server; and
    receiving a reply based on the interest message, the situational message, and a user profile.

78. The method of embodiment 77, wherein the interest message and situational message are bundled into a single message.

79. The method of embodiment 77, further comprising responding to the reply with a relevance rating.

80. The method of embodiment 77, wherein the reply is received on a mobile device.

81. The method of embodiment 77, wherein the interest message and situational message are sent from a mobile device.

82. The method of embodiment 77, wherein the user activity interest information is comprised of a code scanned by a mobile device.

83. The method of embodiment 77, wherein the user situational information includes geographic location at a given time.

84. A processor-implemented method embodiment of selecting data from a database based on user activity interest information, comprising:
filtering data in the database by activity subject tags;
determining which remaining data match:
user demographic category tags;
user geographic location tags;
user temporal tags;
selecting the data with the greatest number of matches; and
choosing a single datum from the remaining data.

85. The method of embodiment 84, wherein the data filtered by activity subject tags are further matched to user subject interest tags.

86. The method of embodiment 84, wherein the data filtered by activity subject tags are further matched to user hardware identification tags.

87. The method of embodiment 84, wherein the data are ads.

88. A processor-implemented method embodiment for predicting user interest and situations and supplying information to the user based thereon, comprising:
accumulating user activity interest information;
accumulating user situational information;
analyzing the user activity interest information and user situational information;
predicting expected user interest and situational information from the analysis;
determining serving information to serve to a user based on expected user interest and situational information;
selecting the information to serve from a database;
incorporating the selected information into a message;
determining a target time and place to send a message;
incorporating serving information and target time and place into a message; and
sending the message for distribution.

89. The method of embodiment 88, further, comprising:
querying and selecting the information to serve from a database.

90. The method of embodiment 89, further, comprising:
incorporating the selected information into a message.

91. The method of embodiment 88, further comprising receiving a relevance rating of the distributed message.

92. The method of embodiment 88, wherein the message is sent to a user.

93. The method of embodiment 88, wherein the proper place is an advertising system.

94. The method of embodiment 93, further, comprising:
querying and selecting the information to serve from a database.

95. The method of embodiment 94, further, comprising:
incorporating the selected information into a message.

96. The method of embodiment 95, wherein the message includes the target place and time.

97. The method of embodiment 96, wherein the message includes the determined serving information.

98. The method of embodiment 97, wherein the advertising system may use the target place and time information to place advertising for a user to observe.

99. The method of embodiment 96, further, comprising:
querying and selecting the information to serve from a database.

100. The method of embodiment 99, further, comprising:
incorporating the selected information into a placement message.

101. The method of embodiment 100, wherein the advertising system may use the target place and time information and placement message to place advertising for a user to observe.

102. The method of embodiment 88, wherein the user situational information is comprised of user space-time trajectories.

103. The method of embodiment 88, wherein the user activity interest information is comprised of a code scanned by a mobile device.

104. The method of embodiment 103, wherein the code is a matrix code and the scanned by a mobile device comprises taking a picture of the matrix code with a mobile device camera.

105. The method of embodiment 104, further comprising:
receiving an image of the scanned code at a server; and
wherein analyzing accumulated information associated with the user profile comprises matching the code image to a code image database.

106. The method of embodiment 105, wherein the image of the scanned code was sent via MMS.

107. The method of embodiment 106, wherein the message sent to the user is sent via MMS.

108. The method of embodiment 106 wherein the image of the scanned code was sent to a short code address.

109. The method of embodiment 105 further comprising:
performing an image enhancement on the image of the scanned code prior to matching the code image to a code image database.

110. The method of embodiment 88, wherein the information served to the user is sent to a mobile device.

111. The method of embodiment 88, wherein the information served to the user is based on the user's geographic position.

112. A processor-implemented method embodiment for predicting user interest and situations and supplying information to the user based thereon, comprising:
accumulating at a server a plurality of code images scanned by a user's mobile device and sent to a short code address via MMS;
accumulating user situational information;
analyzing the user activity interest information and user situational information;
predicting expected user interest and situational information from the analysis;
determining serving information to serve to a user based on expected user interest and situational information;
selecting the information to serve from a database;
incorporating the selected information into a message;
determining a target time and place to send a message;
incorporating serving information and target time and place into a message; and
sending the message for distribution via MMS.

113. A processor-implemented method embodiment for scoring data based on a user profile and situational information and selecting data from a database, comprising:
assigning the same initial score to every datum;
multiplying each datum's score by a subject coefficient for every match between the datum's subject tag and subject tags in a user profile;
multiplying each datum's score by a temporal coefficient for a match between the datum's temporal tag and a temporal tag in a user profile;

multiplying each datum's score by a demographic coefficient for a match between the datum's demographic tags and demographic tags in a user profile;
selecting the highest scoring data; and
selecting a single datum from the remaining data.

114. The method of embodiment 113, wherein each datum's score is further multiplied by a geographic coefficient for every match between the datum's geographic tags and the geographic tags in a user profile.

115. The method of embodiment 113, wherein each datum's score is further multiplied by a hardware coefficient for every match between the datum's hardware identification tags and the hardware identification tags in a user profile.

116. The method of embodiment 113 wherein the data are ads.

117. A processor-implemented method embodiment for coordinating personnel based on delivered personnel directives, comprising:
accumulating user activity information;
accumulating user situational information;
associating the user activity interest information and user situational information with a user profile;
updating the user profile with the associated information in a database;
analyzing accumulated information associated with the user profile;
querying an information database based on the analysis of the user profile;
selecting information based on the user profile to include in a personnel directive; and
sending the personnel directive to a user.

118. The method of embodiment 117, wherein the information included in the personnel directive sent to the user is selected based on a ranking.

119. The method of embodiment 118, wherein the ranking is based on the user's employment status.

120. The method of embodiment 118, wherein the ranking is based on the user's progress in accomplishing a series of tasks.

121. The method of embodiment 117, further comprising receiving a relevance rating of the personnel directive sent to the user.

122. The method of embodiment 117, further comprising updating an Ad profile based on the user activity interest information and user situational information.

123. The method of embodiment 117, wherein the information included in the personnel directive sent to the user is selected based on ambient conditions.

124. The method of embodiment 117, further, comprising:
determining information to include in a personnel directive based on the querying of the information database.

125. The method of embodiment 117, wherein the user situational information includes geographic location.

126. The method of embodiment 125, wherein the user situational information includes geographic location at a given time.

127. The method of embodiment 117, wherein the user activity information is comprised of a code scanned by a mobile device.

128. The method of embodiment 127, wherein the code is a matrix code and the scanned by a mobile device comprises taking a picture of the matrix code with a mobile device camera.

129. The method of embodiment 128 further comprising:
receiving an image of the scanned code at a server; and
wherein analyzing accumulated information associated with the user profile comprises matching the code image to a code image database.

130. The method of embodiment 129, wherein the image of the scanned code was sent via MMS.

131. The method of embodiment 130, wherein the message sent to the user is sent via MMS.

132. The method of embodiment 130, wherein the image of the scanned code was sent to a short code address.

133. The method of embodiment 129, further comprising:
performing an image enhancement on the image of the scanned code prior to matching the code image to a code image database.

134. The method of embodiment 117, wherein the user activity information is comprised of an internet link chosen by the user.

135. The method of embodiment 117, wherein the user activity information is comprised of user decisions within a virtual world.

136. The method of embodiment 117, wherein the personnel directive sent to the user is sent to a mobile device.

137. The method of embodiment 117, wherein the personnel directive sent to the user is served on a website.

138. The method of embodiment 117, wherein the personnel directive sent to the user is served within a virtual world.

139. A processor-implemented method embodiment for coordinating personnel by serving personnel directives to a mobile device, comprising:
receiving at a server messages from a user comprised of user identification, mobile device identification, a code image scanned by the mobile device, time of the scan, and user geographic location at the time of the scan, wherein the messages are sent to a short code address via MMS;
associating the user identification with a user profile in a database;
updating the user profile with the received messages;
enhancing the code image scanned by the mobile device;
analyzing the accumulated messages in the user profile;
determining proper information to serve to the user based on the received message and the user profile;
selecting the information to serve to the user from a database;
incorporating the selected information into a personnel directive; and
sending the personnel directive to the user's mobile device via MMS.

140. A processor-implemented method embodiment for receiving personnel directives, comprising:
accumulating user activity information;
accumulating user situational information;
incorporating user activity information in an activity message;
incorporating user situational information in a situational message;
sending the activity message to a server;
sending the situational message to the server; and
receiving a personnel directive based on the activity message, the situational message, and a user profile.

141. The method of embodiment 140, wherein the activity message and situational message are bundled into a single message.

142. The method of embodiment 140, further comprising responding to the personnel directive with a relevance rating.

143. The method of embodiment 140, wherein the personnel directive is received on a mobile device.

144. The method of embodiment 140, wherein the activity message and situational message are sent from a mobile device.

145. The method of embodiment 140, wherein the user activity information is comprised of a code scanned by a mobile device.

146. The method of embodiment 140, wherein the user activity information is comprised of an internet link chosen by a user.

147. The method of embodiment 140, wherein the user activity information is comprised of user decisions within a virtual world.

148. The method of embodiment 140, wherein the user situational information includes geographic location at a given time.

149. A processor-implemented method embodiment for coordinating personnel based on delivered personnel directives, comprising:
   accumulating user activity information;
   accumulating user situational information;
   analyzing the user activity interest information and user situational information;
   predicting expected user activity and situational information from the analysis;
   determining serving information to serve to a user based on expected user activity and situational information;
   selecting the information to serve from a database;
   incorporating the selected information into a personnel directive;
   determining a target time and place to send the personnel directive;
   incorporating the personnel directive and target time and place into a message; and
   sending the message for distribution.

150. The method of embodiment 149, further, comprising:
   querying and selecting the personnel directive from a database.

151. The method of embodiment 150, further, comprising:
   incorporating the selected personnel directive into a message.

152. The method of embodiment 149, wherein the expected situational information includes ambient conditions.

153. The method of embodiment 149, further comprising receiving a relevance rating of the distributed message.

154. The method of embodiment 149, wherein the message is sent to a user.

155. The method of embodiment 149, wherein the message is sent to a distribution system.

156. The method of embodiment 155, further, comprising:
   querying and selecting the personnel directive to serve from a database.

157. The method of embodiment 156, further, comprising:
   incorporating the selected personnel directive into a message.

158. The method of embodiment 157, wherein the message includes the target place and time.

159. The method of embodiment 158, wherein the message includes the determined serving information.

160. The method of embodiment 159, wherein the distribution system may use the target place and time information to place a personnel directive for a user to observe.

161. The method of embodiment 158, further, comprising:
   querying and selecting the personnel directive to serve from a database.

162. The method of embodiment 161, further, comprising:
   incorporating the selected personnel directive into a placement message.

163. The method of embodiment 162, wherein the distribution system may use the target place and time information and placement message to place personnel directives for a user to observe.

164. The method of embodiment 149, wherein the user situational information is comprised of user space-time trajectories.

165. The method of embodiment 149, wherein the user situational information is comprised of user web-surfing habits.

166. The method of embodiment 149, wherein the user situational information is comprised of user trajectories in a virtual world.

167. The method of embodiment 149, wherein the personnel directive served to the user is sent to a mobile device.

168. The method of embodiment 149, wherein the personnel directive served to the user is served on a website.

169. The method of embodiment 149, wherein the personnel directive served to the user is served in a virtual world.

170. The method of embodiment 149, wherein the personnel directive served to the user is based on the user's geographic position.

171. The method of embodiment 149, wherein the personnel directive served to the user is based on the time.

172. The method of embodiment 149, wherein the personnel directive is based on the user's employment status.

173. The method of embodiment 149, wherein the personnel directive is based on the user's progress in accomplishing a series of tasks.

174. A processor-implemented method embodiment for selecting data from a database based on user activity information and employment status, comprising:
   filtering data in the database by user employment status tags;
   filtering data in the database by activity subject tags;
   determining which remaining data match:
      user geographic location tags;
      user temporal tags;
   selecting the data with the greatest number of matches; and
   choosing a single datum from the remaining data.

175. The method of embodiment 174, wherein the data filtered by activity subject tags are further matched to user subject interest tags.

176. The method of embodiment 174, wherein the data filtered by activity subject tags are further matched to user demographic tags.

177. The method of embodiment 174, wherein the data filtered by activity subject tags are further matched to user hardware identification tags.

178. The method of embodiment 174, wherein the data are personnel directives.

179. A processor-implemented method embodiment for selecting data from a database based on employment status, subject, and time, comprising:
   assigning the same initial score to every datum;
   multiplying each datum's score by a status coefficient for every match between the datum's employment status tag and employment status tag in a user profile;
   multiplying each datum's score by a subject coefficient for every match between the datum's subject tag and subject tags in a user profile;
   multiplying each datum's score by a temporal coefficient for a match between the datum's temporal tag and a temporal tag in a user profile;

selecting the highest scoring data; and
selecting a single datum from the remaining data.

180. The method of embodiment 179, wherein each datum's score is further multiplied by a demographic coefficient for a match between the datum's demographic tags and demographic tags in a user profile.

181. The method of embodiment 179, wherein each datum's score is further multiplied by a geographic coefficient for a match between the datum's geographic tags and the geographic tags in a user profile.

182. The method of embodiment 179, wherein each datum's score is further multiplied by a hardware coefficient for a match between the datum's hardware identification tags and the hardware identification tags in a user profile.

183. The method of embodiment 179 wherein the data are personnel directives.

184. A processor-implemented method embodiment for generating proximity notifications indicating proximities between users, comprising:
accumulating user situational information;
accumulating user association information;
analyzing the user situational information;
predicting expected user interest and situational information from the analysis;
determining if a user is in proximity with other users contained in the user association information; and
notifying a user of the proximity.

185. The method of embodiment 184, wherein the user situational information is comprised of user space-time trajectories.

186. The method of embodiment 184, wherein the user situational information is comprised of user web surfing habits.

187. The method of embodiment 184, wherein the user situational information is comprised of user trajectories in a virtual world.

188. The method of embodiment 184, further comprising notifying any of the other users of the proximity.

189. The method of embodiment 184, wherein the notification of proximity is further based on user profiles.

190. The method of embodiment 184, wherein the user situational information is comprised of a location corresponding to a code scanned by a mobile device.

191. The method of embodiment 190, wherein the code is a matrix code and the scanned by a mobile device comprises taking a picture of the matrix code with a mobile device camera.

192. The method of embodiment 191 further comprising: receiving an image of the scanned code at a server.

193. The method of embodiment 192, wherein the image of the scanned code was sent via MMS.

194. The method of embodiment 193, wherein the message sent to the user is sent via MMS.

195. The method of embodiment 193, wherein the image of the scanned code was sent to a short code address.

196. The method of embodiment 192, further comprising:
performing an image enhancement on the image of the scanned code.

197. A processor-implemented method embodiment for serving information to users within a virtual world based on accumulated user information, comprising:
accumulating user activity interest information;
accumulating user situational information;
associating the user activity interest information and user situational information with a user profile;
updating the user profile with the associated information in a database;
analyzing accumulated information associated with the user profile;
querying an information database based on the analysis of the user profile;
selecting information based on the user profile to include in a message; and
serving the message in a virtual world.

198. The method of embodiment 197, wherein the information included in the message sent to the user is selected based on a ranking.

199. The method of embodiment 197, further comprising receiving a relevance rating of the message sent to the user.

200. The method of embodiment 197, further comprising updating an Ad profile based on the user activity interest information and user situational information.

201. The method of embodiment 197, wherein the information included in the message sent to the user is selected based on ambient conditions within the virtual world.

202. The method of embodiment 197, further, comprising:
determining information to include in a message based on the querying of the information database.

203. The method of embodiment 197, wherein the user situational information includes geographic location.

204. The method of embodiment 203, wherein the user situational information includes geographic location at a given time.

205. The method of embodiment 197, wherein the user situational information includes location within a virtual world.

206. The method of embodiment 205, wherein the user situational information includes location within a virtual world at a given time.

207. The method of embodiment 197, wherein the user activity interest information is comprised of a code scanned by a mobile device.

208. The method of embodiment 197, wherein the user activity interest information is comprised of an internet link chosen by the user.

209. The method of embodiment 197, wherein the user activity interest information is comprised of a user decision within a virtual world.

210. The method of embodiment 197, wherein the message sent to the user is sent to a mobile device.

211. A processor-implemented method embodiment for serving information in a virtual world based on accumulated user information, comprising:
receiving messages from a user comprised of user identification, a user decision within a virtual world, time of the decision, and user location within the virtual world at the time of the decision;
associating the user identification with a user profile in a database;
updating the user profile with the received messages;
analyzing the accumulated messages in the user profile;
determining proper information to serve to the user based on the received message and the user profile;
selecting the information to serve to the user from a database;
incorporating the selected information into a reply message; and
serving the reply message within the virtual world.

212. A processor-implemented method embodiment for receiving information within a virtual world, comprising:
accumulating user activity interest information;
accumulating user situational information;
incorporating user activity interest information in an interest message;

incorporating user situational information in a situational message;
sending the interest message to a server;
sending the situational message to the server; and
receiving a reply that is displayed within a virtual world based on the interest message, the situational message, and a user profile.

213. The method of embodiment 212, wherein the interest message and situational message are bundled into a single message.

214. The method of embodiment 212, further comprising responding to the reply with a relevance rating.

215. The method of embodiment 212, wherein the reply is received on a mobile device.

216. The method of embodiment 212, wherein the interest message and situational message are sent from a mobile device.

217. The method of embodiment 212, wherein the user activity interest information is comprised of a code scanned by a mobile device.

218. The method of embodiment 212, wherein the user activity interest information is comprised of a user decision within a virtual world.

219. The method of embodiment 212, wherein the user situational information includes geographic location at a given time.

220. The method of embodiment 212, wherein the user situational information includes location within a virtual world at a given time.

221. A processor-implemented method embodiment for serving information within a virtual world based on accumulated user information, comprising:
accumulating user activity interest information;
accumulating user situational information;
analyzing the user activity interest information and user situational information;
predicting expected user interest and situational information from the analysis;
determining serving information to serve to a user based on expected user interest and situational information;
selecting the information to serve from a database;
incorporating the selected information into a message;
determining a target time and place to send a message;
incorporating serving information and target time and place into a message; and
sending the message for distribution within a virtual world.

222. The method of embodiment 221, further, comprising:
querying and selecting the information to serve from a database.

223. The method of embodiment 222, further, comprising:
incorporating the selected information into a message.

224. The method of embodiment 221, wherein the expected situational information includes ambient conditions within a virtual world.

225. The method of embodiment 221, further comprising receiving a relevance rating of the distributed message.

226. The method of embodiment 221, wherein the message is served to a user.

227. The method of embodiment 221, wherein the message is sent to an advertising system.

228. The method of embodiment 227, further, comprising:
querying and selecting the information to serve from a database.

229. The method of embodiment 228, further, comprising:
incorporating the selected information into a message.

230. The method of embodiment 229, wherein the message includes the target location within a virtual world and time.

231. The method of embodiment 230, wherein the message includes the determined serving information.

232. The method of embodiment 231, wherein the advertising system may use the target location within a virtual world and time information to place advertising for a user to observe.

233. The method of embodiment 230, further, comprising:
querying and selecting the information to serve from a database.

234. The method of embodiment 233, further, comprising:
incorporating the selected information into a placement message.

235. The method of embodiment 234, wherein the advertising system may use the target location within a virtual world and time information and placement message to place advertising for a user to observe.

236. The method of embodiment 221, wherein the user situational information is comprised of user space-time trajectories.

237. The method of embodiment 221, wherein the user situational information is comprised of user trajectories within a virtual world.

238. The method of embodiment 221, wherein the information served to the user is sent to a mobile device.

239. The method of embodiment 221, wherein the information served to the user is based on the user's geographic position.

240. The method of embodiment 221, wherein the information served to the user is based on the user's position within a virtual world.

241. The method of embodiment 221, wherein the information served to the user is based on the time.

242. A processor-implemented method embodiment for selecting data from a database based on user virtual world activity interest and situational information, comprising:
filtering data in the database by virtual world decision subject tags;
determining which remaining data match:
user demographic category tags;
user virtual world location tags;
user temporal tags;
selecting the data with the greatest number of matches; and
choosing a single datum from the remaining data.

243. The method of embodiment 242, wherein the data filtered by website subject tags are further matched to user subject interest tags.

244. The method of embodiment 242, wherein the data are ads.

245. A processor-implemented method embodiment for selecting data from a database based on a virtual world location, comprising:
assigning the same initial score to every datum;
multiplying each datum's score by a subject coefficient for every match between the datum's subject tag and subject tags in a user profile;
multiplying each datum's score by a temporal coefficient for a match between the datum's temporal tag and a temporal tag in a user profile;
multiplying each datum's score by a demographic coefficient for a match between the datum's demographic tags and demographic tags in a user profile;
multiplying each datum's score by a virtual world location coefficient for every match between the datum's virtual world location tags and the virtual world location tags in the user profile;
selecting the highest scoring data; and
selecting a single datum from the remaining data.

246. The method of embodiment 245 wherein the data are ads.

247. A processor-implemented method embodiment for tracking user information on the internet and serving information to users based thereon, comprising:
   accumulating user activity interest information;
   accumulating user situational information;
   associating the user activity interest information and user situational information with a user profile;
   updating the user profile with the associated information in a database;
   analyzing accumulated information associated with the user profile;
   querying an information database based on the analysis of the user profile;
   selecting information based on the user profile to include in a message; and
   serving the message on a website.

248. The method of embodiment 247, wherein the information included in the message sent to the user is selected based on a ranking.

249. The method of embodiment 247, further comprising receiving a relevance rating of the message sent to the user.

250. The method of embodiment 247, further comprising updating an Ad profile based on the user activity interest information and user situational information.

251. The method of embodiment 247, wherein the information included in the message sent to the user is selected based on ambient conditions.

252. The method of embodiment 247, further, comprising:
   determining information to include in a message based on the querying of the information database.

253. The method of embodiment 247, wherein the user situational information includes geographic location.

254. The method of embodiment 253, wherein the user situational information includes geographic location at a given time.

255. The method of embodiment 247, wherein the user activity interest information is comprised of a code scanned by a mobile device.

256. The method of embodiment 247, wherein the user activity interest information is comprised of an internet link chosen by the user.

257. The method of embodiment 247, wherein the message sent to the user is sent to a mobile device.

258. A processor-implemented method embodiment for tracking user information on the internet and serving information to a mobile device based thereon, comprising:
   receiving messages from a user comprised of user identification, mobile device identification, a code scanned by the mobile device, time of the scan, and user geographic location at the time of the scan;
   associating the user identification with a user profile in a database;
   updating the user profile with the received messages;
   analyzing the accumulated messages in the user profile;
   determining proper information to serve to the user based on the received message and the user profile;
   selecting the information to serve to the user from a database;
   incorporating the selected information into a reply message; and
   serving the reply message on a website.

259. A processor-implemented method embodiment for receiving information on the internet based on accumulated user information, comprising:
   accumulating user activity interest information;
   accumulating user situational information;
   incorporating user activity interest information in an interest message;
   incorporating user situational information in a situational message;
   sending the interest message to a server;
   sending the situational message to the server; and
   receiving a reply that is displayed on a website based on the interest message, the situational message, and a user profile.

260. The method of embodiment 259, wherein the interest message and situational message are bundled into a single message.

261. The method of embodiment 259, further comprising responding to the reply with a relevance rating.

262. The method of embodiment 259, wherein the reply is received on a mobile device.

263. The method of embodiment 259, wherein the interest message and situational message are sent from a mobile device.

264. The method of embodiment 259, wherein the user activity interest information is comprised of a code scanned by a mobile device.

265. The method of embodiment 259, wherein the user activity interest information is comprised of an internet link chosen by a user.

266. The method of embodiment 259, wherein the user situational information includes geographic location at a given time.

267. A processor-implemented method embodiment for serving information on a website based on accumulated user information, comprising:
   accumulating user activity interest information;
   accumulating user situational information;
   analyzing the user activity interest information and user situational information;
   predicting expected user interest and situational information from the analysis;
   determining serving information to serve to a user based on expected user interest and situational information;
   selecting the information to serve from a database;
   incorporating the selected information into a message;
   determining a target time and place to send a message;
   incorporating serving information and target time and place into a message; and
   sending the message for distribution on a website.

268. The method of embodiment 267, further, comprising:
   querying and selecting the information to serve from a database.

269. The method of embodiment 268, further, comprising:
   incorporating the selected information into a message.

270. The method of embodiment 267, wherein the expected situational information includes ambient conditions.

271. The method of embodiment 267, further comprising receiving a relevance rating of the distributed message.

272. The method of embodiment 267, wherein the message is served to a user.

273. The method of embodiment 267, wherein the message is sent to an advertising system.

274. The method of embodiment 273, further, comprising:
   querying and selecting the information to serve from a database.

275. The method of embodiment 274, further, comprising:
   incorporating the selected information into a message.

276. The method of embodiment 275, wherein the message includes the target place and time.

277. The method of embodiment 276, wherein the message includes the determined serving information.

278. The method of embodiment 277, wherein the advertising system may use the target place and time information to place advertising for a user to observe.

279. The method of embodiment 276, further, comprising:
   querying and selecting the information to serve from a database.

280. The method of embodiment 279, further, comprising:
   incorporating the selected information into a placement message.

281. The method of embodiment 280, wherein the advertising system may use the target place and time information and placement message to place advertising for a user to observe.

282. The method of embodiment 267, wherein the user situational information is comprised of user space-time trajectories.

283. The method of embodiment 267, wherein the user situational information is comprised of user web-surfing habits.

284. The method of embodiment 267, wherein the information served to the user is sent to a mobile device.

285. The method of embodiment 267, wherein the information served to the user is based on the user's geographic position.

286. The method of embodiment 267, wherein the information served to the user is based on the time.

287. A processor-implemented method embodiment for selecting data from a database based on user website interest information, comprising:
   filtering data in the database by website subject tags;
   determining which remaining data match:
      user demographic category tags;
      user current website tags;
      user temporal tags;
   selecting the data with the greatest number of matches; and
   choosing a single datum from the remaining data.

288. The method of embodiment 287, wherein the data filtered by website subject tags are further matched to user subject interest tags.

289. The method of embodiment 287, wherein the data filtered by website subject tags are further matched to user hardware identification tags.

290. The method of embodiment 287, wherein the data are ads.

291. A processor-implemented method embodiment for selecting data from a database based on correlations between a user profile and a datum's website association, comprising:
   assigning the same initial score to every datum;
   multiplying each datum's score by a subject coefficient for every match between the datum's subject tag and subject tags in a user profile;
   multiplying each datum's score by a temporal coefficient for a match between the datum's temporal tag and a temporal tag in a user profile;
   multiplying each datum's score by a demographic coefficient for a match between the datum's demographic tags and demographic tags in a user profile;
   multiplying each datum's score by a website coefficient for every match between the datum's website tags and the website tags in the user profile;
   selecting the highest scoring data; and
   selecting a single datum from the remaining data.

292. The method of embodiment 291, wherein each datum's score is further multiplied by a hardware coefficient for every match between the datum's hardware identification tags and the hardware identification tags in a user profile.

293. The method of embodiment 291 wherein the data are ads.

294. A processor implemented method embodiment for processing and responding to ambiguous content requests, comprising:
   receiving a scanned code image and a user ID;
   analyzing the scanned code image to determine if the information encoded therein is fully accessible;
   selecting a scanned code disambiguation process to apply to the scanned code images if the information encoded therein is not fully accessible;
   applying the scanned code disambiguation process to the scanned code image to determine a most likely code;
   querying accumulated user information in a user profile associated with the user ID;
   querying a content database to extract requested content based on the most likely code and the accumulated user information; and
   sending the requested content to a user.

295. The method of embodiment 294, wherein the received scanned code image is sent via MMS.

296. The method of embodiment 295, wherein the received scan code image is sent to a short code address.

297. The method of embodiment 296, wherein the requested content is set to a user via MMS.

298. The method of embodiment 294, wherein the scanned code disambiguation process comprises:
   performing a partial decoding of the scanned code image;
   querying a code database to select a plurality of codes matching the partial decoding of the scanned code image; and
   selecting a most likely code from the plurality of codes based on ancillary scanned code information.

299. The method of embodiment 298, wherein the ancillary scanned code information comprises the accumulated user information.

300. The method of embodiment 299, wherein the ancillary scanned code information further comprises situational information associated with the scanned code image.

301. The method of embodiment 298, wherein the ancillary scanned code information comprises situational information associated with the scanned code image.

302. The method of embodiment 301, wherein the situational information comprises a context from which the scanned code image was acquired.

303. The method of embodiment 301, wherein the situational information comprises a location at which the scanned code image was acquired.

304. The method of embodiment 294, wherein the scanned code disambiguation process comprises a scanned code image enhancement.

305. The method of embodiment 304, wherein the scanned code image enhancement is configurable to perform downsizing, noise removal, contrast adjustment, brightness adjustment, image tilting, image rotating, focus adjustment, and edge recognition.

306. The method of embodiment 294, wherein the scanned code disambiguation process is a server-side process.

307. The method of embodiment 294, wherein the scanned code disambiguation process is a client-side process.

308. A processor implemented method embodiment for processing and responding to ambiguous content requests, comprising:

receiving a scanned code image, a user ID, wherein the scanned code image is sent to a short code address via MMS.

analyzing the scanned code image to determine if the information encoded therein is fully accessible;

selecting a server-side scanned code disambiguation process to apply to the scanned code images if the information encoded therein is not fully accessible, wherein the scanned code disambiguation process comprises any combination of scanned code image enhancement and partial decoding;

applying the server-side scanned code disambiguation process to the scanned code image to determine a most likely code;

querying accumulated user information in a user profile associated with the user ID;

querying a content database to extract requested content based on the most likely code and the accumulated user information; and sending the requested content to a user via MMS.

309. An apparatus embodiment for serving ambient condition sensitive information to a mobile user, comprising:
a memory;
a processor disposed in communication with said memory, and configured to issue a plurality of instructions stored in the memory, wherein the instructions are issuable to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile and ambient conditions at a user location to include in a message; and
send the message to a user.

310. An apparatus embodiment for serving ambient condition sensitive information to a mobile user, comprising:
a memory;
a processor disposed in communication with said memory, and configured to issue a plurality of instructions stored in the memory, wherein the instructions are issuable to:
receive at a server messages from a user comprised of user identification, mobile device identification, a code image scanned by the mobile device, time of the scan, and user geographic location at the time of the scan, wherein the messages were sent to a short code address via MMS;
associate the user identification with a user profile in a database;
update the user profile with the received messages;
enhance the code image scanned by the mobile device;
analyze the accumulated messages in the user profile;
determine proper information to serve to the user based on the received message, the user profile, and ambient conditions at a user location;
select the information to serve to the user from a database;
incorporate the selected information into a reply message; and
send the reply message to the user's mobile device via MMS.

311. An apparatus embodiment for receiving ambient condition sensitive information, comprising:
a memory;
a processor disposed in communication with said memory, and configured to issue a plurality of instructions stored in the memory, wherein the instructions are issuable to:
accumulate user activity interest information;
accumulate user situational information, including ambient conditions at a user location;
incorporate user activity interest information in an interest message;
incorporate user situational information in a situational message;
sending the interest message to a server;
sending the situational message to the server; and
receive a reply based on the interest message, the situational message, and a user profile.

312. An apparatus embodiment of serving ambient condition sensitive information, comprising:
a memory;
a processor disposed in communication with said memory, and configured to issue a plurality of instructions stored in the memory, wherein the instructions are issuable to:
accumulate user activity interest information;
accumulate user situational information;
analyze the user activity interest information and user situational information;
predict expected user interest and situational information from the analysis;
determine serving information to serve to a user based on expected user interest information, expected user situational information, and ambient conditions at a user location;
select the information to serve from a database;
incorporate the selected information into a message;
determine a target time and place to send a message;
incorporate serving information and target time and place into a message; and
send the message for distribution.

313. An apparatus embodiment for accumulating user information and delivering targeted content based thereon, comprising:
a memory;
a processor disposed in communication with said memory, and configured to issue a plurality of instructions stored in the memory, wherein the instructions are issuable to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a message; and
send the message to a user.

314. An apparatus embodiment for accumulating mobile device code scan information from a user and delivering content based thereon, comprising:
a memory;
a processor disposed in communication with said memory, and configured to issue a plurality of instructions stored in the memory, wherein the instructions are issuable to:
receive at a server messages from a user comprised of user identification, mobile device identification, a code image scanned by the mobile device, time of the scan, and user geographic location at the time of the scan, wherein the messages were sent to a shortcode address via MMS;
associate the user identification with a user profile in a database;
update the user profile with the received messages;
enhance the code image scanned by the mobile device;
analyze the accumulated messages in the user profile;
determine proper information to serve to the user based on the received message and the user profile;
select the information to serve to the user from a database;
incorporate the selected information into a reply message; and
send the reply message to the user's mobile device via MMS.

315. An apparatus embodiment for receiving information based on accumulated user activity and situational information, comprising:
a memory;
a processor disposed in communication with said memory, and configured to issue a plurality of instructions stored in the memory, wherein the instructions are issuable to:
accumulate user activity interest information;
accumulate user situational information;
incorporate user activity interest information in an interest message;
incorporate user situational information in a situational message;
send the interest message to a server;
send the situational message to the server; and
receive a reply based on the interest message, the situational message, and a user profile.

316. An apparatus embodiment of selecting data from a database based on user activity interest information, comprising:
a memory;
a processor disposed in communication with said memory, and configured to issue a plurality of instructions stored in the memory, wherein the instructions are issuable to:
filter data in the database by activity subject tags;
determine which remaining data match:
user demographic category tags;
user geographic location tags;
user temporal tags;
select the data with the greatest number of matches; and
choose a single datum from the remaining data.

317. An apparatus embodiment for predicting user interest and situations and supplying information to the user based thereon, comprising:
a memory;
a processor disposed in communication with said memory, and configured to issue a plurality of instructions stored in the memory, wherein the instructions are issuable to:
accumulate user activity interest information;
accumulate user situational information;
analyze the user activity interest information and user situational information;
predict expected user interest and situational information from the analysis;
determine serving information to serve to a user based on expected user interest and situational information;
select the information to serve from a database;
incorporate the selected information into a message;
determine a target time and place to send a message;
incorporate serving information and target time and place into a message; and
send the message for distribution.

318. An apparatus embodiment for predicting user interest and situations and supplying information to the user based thereon, comprising:
a memory;
a processor disposed in communication with said memory, and configured to issue a plurality of instructions stored in the memory, wherein the instructions are issuable to:
accumulate at a server a plurality of code images scanned by a user's mobile device and sent to a short code address via MMS;
accumulate user situational information;
analyze the user activity interest information and user situational information;
predict expected user interest and situational information from the analysis;
determine serving information to serve to a user based on expected user interest and situational information;
select the information to serve from a database;
incorporate the selected information into a message;
determine a target time and place to send a message;
incorporate serving information and target time and place into a message; and
send the message for distribution via MMS.

319. An apparatus embodiment for scoring data based on a user profile and situational information and selecting data from a database, comprising:
a memory;
a processor disposed in communication with said memory, and configured to issue a plurality of instructions stored in the memory, wherein the instructions are issuable to:
assign the same initial score to every datum;
multiply each datum's score by a subject coefficient for every match between the datum's subject tag and subject tags in a user profile;
multiply each datum's score by a temporal coefficient for a match between the datum's temporal tag and a temporal tag in a user profile;
multiply each datum's score by a demographic coefficient for a match between the datum's demographic tags and demographic tags in a user profile;
select the highest scoring data; and
select a single datum from the remaining data.

320. An apparatus embodiment for coordinating personnel based on delivered personnel directives, comprising:
a memory;
a processor disposed in communication with said memory, and configured to issue a plurality of instructions stored in the memory, wherein the instructions are issuable to:
accumulate user activity information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a personnel directive; and
send the personnel directive to a user.

321. An apparatus embodiment for coordinating personnel by serving personnel directives to a mobile device, comprising:
a memory;

a processor disposed in communication with said memory, and configured to issue a plurality of instructions stored in the memory, wherein the instructions are issuable to:
receive at a server messages from a user comprised of user identification, mobile device identification, a code image scanned by the mobile device, time of the scan, and user geographic location at the time of the scan, wherein the messages are sent to a short code address via MMS;
associate the user identification with a user profile in a database;
update the user profile with the received messages;
enhance the code image scanned by the mobile device;
analyze the accumulated messages in the user profile;
determine proper information to serve to the user based on the received message and the user profile;
select the information to serve to the user from a database;
incorporate the selected information into a personnel directive; and
send the personnel directive to the user's mobile device via MMS.

322. An apparatus embodiment for receiving personnel directives, comprising:
a memory;
a processor disposed in communication with said memory, and configured to issue a plurality of instructions stored in the memory, wherein the instructions are issuable to:
accumulate user activity information;
accumulate user situational information;
incorporate user activity information in an activity message;
incorporate user situational information in a situational message;
send the activity message to a server;
send the situational message to the server; and
receive a personnel directive based on the activity message, the situational message, and a user profile.

323. An apparatus embodiment for coordinating personnel based on delivered personnel directives, comprising:
a memory;
a processor disposed in communication with said memory, and configured to issue a plurality of instructions stored in the memory, wherein the instructions are issuable to:
accumulate user activity information;
accumulate user situational information;
analyze the user activity interest information and user situational information;
predict expected user activity and situational information from the analysis;
determine serving information to serve to a user based on expected user activity and situational information;
select the information to serve from a database;
incorporate the selected information into a personnel directive;
determine a target time and place to send the personnel directive;
incorporate the personnel directive and target time and place into a message; and
send the message for distribution.

324. An apparatus embodiment for selecting data from a database based on user activity information and employment status, comprising:
a memory;
a processor disposed in communication with said memory, and configured to issue a plurality of instructions stored in the memory, wherein the instructions are issuable to:
filter data in the database by user employment status tags;
filter data in the database by activity subject tags;
determine which remaining data match:
user geographic location tags;
user temporal tags;
select the data with the greatest number of matches; and
choose a single datum from the remaining data.

325. An apparatus embodiment for selecting data from a database based on employment status, subject, and time, comprising:
a memory;
a processor disposed in communication with said memory, and configured to issue a plurality of instructions stored in the memory, wherein the instructions are issuable to:
assign the same initial score to every datum;
multiply each datum's score by a status coefficient for every match between the datum's employment status tag and employment status tag in a user profile;
multiply each datum's score by a subject coefficient for every match between the datum's subject tag and subject tags in a user profile;
multiply each datum's score by a temporal coefficient for a match between the datum's temporal tag and a temporal tag in a user profile;
select the highest scoring data; and
select a single datum from the remaining data.

326. An apparatus embodiment for generating proximity notifications indicating proximities between users, comprising:
a memory;
a processor disposed in communication with said memory, and configured to issue a plurality of instructions stored in the memory, wherein the instructions are issuable to:
accumulate user situational information;
accumulate user association information;
analyze the user situational information;
predict expected user interest and situational information from the analysis;
determine if a user is in proximity with other users contained in the user association information; and
notify a user of the proximity.

327. An apparatus embodiment for serving information to users within a virtual world based on accumulated user information, comprising:
a memory;
a processor disposed in communication with said memory, and configured to issue a plurality of instructions stored in the memory, wherein the instructions are issuable to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a message; and
serve the message in a virtual world.

328. An apparatus embodiment for serving information in a virtual world based on accumulated user information, comprising:
a memory;
a processor disposed in communication with said memory, and configured to issue a plurality of instructions stored in the memory, wherein the instructions are issuable to:

receive messages from a user comprised of user identification, a user decision within a virtual world, time of the decision, and user location within the virtual world at the time of the decision;
associate the user identification with a user profile in a database;
update the user profile with the received messages;
analyze the accumulated messages in the user profile;
determine proper information to serve to the user based on the received message and the user profile;
select the information to serve to the user from a database;
incorporate the selected information into a reply message; and
serve the reply message within the virtual world.

329. An apparatus embodiment for receiving information within a virtual world, comprising:
a memory;
a processor disposed in communication with said memory, and configured to issue a plurality of instructions stored in the memory, wherein the instructions are issuable to:
accumulate user activity interest information;
accumulate user situational information;
incorporate user activity interest information in an interest message;
incorporate user situational information in a situational message;
send the interest message to a server;
send the situational message to the server; and
receive a reply that is displayed within a virtual world based on the interest message, the situational message, and a user profile.

330. An apparatus embodiment for serving information within a virtual world based on accumulated user information, comprising:
a memory;
a processor disposed in communication with said memory, and configured to issue a plurality of instructions stored in the memory, wherein the instructions are issuable to:
accumulate user activity interest information;
accumulate user situational information;
analyze the user activity interest information and user situational information;
predict expected user interest and situational information from the analysis;
determine serving information to serve to a user based on expected user interest and situational information;
select the information to serve from a database;
incorporate the selected information into a message;
determine a target time and place to send a message;
incorporate serving information and target time and place into a message; and
send the message for distribution within a virtual world.

331. An apparatus embodiment for selecting data from a database based on user virtual world activity interest and situational information, comprising:
a memory;
a processor disposed in communication with said memory, and configured to issue a plurality of instructions stored in the memory, wherein the instructions are issuable to:
filter data in the database by virtual world decision subject tags;
determine which remaining data match:
user demographic category tags;
user virtual world location tags;
user temporal tags;
select the data with the greatest number of matches; and
choose a single datum from the remaining data.

332. An apparatus embodiment for selecting data from a database based on a virtual world location, comprising:
a memory;
a processor disposed in communication with said memory, and configured to issue a plurality of instructions stored in the memory, wherein the instructions are issuable to:
assign the same initial score to every datum;
multiply each datum's score by a subject coefficient for every match between the datum's subject tag and subject tags in a user profile;
multiply each datum's score by a temporal coefficient for a match between the datum's temporal tag and a temporal tag in a user profile;
multiply each datum's score by a demographic coefficient for a match between the datum's demographic tags and demographic tags in a user profile;
multiply each datum's score by a virtual world location coefficient for every match between the datum's virtual world location tags and the virtual world location tags in the user profile;
select the highest scoring data; and
select a single datum from the remaining data.

333. An apparatus embodiment for tracking user information on the internet and serving information to users based thereon, comprising:
a memory;
a processor disposed in communication with said memory, and configured to issue a plurality of instructions stored in the memory, wherein the instructions are issuable to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a message; and
serve the message on a website.

334. An apparatus embodiment for tracking user information on the internet and serving information to a mobile device based thereon, comprising:
a memory;
a processor disposed in communication with said memory, and configured to issue a plurality of instructions stored in the memory, wherein the instructions are issuable to:
receive messages from a user comprised of user identification, mobile device identification, a code scanned by the mobile device, time of the scan, and user geographic location at the time of the scan;
associate the user identification with a user profile in a database;
update the user profile with the received messages;
analyze the accumulated messages in the user profile;
determine proper information to serve to the user based on the received message and the user profile;
select the information to serve to the user from a database;
incorporate the selected information into a reply message; and
serve the reply message on a website.

335. An apparatus embodiment for receiving information on the internet based on accumulated user information, comprising:
a memory;

a processor disposed in communication with said memory, and configured to issue a plurality of instructions stored in the memory, wherein the instructions are issuable to:
  accumulate user activity interest information;
  accumulate user situational information;
  incorporate user activity interest information in an interest message;
  incorporate user situational information in a situational message;
  send the interest message to a server;
  send the situational message to the server; and
  receive a reply that is displayed on a website based on the interest message, the situational message, and a user profile.

336. An apparatus embodiment for serving information on a website based on accumulated user information, comprising:
  a memory;
  a processor disposed in communication with said memory, and configured to issue a plurality of instructions stored in the memory, wherein the instructions are issuable to:
  accumulate user activity interest information;
  accumulate user situational information;
  analyze the user activity interest information and user situational information;
  predict expected user interest and situational information from the analysis;
  determine serving information to serve to a user based on expected user interest and situational information;
  select the information to serve from a database;
  incorporate the selected information into a message;
  determine a target time and place to send a message;
  incorporate serving information and target time and place into a message; and
  send the message for distribution on a website.

337. An apparatus embodiment for selecting data from a database based on user website interest information, comprising:
  a memory;
  a processor disposed in communication with said memory, and configured to issue a plurality of instructions stored in the memory, wherein the instructions are issuable to:
  filter data in the database by website subject tags;
  determine which remaining data match:
    user demographic category tags;
    user current website tags;
    user temporal tags;
  select the data with the greatest number of matches; and
  choose a single datum from the remaining data.

338. An apparatus embodiment for selecting data from a database based on correlations between a user profile and a datum's website association, comprising:
  a memory;
  a processor disposed in communication with said memory, and configured to issue a plurality of instructions stored in the memory, wherein the instructions are issuable to:
  assign the same initial score to every datum;
  multiply each datum's score by a subject coefficient for every match between the datum's subject tag and subject tags in a user profile;
  multiply each datum's score by a temporal coefficient for a match between the datum's temporal tag and a temporal tag in a user profile;
  multiply each datum's score by a demographic coefficient for a match between the datum's demographic tags and demographic tags in a user profile;
  multiply each datum's score by a website coefficient for every match between the datum's website tags and the website tags in the user profile;
  select the highest scoring data; and
  select a single datum from the remaining data.

339. An apparatus embodiment for processing and responding to ambiguous content requests, comprising:
  a memory;
  a processor disposed in communication with said memory, and configured to issue a plurality of instructions stored in the memory, wherein the instructions are issuable to:
  receive a scanned code image and a user ID;
  analyze the scanned code image to determine if the information encoded therein is fully accessible;
  select a scanned code disambiguation process to apply to the scanned code images if the information encoded therein is not fully accessible;
  apply the scanned code disambiguation process to the scanned code image to determine a most likely code;
  query accumulated user information in a user profile associated with the user ID;
  query a content database to extract requested content based on the most likely code and the accumulated user information; and
  send the requested content to a user.

340. An apparatus embodiment for processing and responding to ambiguous content requests, comprising:
  a memory;
  a processor disposed in communication with said memory, and configured to issue a plurality of instructions stored in the memory, wherein the instructions are issuable to:
  receive a scanned code image, a user ID, wherein the scanned code image is sent to a short code address via MMS.
  analyze the scanned code image to determine if the information encoded therein is fully accessible;
  select a server-side scanned code disambiguation process to apply to the scanned code images if the information encoded therein is not fully accessible, wherein the scanned code disambiguation process comprises any combination of scanned code image enhancement and partial decoding;
  apply the server-side scanned code disambiguation process to the scanned code image to determine a most likely code;
  query accumulated user information in a user profile associated with the user ID;
  query a content database to extract requested content based on the most likely code and the accumulated user information; and
  send the requested content to a user via MMS.

341. A system embodiment for serving ambient condition sensitive information to a mobile user, comprising:
  means to accumulate user activity interest information;
  means to accumulate user situational information;
  means to associate the user activity interest information and user situational information with a user profile;
  means to update the user profile with the associated information in a database;
  means to analyze accumulated information associated with the user profile;
  means to query an information database based on the analysis of the user profile;
  means to select information based on the user profile and ambient conditions at a user location to include in a message; and
  means to send the message to a user.

342. A system embodiment for serving ambient condition sensitive information to a mobile user, comprising:
- means to receive at a server messages from a user comprised of user identification, mobile device identification, a code image scanned by the mobile device, time of the scan, and user geographic location at the time of the scan, wherein the messages were sent to a short code address via MMS;
- means to associate the user identification with a user profile in a database;
- means to update the user profile with the received messages;
- means to enhance the code image scanned by the mobile device;
- means to analyze the accumulated messages in the user profile;
- means to determine proper information to serve to the user based on the received message, the user profile, and ambient conditions at a user location;
- means to select the information to serve to the user from a database;
- means to incorporate the selected information into a reply message; and
- means to send the reply message to the user's mobile device via MMS.

343. A system embodiment for receiving ambient condition sensitive information, comprising:
- means to accumulate user activity interest information;
- means to accumulate user situational information, including ambient conditions at a user location;
- means to incorporate user activity interest information in an interest message;
- means to incorporate user situational information in a situational message;
- means to sending the interest message to a server;
- means to sending the situational message to the server; and
- means to receive a reply based on the interest message, the situational message, and a user profile.

344. A system embodiment of serving ambient condition sensitive information, comprising:
- means to accumulate user activity interest information;
- means to accumulate user situational information;
- means to analyze the user activity interest information and user situational information;
- means to predict expected user interest and situational information from the analysis;
- means to determine serving information to serve to a user based on expected user interest information, expected user situational information, and ambient conditions at a user location;
- means to select the information to serve from a database;
- means to incorporate the selected information into a message;
- means to determine a target time and place to send a message;
- means to incorporate serving information and target time and place into a message; and
- means to send the message for distribution.

345. A system embodiment for accumulating user information and delivering targeted content based thereon, comprising:
- means to accumulate user activity interest information;
- means to accumulate user situational information;
- means to associate the user activity interest information and user situational information with a user profile;
- means to update the user profile with the associated information in a database;
- means to analyze accumulated information associated with the user profile;
- means to query an information database based on the analysis of the user profile;
- means to select information based on the user profile to include in a message; and
- means to send the message to a user.

346. A system embodiment for accumulating mobile device code scan information from a user and delivering content based thereon, comprising:
- means to receive at a server messages from a user comprised of user identification, mobile device identification, a code image scanned by the mobile device, time of the scan, and user geographic location at the time of the scan, wherein the messages were sent to a short code address via MMS;
- means to associate the user identification with a user profile in a database;
- means to update the user profile with the received messages;
- means to enhance the code image scanned by the mobile device;
- means to analyze the accumulated messages in the user profile;
- means to determine proper information to serve to the user based on the received message and the user profile;
- means to select the information to serve to the user from a database;
- means to incorporate the selected information into a reply message; and
- means to send the reply message to the user's mobile device via MMS.

347. A system embodiment for receiving information based on accumulated user activity and situational information, comprising:
- means to accumulate user activity interest information;
- means to accumulate user situational information;
- means to incorporate user activity interest information in an interest message;
- means to incorporate user situational information in a situational message;
- means to send the interest message to a server;
- means to send the situational message to the server; and
- means to receive a reply based on the interest message, the situational message, and a user profile.

348. A system embodiment of selecting data from a database based on user activity interest information, comprising:
- means to filter data in the database by activity subject tags;
- means to determine which remaining data match:
  - user demographic category tags;
  - user geographic location tags;
  - user temporal tags;
- means to select the data with the greatest number of matches; and
- means to choose a single datum from the remaining data.

349. A system embodiment for predicting user interest and situations and supplying information to the user based thereon, comprising:
- means to accumulate user activity interest information;
- means to accumulate user situational information;
- means to analyze the user activity interest information and user situational information;
- means to predict expected user interest and situational information from the analysis;
- means to determine serving information to serve to a user based on expected user interest and situational information;

means to select the information to serve from a database;
means to incorporate the selected information into a message;
means to determine a target time and place to send a message;
means to incorporate serving information and target time and place into a message; and
means to send the message for distribution.

350. A system embodiment for predicting user interest and situations and supplying information to the user based thereon, comprising:
means to accumulate at a server a plurality of code images scanned by a user's mobile device and sent to a short code address via MMS;
means to accumulate user situational information;
means to analyze the user activity interest information and user situational information;
means to predict expected user interest and situational information from the analysis;
means to determine serving information to serve to a user based on expected user interest and situational information;
means to select the information to serve from a database;
means to incorporate the selected information into a message;
means to determine a target time and place to send a message;
means to incorporate serving information and target time and place into a message; and
means to send the message for distribution via MMS.

351. A system embodiment for scoring data based on a user profile and situational information and selecting data from a database, comprising:
means to assign the same initial score to every datum;
means to multiply each datum's score by a subject coefficient for every match between the datum's subject tag and subject tags in a user profile;
means to multiply each datum's score by a temporal coefficient for a match between the datum's temporal tag and a temporal tag in a user profile;
means to multiply each datum's score by a demographic coefficient for a match between the datum's demographic tags and demographic tags in a user profile;
means to select the highest scoring data; and
means to select a single datum from the remaining data.

352. A system embodiment for coordinating personnel based on delivered personnel directives, comprising:
means to accumulate user activity information;
means to accumulate user situational information;
means to associate the user activity interest information and user situational information with a user profile;
means to update the user profile with the associated information in a database;
means to analyze accumulated information associated with the user profile;
means to query an information database based on the analysis of the user profile;
means to select information based on the user profile to include in a personnel directive; and
means to send the personnel directive to a user.

353. A system embodiment for coordinating personnel by serving personnel directives to a mobile device, comprising:
means to receive at a server messages from a user comprised of user identification, mobile device identification, a code image scanned by the mobile device, time of the scan, and user geographic location at the time of the scan, wherein the messages are sent to a short code address via MMS;
means to associate the user identification with a user profile in a database;
means to update the user profile with the received messages;
means to enhance the code image scanned by the mobile device;
means to analyze the accumulated messages in the user profile;
means to determine proper information to serve to the user based on the received message and the user profile;
means to select the information to serve to the user from a database;
means to incorporate the selected information into a personnel directive; and
means to send the personnel directive to the user's mobile device via MMS.

354. A system embodiment for receiving personnel directives, comprising:
means to accumulate user activity information;
means to accumulate user situational information;
means to incorporate user activity information in an activity message;
means to incorporate user situational information in a situational message;
means to send the activity message to a server;
means to send the situational message to the server; and
means to receive a personnel directive based on the activity message, the situational message, and a user profile.

355. A system embodiment for coordinating personnel based on delivered personnel directives, comprising:
means to accumulate user activity information;
means to accumulate user situational information;
means to analyze the user activity interest information and user situational information;
means to predict expected user activity and situational information from the analysis;
means to determine serving information to serve to a user based on expected user activity and situational information;
means to select the information to serve from a database;
means to incorporate the selected information into a personnel directive;
means to determine a target time and place to send the personnel directive;
means to incorporate the personnel directive and target time and place into a message; and
means to send the message for distribution.

356. A system embodiment for selecting data from a database based on user activity information and employment status, comprising:
means to filter data in the database by user employment status tags;
means to filter data in the database by activity subject tags;
means to determine which remaining data match:
user geographic location tags;
user temporal tags;
means to select the data with the greatest number of matches; and
means to choose a single datum from the remaining data.

357. A system embodiment for selecting data from a database based on employment status, subject, and time, comprising:
means to assign the same initial score to every datum;

means to multiply each datum's score by a status coefficient for every match between the datum's employment status tag and employment status tag in a user profile;
means to multiply each datum's score by a subject coefficient for every match between the datum's subject tag and subject tags in a user profile;
means to multiply each datum's score by a temporal coefficient for a match between the datum's temporal tag and a temporal tag in a user profile;
means to select the highest scoring data; and
means to select a single datum from the remaining data.

358. A system embodiment for generating proximity notifications indicating proximities between users, comprising:
means to accumulate user situational information;
means to accumulate user association information;
means to analyze the user situational information;
means to predict expected user interest and situational information from the analysis;
means to determine if a user is in proximity with other users contained in the user association information; and
means to notify a user of the proximity.

359. A system embodiment for serving information to users within a virtual world based on accumulated user information, comprising:
means to accumulate user activity interest information;
means to accumulate user situational information;
means to associate the user activity interest information and user situational information with a user profile;
means to update the user profile with the associated information in a database;
means to analyze accumulated information associated with the user profile;
means to query an information database based on the analysis of the user profile;
means to select information based on the user profile to include in a message; and
means to serve the message in a virtual world.

360. A system embodiment for serving information in a virtual world based on accumulated user information, comprising:
means to receive messages from a user comprised of user identification, a user decision within a virtual world, time of the decision, and user location within the virtual world at the time of the decision;
means to associate the user identification with a user profile in a database;
means to update the user profile with the received messages;
means to analyze the accumulated messages in the user profile;
means to determine proper information to serve to the user based on the received message and the user profile;
means to select the information to serve to the user from a database;
means to incorporate the selected information into a reply message; and
means to serve the reply message within the virtual world.

361. A system embodiment for receiving information within a virtual world, comprising:
means to accumulate user activity interest information;
means to accumulate user situational information;
means to incorporate user activity interest information in an interest message;
means to incorporate user situational information in a situational message;
means to send the interest message to a server;
means to send the situational message to the server; and
means to receive a reply that is displayed within a virtual world based on the interest message, the situational message, and a user profile.

362. A system embodiment for serving information within a virtual world based on accumulated user information, comprising:
means to accumulate user activity interest information;
means to accumulate user situational information;
means to analyze the user activity interest information and user situational information;
means to predict expected user interest and situational information from the analysis;
means to determine serving information to serve to a user based on expected user interest and situational information;
means to select the information to serve from a database;
means to incorporate the selected information into a message;
means to determine a target time and place to send a message;
means to incorporate serving information and target time and place into a message; and
means to send the message for distribution within a virtual world.

363. A system embodiment for selecting data from a database based on user virtual world activity interest and situational information, comprising:
means to filter data in the database by virtual world decision subject tags;
means to determine which remaining data match:
user demographic category tags;
user virtual world location tags;
user temporal tags;
means to select the data with the greatest number of matches; and
means to choose a single datum from the remaining data.

364. A system embodiment for selecting data from a database based on a virtual world location, comprising:
means to assign the same initial score to every datum;
means to multiply each datum's score by a subject coefficient for every match between the datum's subject tag and subject tags in a user profile;
means to multiply each datum's score by a temporal coefficient for a match between the datum's temporal tag and a temporal tag in a user profile;
means to multiply each datum's score by a demographic coefficient for a match between the datum's demographic tags and demographic tags in a user profile;
means to multiply each datum's score by a virtual world location coefficient for every match between the datum's virtual world location tags and the virtual world location tags in the user profile;
means to select the highest scoring data; and
means to select a single datum from the remaining data.

365. A system embodiment for tracking user information on the internet and serving information to users based thereon, comprising:
means to accumulate user activity interest information;
means to accumulate user situational information;
means to associate the user activity interest information and user situational information with a user profile;
means to update the user profile with the associated information in a database;
means to analyze accumulated information associated with the user profile;
means to query an information database based on the analysis of the user profile;

means to select information based on the user profile to include in a message; and
means to serve the message on a website.

366. A system embodiment for tracking user information on the internet and serving information to a mobile device based thereon, comprising:
means to receive messages from a user comprised of user identification, mobile device identification, a code scanned by the mobile device, time of the scan, and user geographic location at the time of the scan;
means to associate the user identification with a user profile in a database;
update the user profile with the received messages;
means to analyze the accumulated messages in the user profile;
means to determine proper information to serve to the user based on the received message and the user profile;
means to select the information to serve to the user from a database;
means to incorporate the selected information into a reply message; and
means to serve the reply message on a website.

367. A system embodiment for receiving information on the internet based on accumulated user information, comprising:
means to accumulate user activity interest information;
means to accumulate user situational information;
means to incorporate user activity interest information in an interest message;
means to incorporate user situational information in a situational message;
means to send the interest message to a server;
means to send the situational message to the server; and
means to receive a reply that is displayed on a website based on the interest message, the situational message, and a user profile.

368. A system embodiment for serving information on a website based on accumulated user information, comprising:
means to accumulate user activity interest information;
means to accumulate user situational information;
means to analyze the user activity interest information and user situational information;
means to predict expected user interest and situational information from the analysis;
means to determine serving information to serve to a user based on expected user interest and situational information;
means to select the information to serve from a database;
means to incorporate the selected information into a message;
means to determine a target time and place to send a message;
means to incorporate serving information and target time and place into a message; and
means to send the message for distribution on a website.

369. A system embodiment for selecting data from a database based on user website interest information, comprising:
means to filter data in the database by website subject tags;
means to determine which remaining data match:
user demographic category tags;
user current website tags;
user temporal tags;
means to select the data with the greatest number of matches; and
means to choose a single datum from the remaining data.

370. A system embodiment for selecting data from a database based on correlations between a user profile and a datum's website association, comprising:
means to assign the same initial score to every datum;
means to multiply each datum's score by a subject coefficient for every match between the datum's subject tag and subject tags in a user profile;
means to multiply each datum's score by a temporal coefficient for a match between the datum's temporal tag and a temporal tag in a user profile;
means to multiply each datum's score by a demographic coefficient for a match between the datum's demographic tags and demographic tags in a user profile;
means to multiply each datum's score by a website coefficient for every match between the datum's website tags and the website tags in the user profile;
means to select the highest scoring data; and
means to select a single datum from the remaining data.

371. A system embodiment for processing and responding to ambiguous content requests, comprising:
means to receive a scanned code image and a user ID;
means to analyze the scanned code image to determine if the information encoded therein is fully accessible;
means to select a scanned code disambiguation process to apply to the scanned code images if the information encoded therein is not fully accessible;
means to apply the scanned code disambiguation process to the scanned code image to determine a most likely code;
means to query accumulated user information in a user profile associated with the user ID;
means to query a content database to extract requested content based on the most likely code and the accumulated user information; and
means to send the requested content to a user.

372. An system for processing and responding to ambiguous content requests, comprising:
means to receive a scanned code image, a user ID, wherein the scanned code image is sent to a short code address via MMS.
means to analyze the scanned code image to determine if the information encoded therein is fully accessible;
means to select a server-side scanned code disambiguation process to apply to the scanned code images if the information encoded therein is not fully accessible, wherein the scanned code disambiguation process comprises any combination of scanned code image enhancement and partial decoding;
means to apply the server-side scanned code disambiguation process to the scanned code image to determine a most likely code;
means to query accumulated user information in a user profile associated with the user ID;
means to query a content database to extract requested content based on the most likely code and the accumulated user information; and
means to send the requested content to a user via MMS.

373. A processor-accessible medium embodiment for serving ambient condition sensitive information to a mobile user, comprising:
processor readable instructions stored in the processor-accessible medium, wherein the processor readable instructions are issuable by the processor to:
accumulate user activity interest information;
accumulate user situational information;
associate the user activity interest information and user situational information with a user profile;

update the user profile with the associated information in a database;
analyze accumulated information associated with the user profile;
query an information database based on the analysis of the user profile;
select information based on the user profile and ambient conditions at a user location to include in a message; and
send the message to a user.

374. A processor-accessible medium embodiment for serving ambient condition sensitive information to a mobile user, comprising:
processor readable instructions stored in the processor-accessible medium, wherein the processor readable instructions are issuable by the processor to:
receive at a server messages from a user comprised of user identification, mobile device identification, a code image scanned by the mobile device, time of the scan, and user geographic location at the time of the scan, wherein the messages were sent to a short code address via MMS;
associate the user identification with a user profile in a database;
update the user profile with the received messages;
enhance the code image scanned by the mobile device;
analyze the accumulated messages in the user profile;
determine proper information to serve to the user based on the received message, the user profile, and ambient conditions at a user location;
select the information to serve to the user from a database;
incorporate the selected information into a reply message; and
send the reply message to the user's mobile device via MMS.

375. A processor-accessible medium embodiment for receiving ambient condition sensitive information, comprising:
processor readable instructions stored in the processor-accessible medium, wherein the processor readable instructions are issuable by the processor to:
accumulate user activity interest information;
accumulate user situational information, including ambient conditions at a user location;
incorporate user activity interest information in an interest message;
incorporate user situational information in a situational message;
sending the interest message to a server;
sending the situational message to the server; and
receive a reply based on the interest message, the situational message, and a user profile.

376. A processor-accessible medium embodiment of serving ambient condition sensitive information, comprising:
processor readable instructions stored in the processor-accessible medium, wherein the processor readable instructions are issuable by the processor to:
accumulate user activity interest information;
accumulate user situational information;
analyze the user activity interest information and user situational information;
predict expected user interest and situational information from the analysis;
determine serving information to serve to a user based on expected user interest information, expected user situational information, and ambient conditions at a user location;
select the information to serve from a database;
incorporate the selected information into a message;
determine a target time and place to send a message;
incorporate serving information and target time and place into a message; and
send the message for distribution.

377. A processor-accessible medium embodiment for accumulating user information and delivering targeted content based thereon, comprising:
processor readable instructions stored in the processor-accessible medium, wherein the processor readable instructions are issuable by the processor to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a message; and
send the message to a user.

378. A processor-accessible medium embodiment for accumulating mobile device code scan information from a user and delivering content based thereon, comprising:
processor readable instructions stored in the processor-accessible medium, wherein the processor readable instructions are issuable by the processor to:
receive at a server messages from a user comprised of user identification, mobile device identification, a code image scanned by the mobile device, time of the scan, and user geographic location at the time of the scan, wherein the messages were sent to a shortcode address via MMS;
associate the user identification with a user profile in a database;
update the user profile with the received messages;
enhance the code image scanned by the mobile device;
analyze the accumulated messages in the user profile;
determine proper information to serve to the user based on the received message and the user profile;
select the information to serve to the user from a database;
incorporate the selected information into a reply message; and
send the reply message to the user's mobile device via MMS.

379. A processor-accessible medium embodiment for receiving information based on accumulated user activity and situational information, comprising:
processor readable instructions stored in the processor-accessible medium, wherein the processor readable instructions are issuable by the processor to:
accumulate user activity interest information;
accumulate user situational information;
incorporate user activity interest information in an interest message;
incorporate user situational information in a situational message;
send the interest message to a server;
send the situational message to the server; and
receive a reply based on the interest message, the situational message, and a user profile.

380. A processor-accessible medium embodiment of selecting data from a database based on user activity interest information, comprising:

processor readable instructions stored in the processor-accessible medium, wherein the processor readable instructions are issuable by the processor to:
  filter data in the database by activity subject tags;
  determine which remaining data match:
    user demographic category tags;
    user geographic location tags;
    user temporal tags;
  select the data with the greatest number of matches; and
  choose a single datum from the remaining data.

381. A processor-accessible medium embodiment for predicting user interest and situations and supplying information to the user based thereon, comprising:
  processor readable instructions stored in the processor-accessible medium, wherein the processor readable instructions are issuable by the processor to:
    accumulate user activity interest information;
    accumulate user situational information;
    analyze the user activity interest information and user situational information;
    predict expected user interest and situational information from the analysis;
    determine serving information to serve to a user based on expected user interest and situational information;
    select the information to serve from a database;
    incorporate the selected information into a message;
    determine a target time and place to send a message;
    incorporate serving information and target time and place into a message; and
    send the message for distribution.

382. A processor-accessible medium embodiment for predicting user interest and situations and supplying information to the user based thereon, comprising:
  processor readable instructions stored in the processor-accessible medium, wherein the processor readable instructions are issuable by the processor to:
    accumulate at a server a plurality of code images scanned by a user's mobile device and sent to a short code address via MMS;
    accumulate user situational information;
    analyze the user activity interest information and user situational information;
    predict expected user interest and situational information from the analysis;
    determine serving information to serve to a user based on expected user interest and situational information;
    select the information to serve from a database;
    incorporate the selected information into a message;
    determine a target time and place to send a message;
    incorporate serving information and target time and place into a message; and
    send the message for distribution via MMS.

383. A processor-accessible medium embodiment for scoring data based on a user profile and situational information and selecting data from a database, comprising:
  processor readable instructions stored in the processor-accessible medium, wherein the processor readable instructions are issuable by the processor to:
    assign the same initial score to every datum;
    multiply each datum's score by a subject coefficient for every match between the datum's subject tag and subject tags in a user profile;
    multiply each datum's score by a temporal coefficient for a match between the datum's temporal tag and a temporal tag in a user profile;
    multiply each datum's score by a demographic coefficient for a match between the datum's demographic tags and demographic tags in a user profile;
    select the highest scoring data; and
    select a single datum from the remaining data.

384. A processor-accessible medium embodiment for coordinating personnel based on delivered personnel directives, comprising:
  processor readable instructions stored in the processor-accessible medium, wherein the processor readable instructions are issuable by the processor to:
    accumulate user activity information;
    accumulate user situational information;
    associate the user activity interest information and user situational information with a user profile;
    update the user profile with the associated information in a database;
    analyze accumulated information associated with the user profile;
    query an information database based on the analysis of the user profile;
    select information based on the user profile to include in a personnel directive; and
    send the personnel directive to a user.

385. A processor-accessible medium embodiment for coordinating personnel by serving personnel directives to a mobile device, comprising:
  processor readable instructions stored in the processor-accessible medium, wherein the processor readable instructions are issuable by the processor to:
    receive at a server messages from a user comprised of user identification, mobile device identification, a code image scanned by the mobile device, time of the scan, and user geographic location at the time of the scan, wherein the messages are sent to a short code address via MMS;
    associate the user identification with a user profile in a database;
    update the user profile with the received messages;
    enhance the code image scanned by the mobile device;
    analyze the accumulated messages in the user profile;
    determine proper information to serve to the user based on the received message and the user profile;
    select the information to serve to the user from a database;
    incorporate the selected information into a personnel directive; and
    send the personnel directive to the user's mobile device via MMS.

386. A processor-accessible medium embodiment for receiving personnel directives, comprising:
  processor readable instructions stored in the processor-accessible medium, wherein the processor readable instructions are issuable by the processor to:
    accumulate user activity information;
    accumulate user situational information;
    incorporate user activity information in an activity message;
    incorporate user situational information in a situational message;
    send the activity message to a server;
    send the situational message to the server; and
    receive a personnel directive based on the activity message, the situational message, and a user profile.

387. A processor-accessible medium embodiment for coordinating personnel based on delivered personnel directives, comprising:

processor readable instructions stored in the processor-accessible medium, wherein the processor readable instructions are issuable by the processor to:
   accumulate user activity information;
   accumulate user situational information;
   analyze the user activity interest information and user situational information;
   predict expected user activity and situational information from the analysis;
   determine serving information to serve to a user based on expected user activity and situational information;
   select the information to serve from a database;
   incorporate the selected information into a personnel directive;
   determine a target time and place to send the personnel directive;
   incorporate the personnel directive and target time and place into a message; and
   send the message for distribution.

388. A processor-accessible medium embodiment for selecting data from a database based on user activity information and employment status, comprising:
processor readable instructions stored in the processor-accessible medium, wherein the processor readable instructions are issuable by the processor to:
   filter data in the database by user employment status tags;
   filter data in the database by activity subject tags;
   determine which remaining data match:
      user geographic location tags;
      user temporal tags;
   select the data with the greatest number of matches; and
   choose a single datum from the remaining data.

389. A processor-accessible medium embodiment for selecting data from a database based on employment status, subject, and time, comprising:
processor readable instructions stored in the processor-accessible medium, wherein the processor readable instructions are issuable by the processor to:
   assign the same initial score to every datum;
   multiply each datum's score by a status coefficient for every match between the datum's employment status tag and employment status tag in a user profile;
   multiply each datum's score by a subject coefficient for every match between the datum's subject tag and subject tags in a user profile;
   multiply each datum's score by a temporal coefficient for a match between the datum's temporal tag and a temporal tag in a user profile;
   select the highest scoring data; and
   select a single datum from the remaining data.

390. A processor-accessible medium embodiment for generating proximity notifications indicating proximities between users, comprising:
processor readable instructions stored in the processor-accessible medium, wherein the processor readable instructions are issuable by the processor to:
   accumulate user situational information;
   accumulate user association information;
   analyze the user situational information;
   predict expected user interest and situational information from the analysis;
   determine if a user is in proximity with other users contained in the user association information; and
   notify a user of the proximity.

391. A processor-accessible medium embodiment for serving information to users within a virtual world based on accumulated user information, comprising:
processor readable instructions stored in the processor-accessible medium, wherein the processor readable instructions are issuable by the processor to:
   accumulate user activity interest information;
   accumulate user situational information;
   associate the user activity interest information and user situational information with a user profile;
   update the user profile with the associated information in a database;
   analyze accumulated information associated with the user profile;
   query an information database based on the analysis of the user profile;
   select information based on the user profile to include in a message; and
   serve the message in a virtual world.

392. A processor-accessible medium embodiment for serving information in a virtual world based on accumulated user information, comprising:
processor readable instructions stored in the processor-accessible medium, wherein the processor readable instructions are issuable by the processor to:
   receive messages from a user comprised of user identification, a user decision within a virtual world, time of the decision, and user location within the virtual world at the time of the decision;
   associate the user identification with a user profile in a database;
   update the user profile with the received messages;
   analyze the accumulated messages in the user profile;
   determine proper information to serve to the user based on the received message and the user profile;
   select the information to serve to the user from a database;
   incorporate the selected information into a reply message; and
   serve the reply message within the virtual world.

393. A processor-accessible medium embodiment for receiving information within a virtual world, comprising:
processor readable instructions stored in the processor-accessible medium, wherein the processor readable instructions are issuable by the processor to:
   accumulate user activity interest information;
   accumulate user situational information;
   incorporate user activity interest information in an interest message;
   incorporate user situational information in a situational message;
   send the interest message to a server;
   send the situational message to the server; and
   receive a reply that is displayed within a virtual world based on the interest message, the situational message, and a user profile.

394. A processor-accessible medium embodiment for serving information within a virtual world based on accumulated user information, comprising:
processor readable instructions stored in the processor-accessible medium, wherein the processor readable instructions are issuable by the processor to:
   accumulate user activity interest information;
   accumulate user situational information;
   analyze the user activity interest information and user situational information;
   predict expected user interest and situational information from the analysis;
   determine serving information to serve to a user based on expected user interest and situational information;
   select the information to serve from a database;

incorporate the selected information into a message;
determine a target time and place to send a message;
incorporate serving information and target time and place into a message; and
send the message for distribution within a virtual world.

395. A processor-accessible medium embodiment for selecting data from a database based on user virtual world activity interest and situational information, comprising:
processor readable instructions stored in the processor-accessible medium, wherein the processor readable instructions are issuable by the processor to:
filter data in the database by virtual world decision subject tags;
determine which remaining data match:
user demographic category tags;
user virtual world location tags;
user temporal tags;
select the data with the greatest number of matches; and
choose a single datum from the remaining data.

396. A processor-accessible medium embodiment for selecting data from a database based on a virtual world location, comprising:
processor readable instructions stored in the processor-accessible medium, wherein the processor readable instructions are issuable by the processor to:
assign the same initial score to every datum;
multiply each datum's score by a subject coefficient for every match between the datum's subject tag and subject tags in a user profile;
multiply each datum's score by a temporal coefficient for a match between the datum's temporal tag and a temporal tag in a user profile;
multiply each datum's score by a demographic coefficient for a match between the datum's demographic tags and demographic tags in a user profile;
multiply each datum's score by a virtual world location coefficient for every match between the datum's virtual world location tags and the virtual world location tags in the user profile;
select the highest scoring data; and
select a single datum from the remaining data.

397. A processor-accessible medium embodiment for tracking user information on the internet and serving information to users based thereon, comprising:
processor readable instructions stored in the processor-accessible medium, wherein the processor readable instructions are issuable by the processor to:
accumulate user activity interest information;
accumulate user situational information;
associate the user activity interest information and user situational information with a user profile;
update the user profile with the associated information in a database;
analyze accumulated information associated with the user profile;
query an information database based on the analysis of the user profile;
select information based on the user profile to include in a message; and
serve the message on a website.

398. A processor-accessible medium embodiment for tracking user information on the internet and serving information to a mobile device based thereon, comprising:
processor readable instructions stored in the processor-accessible medium, wherein the processor readable instructions are issuable by the processor to:
receive messages from a user comprised of user identification, mobile device identification, a code scanned by the mobile device, time of the scan, and user geographic location at the time of the scan;
associate the user identification with a user profile in a database;
update the user profile with the received messages;
analyze the accumulated messages in the user profile;
determine proper information to serve to the user based on the received message and the user profile;
select the information to serve to the user from a database;
incorporate the selected information into a reply message; and
serve the reply message on a website.

399. A processor-accessible medium embodiment for receiving information on the internet based on accumulated user information, comprising:
processor readable instructions stored in the processor-accessible medium, wherein the processor readable instructions are issuable by the processor to:
accumulate user activity interest information;
accumulate user situational information;
incorporate user activity interest information in an interest message;
incorporate user situational information in a situational message;
send the interest message to a server;
send the situational message to the server; and
receive a reply that is displayed on a website based on the interest message, the situational message, and a user profile.

400. A processor-accessible medium embodiment for serving information on a website based on accumulated user information, comprising:
processor readable instructions stored in the processor-accessible medium, wherein the processor readable instructions are issuable by the processor to:
accumulate user activity interest information;
accumulate user situational information;
analyze the user activity interest information and user situational information;
predict expected user interest and situational information from the analysis;
determine serving information to serve to a user based on expected user interest and situational information;
select the information to serve from a database;
incorporate the selected information into a message;
determine a target time and place to send a message;
incorporate serving information and target time and place into a message; and
send the message for distribution on a website.

401. A processor-accessible medium embodiment for selecting data from a database based on user website interest information, comprising:
processor readable instructions stored in the processor-accessible medium, wherein the processor readable instructions are issuable by the processor to:
filter data in the database by website subject tags;
determine which remaining data match:
user demographic category tags;
user current website tags;
user temporal tags;
select the data with the greatest number of matches; and
choose a single datum from the remaining data.

402. A processor-accessible medium embodiment for selecting data from a database based on correlations between a user profile and a datum's website association, comprising:

processor readable instructions stored in the processor-accessible medium, wherein the processor readable instructions are issuable by the processor to:
assign the same initial score to every datum;
multiply each datum's score by a subject coefficient for every match between the datum's subject tag and subject tags in a user profile;
multiply each datum's score by a temporal coefficient for a match between the datum's temporal tag and a temporal tag in a user profile;
multiply each datum's score by a demographic coefficient for a match between the datum's demographic tags and demographic tags in a user profile;
multiply each datum's score by a website coefficient for every match between the datum's website tags and the website tags in the user profile;
select the highest scoring data; and
select a single datum from the remaining data.

403. A processor-accessible medium embodiment for processing and responding to ambiguous content requests, comprising:
processor readable instructions stored in the processor-accessible medium, wherein the processor readable instructions are issuable by the processor to:
receive a scanned code image and a user ID;
analyze the scanned code image to determine if the information encoded therein is fully accessible;
select a scanned code disambiguation process to apply to the scanned code images if the information encoded therein is not fully accessible;
apply the scanned code disambiguation process to the scanned code image to determine a most likely code;
query accumulated user information in a user profile associated with the user ID;
query a content database to extract requested content based on the most likely code and the accumulated user information; and
send the requested content to a user.

404. A processor-accessible medium embodiment for processing and responding to ambiguous content requests, comprising:
processor readable instructions stored in the processor-accessible medium, wherein the processor readable instructions are issuable by the processor to:
receive a scanned code image, a user ID, wherein the scanned code image is sent to a short code address via MMS.
analyze the scanned code image to determine if the information encoded therein is fully accessible;
select a server-side scanned code disambiguation process to apply to the scanned code images if the information encoded therein is not fully accessible, wherein the scanned code disambiguation process comprises any combination of scanned code image enhancement and partial decoding;
apply the server-side scanned code disambiguation process to the scanned code image to determine a most likely code;
query accumulated user information in a user profile associated with the user ID;
query a content database to extract requested content based on the most likely code and the accumulated user information; and
send the requested content to a user via MMS.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:
1. A processor-implemented method for signaling proximity of mobile devices, the method comprising:
accumulating by the server processor first activity information of a first mobile device;
accumulating by the server processor second activity information of a second mobile device;
receiving by the server processor a proximity boundary for the first mobile device established by a user of the first mobile device;
determining by the server processor a first location of the first mobile device from the first activity information;
determining by the server processor a second location of the second mobile device from the second activity information;

determining by the server processor whether the second mobile device is on or within the proximity boundary of the first mobile device;

sending by the server processor an alert to at least the first mobile device that the proximity boundary has been breached when the second mobile device is on or within the proximity boundary of the first mobile device.

2. The method of claim 1, wherein the mobile device is a device selected from the group consisting of a PDA and a cellular telephone.

3. The method of claim 1, wherein the first activity information comprises a first code captured by the first mobile device at a first code location and the second activity information comprises a second code captured by the second mobile device at a second code location.

4. The method of claim 3, wherein at least the first code is a matrix code, wherein at least the first mobile device comprises a camera, and wherein the first code is an image captured by the camera.

5. The method of claim 3, wherein determining the first location and the second location comprises:
acquiring by the server processor the first code location and the second code location; and
assigning by the server processor as the location of the first mobile device the first code location and assigning as the location of the second mobile device the second code location.

6. The method of claim 1, wherein the second activity information comprises indentifying information of a user of the second mobile device and wherein determining a second location of the second mobile device from the second activity information comprises:
comparing by the server processor the received second user identifying information with stored second user identifying information;
granting by the server processor access to a profile of the user of the second mobile device when the received second user identifying information matches the stored second user identifying information, wherein the user profile comprises a scan history, and wherein the scan history comprises for each captured code a time of capture and a location of the second mobile device at a time of capture;
updating by the server processor the scan history of the user profile with the second code location;
applying by the server processor a first rule to the updated scan history to determine a trajectory of the second mobile device; and
predicting by the server processor a location of the second mobile device from the trajectory.

7. The method of claim 6, wherein the stored second user identifying information comprises information captured by the processor from the user of the second mobile device during a registration process.

8. The method of claim 6 further comprising:
determining by the server processor whether the trajectory of the second mobile device will intersect the proximity boundary of the first mobile device; and
when the trajectory of the second mobile device will intersect the proximity boundary of the first mobile device:
determining by the server processor an estimate of a time when the intersection will occur; and
sending by the server processor an alert to the first mobile device of the estimated time that the trajectory the second mobile device will interest the proximity boundary of the first mobile device.

9. An apparatus for signaling proximity of mobile devices, the apparatus comprising:
a memory comprising processor executable instructions;
a processor configured to receive the processor executable instructions to perform operations comprising:
accumulating first activity information of a first mobile device;
accumulating second activity information of a second mobile device;
receiving a proximity boundary for the first mobile device established by a user of the first mobile device;
determining a first location of the first mobile device from the first activity information;
determining a second location of the second mobile device from the second activity information;
determining whether the second mobile device is on or within the proximity boundary of the first mobile device;
sending an alert to at least the first mobile device that the proximity boundary has been breached when the second mobile device is on or within the proximity boundary of the first mobile device.

10. The apparatus of claim 9, wherein the mobile device is a device selected from the group consisting of a PDA and a cellular telephone.

11. The apparatus of claim 9, wherein the first activity information comprises a first code captured by the first mobile device at a first code location and the second activity information comprises a second code captured by the second mobile device at a second code location.

12. The apparatus of claim 11, wherein at least the first code is a matrix code, wherein at least the first mobile device comprises a camera, and wherein the first code is an image captured by the camera.

13. The apparatus of claim 11, wherein the operation of determining the first location and the second location comprises:
acquiring the first code location and the second code location; and
assigning as the location of the first mobile device the first code location and assigning as the location of the second mobile device the second code location.

14. The apparatus of claim 9, wherein the second activity information comprises identifying information of a user of the second mobile device and wherein the operation of determining a second location of the second mobile device from the second activity information comprises:
comparing the received second user identifying information with stored second user identifying information;
granting access to a profile of the user of the second mobile device when the received second user identifying information matches the stored second user identifying information, wherein the user profile comprises a scan history, and wherein the scan history comprises for each captured code a time of capture and a location of the second mobile device at a time of capture;
updating the scan history of the user profile with the second code location;
applying a first rule to the updated scan history to determine a trajectory of the second mobile device; and
predicting a location of the second mobile device from the trajectory.

15. The apparatus of claim 14 further comprising:
determining whether the trajectory of the second mobile device will intersect the proximity boundary of the first mobile device; and when the trajectory of the second mobile device will intersect the proximity boundary of the first mobile device:
  determining an estimate of a time when the intersection will occur; and
  sending an alert to the first mobile device of the estimated time that the trajectory of the second mobile device will intersect the proximity boundary of the first mobile device.

16. The apparatus of claim 9, wherein the stored second user identifying information comprises information captured by the processor from the user of the second mobile device during a registration process.

17. A system for generating proximity notifications indicating proximities between users, comprising:
  means for accumulating by the server processor first activity information of a first mobile device;
  means for accumulating by the server processor second activity information of a second mobile device;
  means for receiving a proximity boundary for the first mobile device established by a user of the first mobile device;
  means for determining by the server processor a location of the first mobile device from the first activity information;
  means for determining by the server processor a location of the second mobile device from the second activity information;
  means for determining by the server processor whether the second mobile device is on or within the proximity boundary of the first mobile device;
  means for sending by the server processor an alert to at least the first mobile device that the proximity boundary has been breached when the second mobile device is on or within the proximity boundary of the first mobile device.

18. A non-transient processor-accessible medium for generating proximity notifications indicating proximities between users, comprising:
  processor readable instructions stored in the non-transient processor-accessible medium, wherein the processor readable instructions are issuable by the processor to perform operations comprising:
    accumulating by the server processor first activity information of a first mobile device;
    accumulating by the server processor second activity information of a second mobile device;
    receiving by the server processor a proximity boundary for the first mobile device established by a user of the first mobile device;
    determining by the server processor a location of the first mobile device from the first activity information;
    determining by the server processor a location of the second mobile device from the second activity information;
    determining by the server processor whether the second mobile device is on or within the proximity boundary of the first mobile device;
    sending by the server processor an alert to at least the first mobile device that the proximity boundary has been breached when the second mobile device is on or within the proximity boundary of the first mobile device.

* * * * *